United States Patent [19]
Kim et al.

[11] Patent Number: 6,026,362
[45] Date of Patent: Feb. 15, 2000

[54] TOOL AND METHOD FOR DIAGNOSING AND CORRECTING ERRORS IN A COMPUTER PROGRAM

[75] Inventors: Thomas Dongsuk Kim, San Jose; Seth Gordon Hawthorne, Santa Cruz; Joseph Stanley Kosinski, Woodside, all of Calif.

[73] Assignee: Compaq Computer Corporation, Cupertino, Calif.

[21] Appl. No.: 08/579,567

[22] Filed: Dec. 27, 1995

Related U.S. Application Data

[63] Continuation-in-part of application No. 08/526,761, Sep. 11, 1995.

[51] Int. Cl.$^7$ .................................................... G06F 11/00
[52] U.S. Cl. ................................................ 705/1; 395/704
[58] Field of Search ...................................... 395/704, 158, 395/500, 575, 700, 922, 703, 183.11, 183.14, 183.22; 371/15.1, 19, 3.22, 43.1; 707/103, 104; 705/1

[56] References Cited

U.S. PATENT DOCUMENTS

| | | | |
|---|---|---|---|
| 4,595,981 | 6/1986 | Leung | 364/300 |
| 5,124,989 | 6/1992 | Padawer et al. | 371/19 |
| 5,210,859 | 5/1993 | Aoshima et al. | 395/575 |
| 5,297,150 | 3/1994 | Clark | 371/19 |
| 5,313,616 | 5/1994 | Cline et al. | 395/500 |
| 5,375,125 | 12/1994 | Oshima et al. | 371/19 |
| 5,410,648 | 4/1995 | Pazel | 395/158 |

OTHER PUBLICATIONS

Article by Colin Gerety, entitled "A New Generation of Software Development Tools" Hewlett–Packard Journal, pp. 48–58 Jun. 1980.

Article by Michael B. Davis, entitled "A Layout Algorithm for a Graph Browser" published by EECS Department University of California, Berkeley, pp. 1–47, May 9, 1985.

Article by Lawrence A. Rowe et al. entitled "A Browser for Directed Graphs" published by EECS Department, University of California, Berkeley, pp. 1–22, Mar. 25, 1986.

Article by Sugiyama et al. entitled "Methods for Visual Understanding of Hierarchical System Structures" IEEE Transactions on Systems, Man, and Cybernetics, vol. SMC–11, No. 2, pp. 109–125, Feb. 1981.

Article by Salvatore R. Mangano entitled "Algorithms for Directed Graphs", Dr. Dobb's Journal, pp. 92–97, 106, 107, and 147, Apr. 1994.

Article by R.S. Side et al. entitled "A Debugger for Distributed Programs" Software–Practice and Experienced, vol. 24(5), pp. 507–525, May 1994.

Article by Adam Beguelin et al. entitled "Visualization and Debugging in a Heterogeneous Environment" IEEE, Computer, pp. 88–95, Jun. 1993.

Article by John Hopcroft et al. entitled "Efficient Planarity Testing" Journal of the Association for Computing Machinery, vol. 21, No. 4, pp. 549–567, Oct. 1974.

(List continued on next page.)

*Primary Examiner*—Frantzy Poinvil
*Attorney, Agent, or Firm*—Fenwick & West LLP

[57] ABSTRACT

In a computer system, an improved tool and method for debugging complex computer applications, displays the relationship between processes and resources of the processes and the contents of the stack and registers for threads of processes. Double clicking on the displayed information causes more detailed information to be displayed. The display is updated when predetermined operations are performed during debug. Debug commands are accepted by the tool through a graphical user interface using operations performed by the user directly on the graphical representation of the functions of the software application. The ability of the tool to accept user commands through the graphical user interface and to display critical debugging information using this same interface greatly facilitates debugging. The displayed information includes graphical information representing currently executing processes and their resources and further representing threads of the currently executing processes.

20 Claims, 48 Drawing Sheets-

OTHER PUBLICATIONS

Article published by BBN Systems and Technologies, "The TotalView Debugger," Sep. 11, 1993, pp. 2–8.

Operations Management Product Description for Flow Map, bearing copyright date of 1994.

Microsoft Windows Benutzerhandbuch', 1992 pp. 78–79.

IBM Technical Disclosure Bulletin, vol. 36, No. 8, (Aug. 1993) p. 331, XP 000390242, "Graphical Monitoring of an Executing Application."

Proceedings on the Pacific Rim Conference on Communications, Competitors and Signal Processing, Victoria (Jun. 1989) IEEE pp. 265–268, XP 000077481, "DPD: A Distributed Program Debugger for the REM Environment."

Call graph example

Call graph with current call path highlighted

Call graph node selection (VerifyOrder) and corresponding source code for the function Scape Browser Palette Breakpoints Palette

TOOL AND METHOD FOR DIAGNOSING AND CORRECTING ERRORS IN A COMPUTER PROGRAM

This application is a continuation-in-part of U.S. patent application Ser. No. 08/526,761, filed Sep. 11, 1995 now pending entitled "Tool and Method for Diagnosing and Correcting Errors in a Computer Program" of Kim, Hawthorne, and Kosinski, and is related to U.S. patent application Ser. No. 08/269,355, filed Jun. 30, 1994 now abandoned, also entitled "Tool and Method for Diagnosing and Correcting Errors in a Computer Program" of Kim, Hawthorne, and Kosinski. The entirety of both applications, including Appendices A and B of the '355 application, is herein incorporated by reference.

BACKGROUND OF THE INVENTION

This application relates to a system and method for locating and correcting errors in a software application and, more particularly, to a system and method for graphically displaying the structure of a software application and controlling the execution of the software application during the software debugging process.

DESCRIPTION OF RELATED ART

Newly created computer programs often include one or more inadvertent errors. Some software errors can result in the complete failure of a software system, while others may result in incorrect behavior. Although commercial software developers will typically devote 50–70% of their total development time to checking the computer program for errors and correcting those errors, it is almost inevitable that some errors ("bugs") remain even in production versions of the software released to the public. There is, therefore, a great need for an efficient and effective means for "debugging" software.

Debugging is the process of identifying and isolating a software error so that the problem can be corrected. Usually this involves examining the lines of code comprising the software program and/or observing the program's execution to determine the cause for the aberrant behavior.

In the prior art of debugging a program, a user may first read the program line-by-line to try to locate the error or errors. However, following the flow of a program by reading it line-by-line can be extremely difficult and time consuming, even in a relatively simple program. If the program contains many loops, subroutines, function calls, variables and the like, the user may not be able to trace the sequence of program execution, and hence may not be able to determine the effect of the execution of each line of the computer program.

"Debuggers" are software diagnostic tools that provide users with mechanisms for viewing and controlling the execution of programs (including the program states and the values of variables) for the purpose of helping the user identify errors in the program code. With conventional debuggers, the user can control the operation of the defective software program by inputting one or more debug commands and observing the results of the subsequent program execution. For example, a debugger command may be invoked to set a "break point" at a location in the defective program. The effect of a break point is to suspend program execution when the location of the break point is reached. The user can then cause the debugger to display the values of selected variables. State-of-the-art debuggers can also display several lines of disassembled machine code and/or the corresponding lines of source code occurring before and after the break point. Even state-of-the-art debuggers, however, do not predict where and whether a program will branch. Therefore, a deficiency in current state-of-the-art debuggers is that the lines of code which they display following the point of suspension are simply the next consecutively numbered lines of code in the program. Such lines of code may not necessarily be the code which will be executed when the user resumes operation of the program.

Typical debug commands include: a "step command," in which the program is executed one line at a time, with the lines of code possibly being displayed as they are executed; a "watch value command," which displays the changing value of a selected variable while the program is running; a "trace command," which displays a list of active functions on the stack; a "data break command," which stops execution of the program upon the occurrence of a user-selected condition, such as a variable achieving a predetermined value; and an "assign command," which assigns a user-selected value to a variable.

Notwithstanding the wide-spread use of debuggers, debugging can still be difficult and time consuming. One reason for this is that conventional debuggers are text-based, i.e., the debuggers provide the user with information in the form of a series of lines of text and accept commands in a similar format. For example, with conventional debuggers the user may type in an instruction which causes the debugger to place a break point in a particular line of a program or, using a mouse, "point and click" on a line of code to place a break point at the beginning of that line. Upon the occurrence of the break point, conventional debuggers can display lines of text containing the disassembled machine code executed up to the break point, the corresponding line or lines of source code and the value of certain selected variables.

The operation of a debugger at this text-based level has numerous disadvantages. For example, the user must be intimately familiar with the organization of the program being debugged, since the debugger can only display the lines of code comprising the execution path actually traversed by the program; the debugger cannot tell the user which alternative execution paths could have been taken by the program using a different set of input data. Conventional debuggers also do not tell the user which functions could be called by the particular function located at the break point. The user must deduce this information by examining the displayed code. Thus, to fully appreciate the state of the program at the break point, the user must figure out and retain a complex mental picture of the various execution paths which the program might have taken to have reached its current state and the various execution paths it might take once the next debug command causes program execution to resume.

Users of conventional debuggers frequently find themselves in a situation somewhat analogous to a cross-country traveller without a road map who, upon reaching each successive intersection, must ask for the name of the closest town in each direction. Without a road map showing all the roads that lie between the embarkation point and his or her destination, the traveller cannot plan the most efficient way to get to the ultimate destination. Instead, using only trial and error, the traveller can easily get lost, may have to backtrack and will frequently find himself or herself going down dead end streets. To continue the analogy, it is often helpful if a programmer can situate himself high in the air over his route, so he can get a "bird's eye view" of the route.

Despite many advances in debugging technology, creating defect-free software is an elusive goal that is far from being achieved. In fact, the trend toward increasingly complex software systems makes achieving this goal even more difficult. Thus, the debugger is one of the most important tools affecting a programmer's productivity. It is surprising therefore, that despite the considerable effort which the software industry has devoted to debuggers, their use is still so cumbersome. (The inventors believe that this results from the fact that conventional debuggers are based upon a model that was developed to support traditional character-based terminals.)

Moreover, conventional debuggers are designed to work on a single computer system. Today, in a client-server programming environment, computer programs often run as multiple "processes" that pass information between themselves. These processes can be initiated and terminated a synchronously with each other. In addition, these processes execute on one computer or on several computers. Processes mining on multiple computers are said to be "distributed processes."

In view of the above, it is clear that there exists a need for an improved debugging tool. In particular, there exists a need for a debugging tool that can abstract critical debugging information from increasingly complex software, display that information in a dynamic and useful graphical format and, in addition, allow the user to control program execution through operations performed directly on the graphical representation of the program.

SUMMARY OF THE INVENTION

The present invention provides an improved debugger having a graphical user interface. The debugger preferably operates in a client-server computing environment in which a plurality of processes receive inputs and outputs from "resources."

A portion of the debugger, hereinafter referred to as the "debug server," preferably executes on the same server computer as the program which is to be debugged. The debug server receives debug commands transmitted from a "debug client" on the client computer and, in cooperation with the server's operating system, executes these commands. The debugger reads certain information, called "symbolic information," and information pertaining to the processes and resources, which is typically stored in the server computer's memory or on an associated magnetic disk storage subsystem. The debug server also reads program state information from that computer's memory. Using the symbolic information, the debug server derives the "call relationships" between the functions contained within the program, i.e., which functions can call which other functions. The server computer then transmits this information, along with the current program state, to the client computer.

A graphical user interface portion of the debugger is preferably resident on the client computer. This portion of the debugger receives process/resource information, the interprocess link information, and possibly the call relationship information for a particular process (depending on the user's preference settings) and program state information transmitted from the server. Using this information, the debug client constructs and displays a planar graph representing the processes and their resources. In the present invention, the debug client and debug server also communicate information to allow the debug client to display a planar representation of threads running in each process. The debug client can also display a graph of the functions comprising a singular program which is to be debugged. For example, the debugger could display a tree-like graphical representation of the program, wherein each function comprising the program is represented by a node on the graph and the call relationships between functions are illustrated by lines interconnecting the nodes. Such a graph is known as a "call tree".

The interface of the present invention displays the process/resource information and the call tree of one of a selected number of processes in several user selected formats. The interface of the present invention displays the process/resource information and call tree of one or a selected number of processes in several user selected formats. These serve as "road maps" for debugging, allowing the user to quickly and easily establish process context in the application graph and to easily navigate to the locations of interest where problems may lie using the call tree graphs. The interface also annotates the call tree with additional information, such as the values of user-selected variables, highlighting the current execution path as determined from the function call stack, and indicating, in any convenient way, when a break point is set in a function.

The interface also provides debugging commands that can be applied to the functions represented by call tree nodes. These commands include the ability to step program execution a function at a time, the ability to view the source code associated with a function, the ability to set a breakpoint on a function, and the ability to "expand" and "collapse" call tree nodes, as will be discussed later in greater detail. The interface transmits these commands to the server computer for execution.

The user may enter debug commands into the client computer in the traditional manner by typing commands on an associated keyboard. Alternatively, however, and in accordance with an important aspect of the present invention, the user may control the functioning of the debugger and enter debug commands directly through the graphical interface simply by using a mouse to point and click, first directly on the node shown on the displayed call tree where the command is to be executed and then on a graphical symbol, such as an icon or menu item, for the desired debug command.

In relation to the analogy of the cross-country traveler described previously, the present invention is equivalent to allowing the programmer to fly above his route and get a "bird's eye view" of the connections between the streets of the route. The present invention also provides the traveler with a complete road map of all highways and surface streets between the embarkation point and the ultimate destination. Such a road map allows the traveler to assess the best possible means to reach a particular destination. By analogy, the present invention provides the same type of road map to the programmer and allows him or her to assess the best and most efficient means to debug a program.

These and other advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
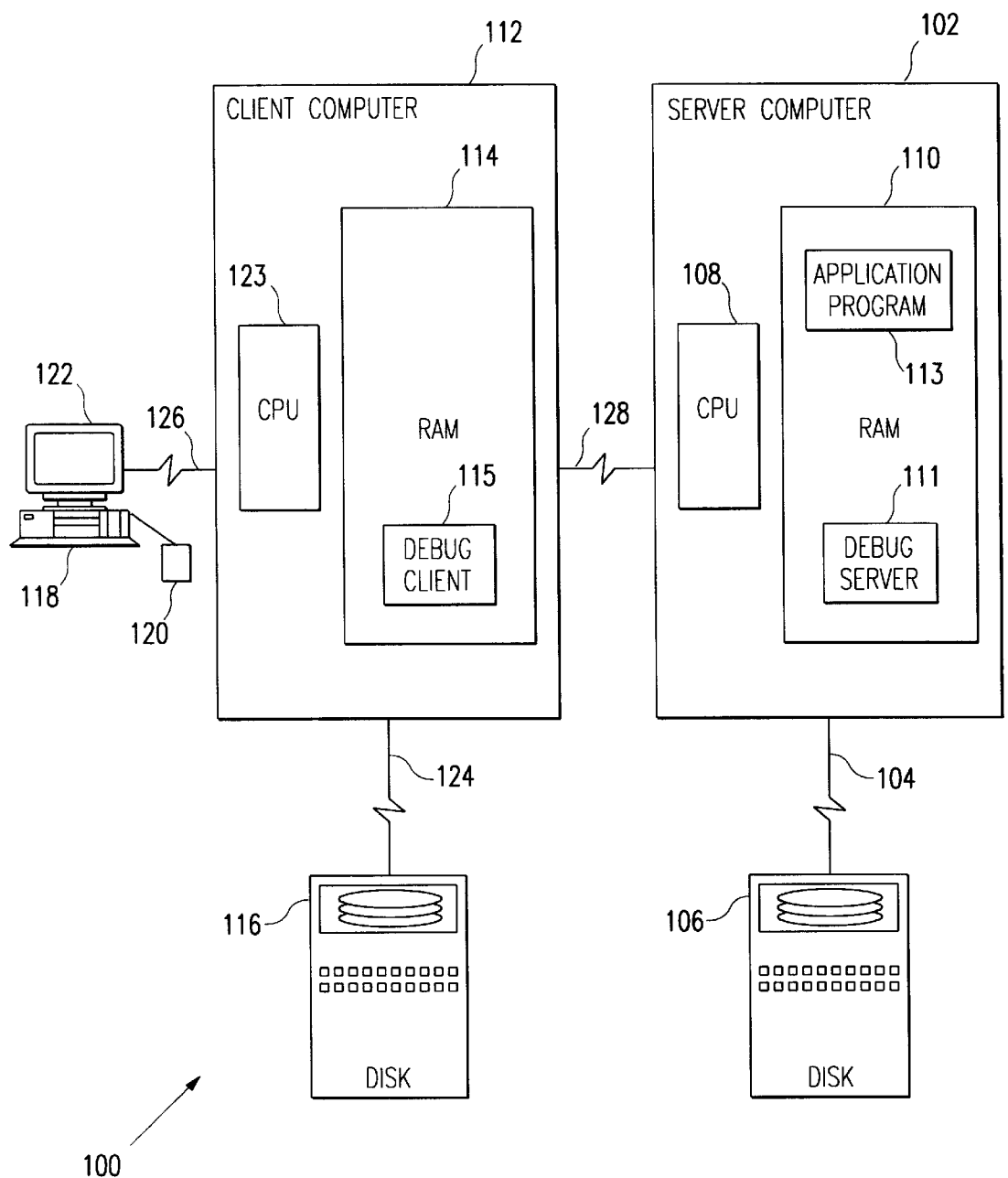
FIG. 1 is a block diagram of a client/server computing system for carrying out a preferred embodiment of the present invention.
Figure 2:
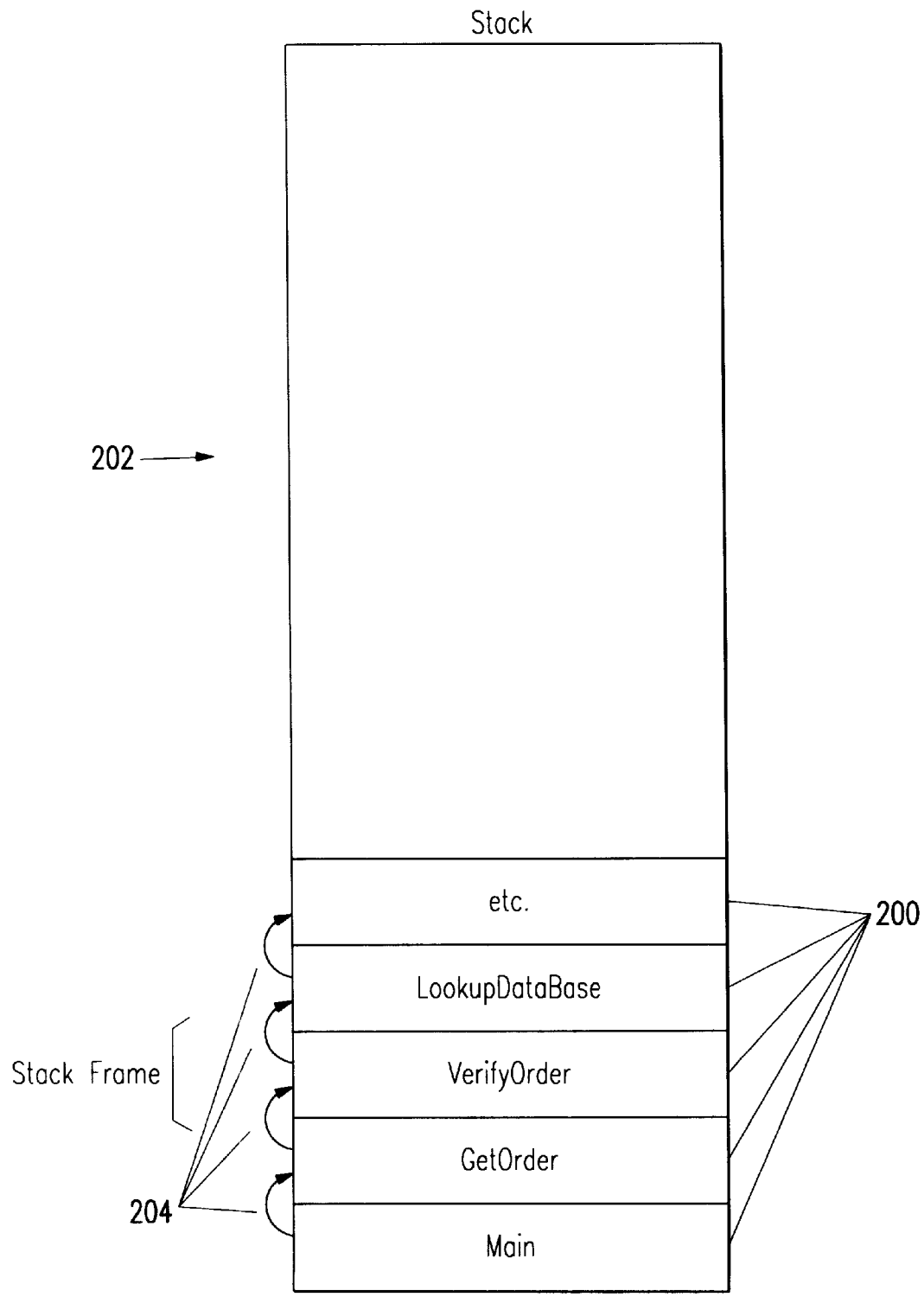
FIG. 2 illustrates memory organization of the stack within the server computer.

As illustrated in FIG. 1, the debugger of the present invention is preferably designed for use in a client/server computing environment 100. The server computer 102 communicates over a bus or I/O channel 104 with an associated disk storage subsystem 106. The server computer 102 includes a CPU 108 and RAM 110 for storing current state information about program execution. A portion of the RAM 110 is dedicated to storing the register states and local variables associated with each function of the program which is currently executing on the server computer 102. This portion of RAM 110 is typically called a "program stack" or simply "the stack" 202 (FIG. 2). As illustrated in FIG. 2, the RAM locations, associated with information pertaining to each such function, are organized in a data structure 200 known as a "frame". The client computer 112 (FIG. 1) similarly includes RAM 114, associated disk memory 116, and a keyboard 118, a mouse 120 and a video display terminal ("VDT") 122. The client CPU 123 communicates over a bus or I/O channel 124 with the disk storage subsystem 116 and via I/O channel 126 with the keyboard 118, VDT 122 and mouse 120.

Consistent with the preferred client/server model, respective portions 115 and 111 of the debugger software are preferably designed to operate simultaneously on the client 112 and server 102 computers. Coordination between the operations performed by the two portions of the debugger software are maintained by communication over a network 128.

As will be discussed in greater detail below, most software programs 113 today are written in so-called third generation "high-level" languages which a compiler translates to machine instructions. Programs written in third generation languages are organized into functions (also referred to as procedures or routines). Functions are defined to perform specific processing tasks. They are composed of one or more lines of source code and may have their own local variables which maintain state information that is unique to the function. Functions may call other functions to perform specific tasks. When this occurs, execution transfers to the "called" function and will return to the "calling" function when the called function has completed the requested task.

The execution state of the program is maintained on a "call stack," located within computer memory, which records the current execution location in each function that has been called. When a function is called, the current execution location in the calling function is recorded in the stack. When the called function completes, this location is removed from the stack and execution resumes at the saved location in the calling function.

As is known in the programming art, program execution begins at the "Main" routine and progresses as the Main routine calls other routines to perform various processing tasks. These other called routines may in turn call yet additional routines. The execution state of a program at any particular time is represented by the program call stack.

Figure 3:
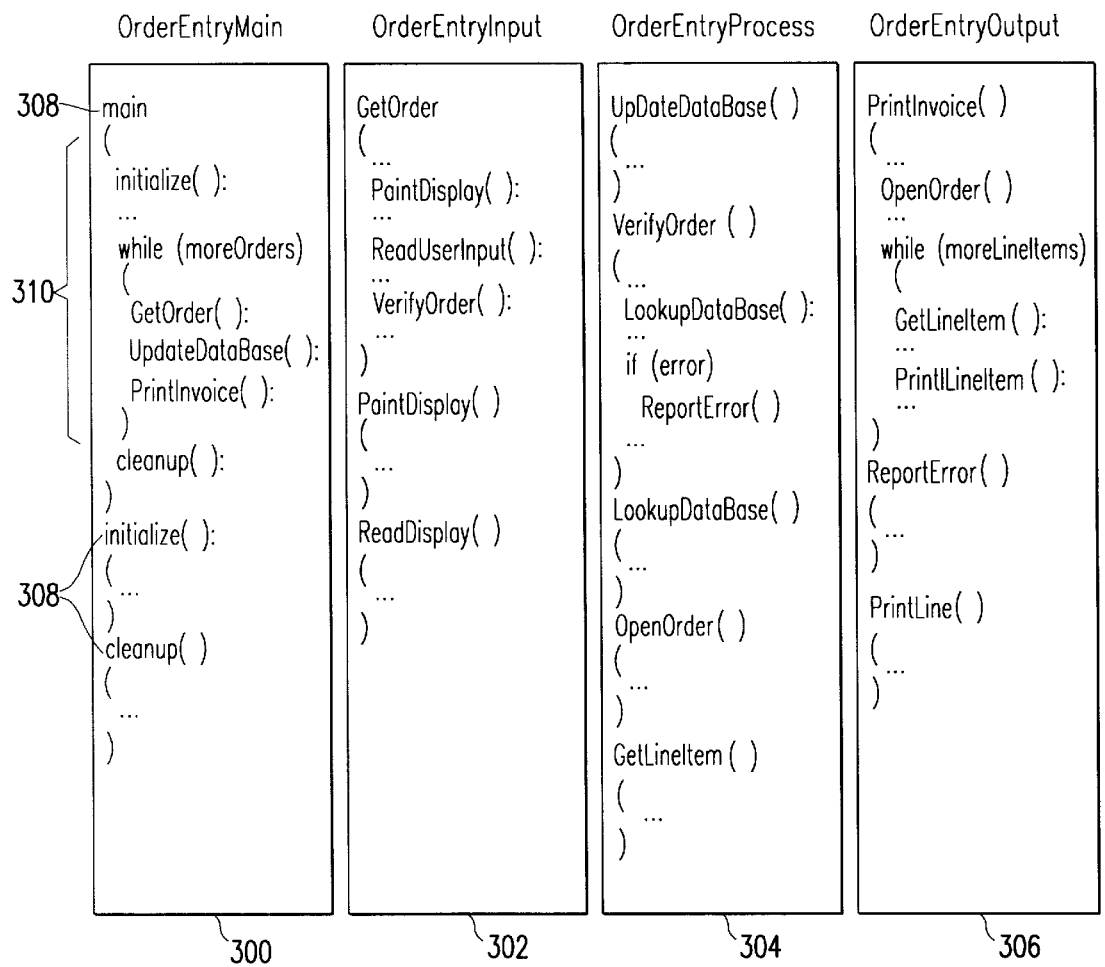
FIG. 3 is a diagram illustrating the file organization of a complex computer program.

As illustrated in FIG. 3, a typical program to be debugged, for example, an order processing program, may be composed of several source code files: (a) Main 300; (b) Input 302; (c) Processing 304; and (d) Output 306. Each source code file 300, 302, 304, 306 is composed of several functions 308. Each function 308 typically consists of plural lines of source code 310 and, upon completing its task or upon the occurrence of a particular event, each function will either initiate (or "call") the operation of another function 308, or return execution to the function 308 which called it.

Before the order processing program can be run on the computer 102, its source code files 300, 302, 304, 306 must be "compiled". Compilation converts the human-readable source code 310 into a binary code, called "object code". Many commercially available compilers may be used in connection with the present invention. For example, a Tandem C compiler from Tandem Computers Incorporated of Cupertino, Calif. may be used. This compiler generates object files in Common Object File Format ("COFF"). Many UNIX compilers also generate COFF files. The use of any particular compiler is not important to the present invention, as long as the compiler produces the necessary information for use by the debugger of the present invention, as described herein.

Figure 4:
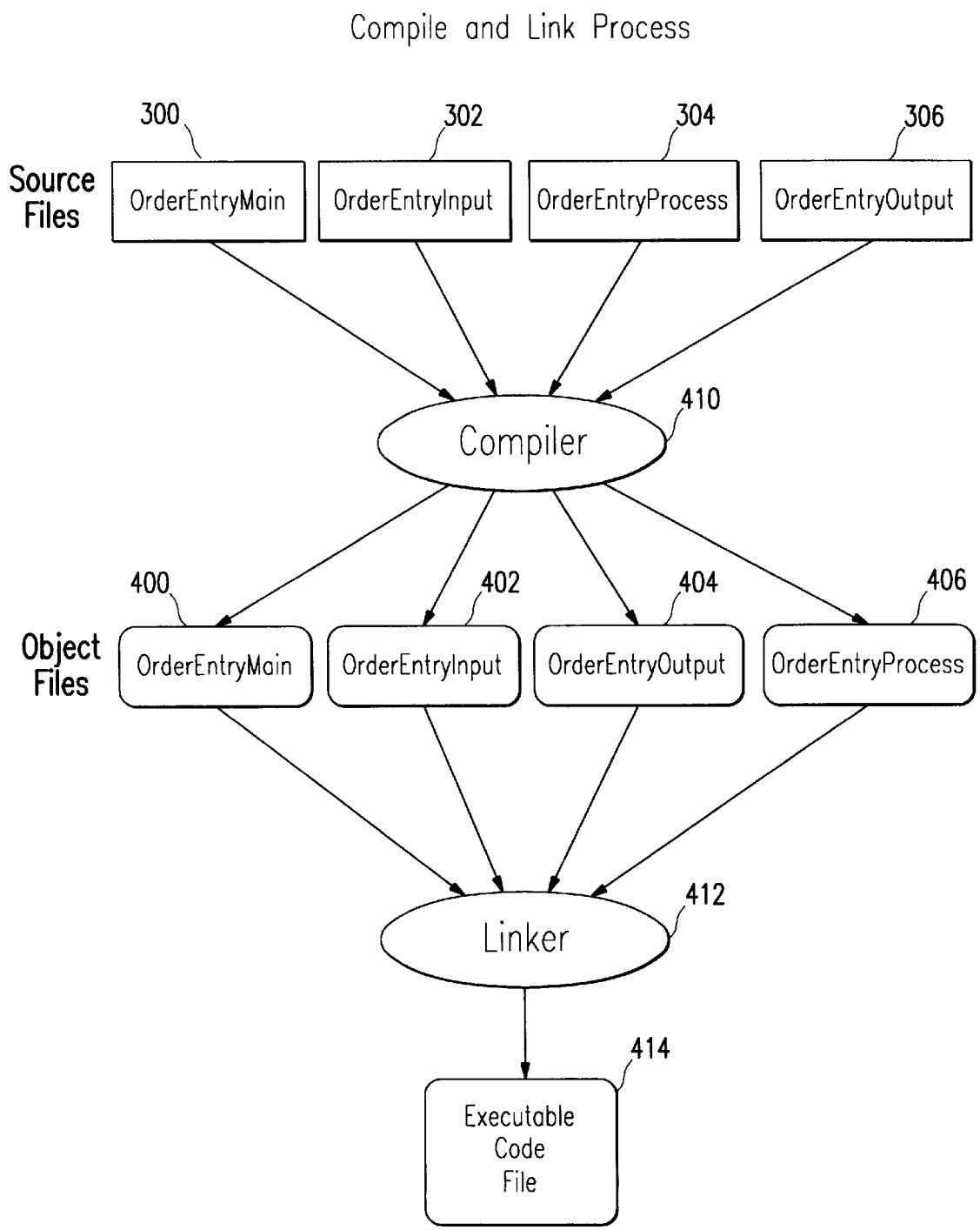
FIG. 4 is a flow diagram illustrating the conversion of source code into executable code.

As illustrated in FIG. 4, the compiler 410 converts each source code file 300, 302, 304, 306 into an object code file 400, 402, 404, 406. In addition to translating the source code into binary computer instructions, the user can also instruct the compiler 410 to include a significant amount of additional information, called "symbolic information," in each object code file 400, 402, 404, 406. The symbolic information includes, for example, variable names, function names, variable addresses and lists of all locations within the object code file where one function calls another function. Of particular interest, with respect to the operation of the present invention, is that portion of the symbolic information from which the debugger can determine the hierarchial call relationships between the various functions 308, i.e., which functions 308 can call which other functions 308. The symbolic information typically forms a portion of each object file 400, 402, 404, 406 stored in the computer's memory 110. Alternatively, however, the symbolic information may be stored in a separate file located in the disk storage subsystem 106. As will be explained below, the primary use for the symbolic information is in debugging the executable program.

Figure 5:
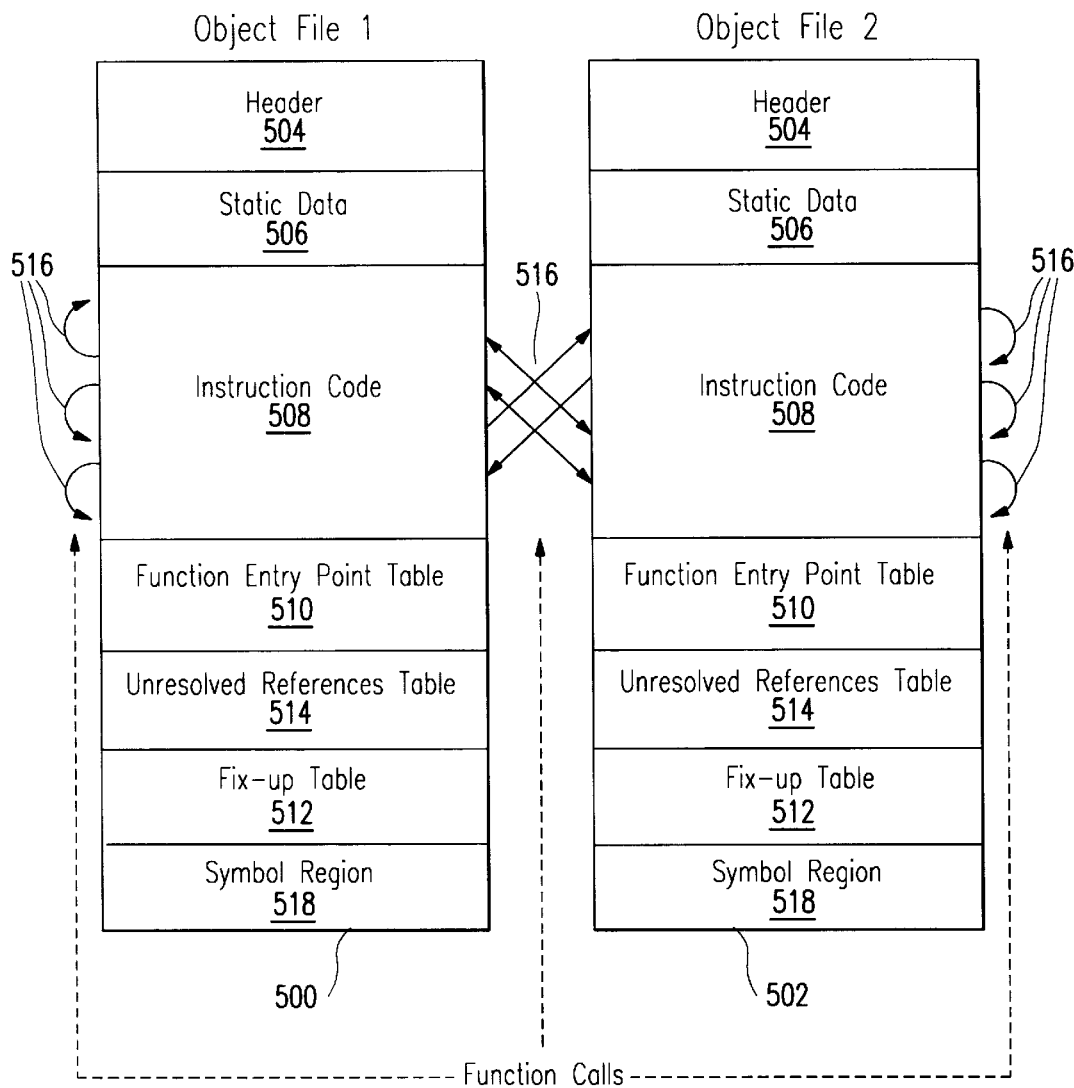
FIG. 5 is a diagram illustrating the structure of the information files created by the compiler for the program to be debugged.

FIG. 5 illustrates the structure of two typical object code files 500, 502. The Header section 504 of each file contains pointers to the starting locations of the various sections of the file, for example, the Header section contains the file offset for the Fix-up Table. The Static Data section 506 of each file contains all of the constant values used by the program. The Instruction Code section 508 of each file contains the actual binary coded instructions for executing the program. The Function Entry Point Table 510 of each file contains a list of functions which reside in the associated file and the addresses of each such function. The Fix-up Tables 512 are lists of addresses within each associated file where external functions are referenced. Each Unresolved External References Table 514 contains a list of all functions 308 which are referenced within that file but are defamed elsewhere.

All of the object code files are ultimately provided to a "linker" 412 (FIG. 4). The linker 412 is a software program which combines or "links" the various object files 400, 402, 404, 406 into a program 414 that can be executed by the computer 102. An important function of the linker 412 is to read the Function Entry Point Table 510, the Fix-up Table 512 and the Unresolved References Table 514 of each object code file 400, 402, 404, 406. The information collectively contained in these three tables is sufficient to enable the linker 412 to produce an executable code file 414 having the same data structure illustrated in FIG. 5 and all necessary references or logical connections 516 (FIG. 5) between the various functions originally residing in all of the object code files 400, 402, 404, 406 comprising the program.

Although the use of a compiler which generates object code files using the COFF standard is not required by the present invention, if such a compiler is used, then the Tandem Computers Incorporated Native Linker/Loader could be used to link the object code files. Alternatively, any linker that can process other object file formats could be used. Again, the use of any particular linker or any particular file format is not important to the present invention as long as the information necessary to the operation of the present inventive debugger, as set forth herein, is provided.

During execution of the program, the server computer 102 maintains information in its memory 110, called "state information." As implied by the name, the state information is all information needed to reconstruct the current state of the CPU 108. The state information includes the stack 202 (FIG. 2). In the usual case, this information is maintained as a list 204 of frames 200 within main memory 110. As is known in the art, a stack pointer identifies the function within the list currently being executed by the computer 102.

The debug server reads the symbolic information stored within the server computer's memory 110 or on disk 106. As will be apparent from the foregoing discussion, by reading the Function Entry Point tables 510, as supplemented by the linker 412 for references 516 to functions in other object code files and the Fix-up tables 512, the debugger can obtain all the information necessary to create a complete call graph for the example order processing application program (or any other program being debugged). Alternatively, in the particular instance where the debugger is operating on COFF files, where the COFF standard does not include a Fix-up Table, then the debugger is simply programmed to synthesize Fix-up Table information by searching the machine instruction code for all addresses where one function calls another.

Figure 6:
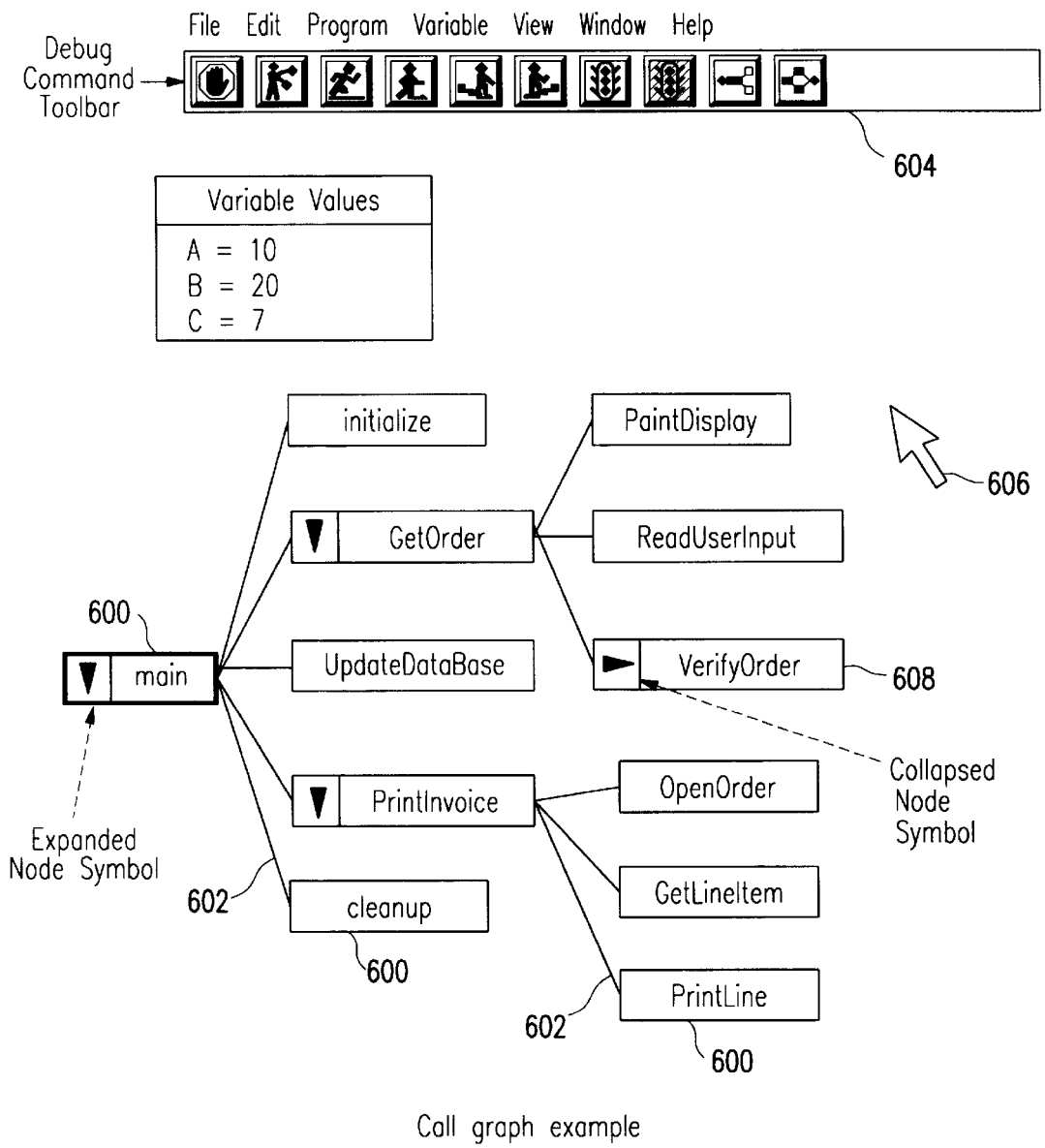
FIG. 6 is a dynamic call tree created and displayed by the debugger of the present invention illustrating the possible execution paths of an order processing program prior to debugging.

FIG. 6 illustrates such a call graph for the example order processing program. Each of the twelve nodes 600 in the figure represents a particular function included within the overall program. The lines 602 connecting the nodes 600 indicate that the left-most function may call the function to the right. For example, as set forth in this figure, the main program function can initiate calls to functions (nodes) which get the order, update the database, print an invoice, etc. Each such function 600, in turn, calls subsidiary functions which carry out the physical steps of painting a visual display on the computer terminal, reading user input, etc.

The debug server also reads the stack information from the target program's address space in the memory 110 of the server computer 102 and determines the state of the stack 202. As will be understood by those skilled in the art based upon the forgoing discussion, typically, a computer has a dedicated stack pointer register or uses a general purpose register as a stack pointer. The debugger of the present invention uses the stack pointer to find the first stack frame 200. Since all stack frames are linked 204, the debugger can then easily locate the remaining frames. After having read the symbolic information, derived the information necessary to create a call graph as explained above and obtained the stack information, the server then transmits the call graph and stack information to the client computer 112.

The preferred embodiment of the present invention includes graphical interface software resident on the client computer 112. The graphical interface software displays debugging information on the VDT 122 and receives debug commands from the user, either via the keyboard 118 or by input from a mouse 120 operating a moveable curser or pointer 606 (FIG. 6) on the VDT 118 in a known fashion.

The graphical interface software preferably includes as a portion thereof an off-the-shelf graphics software package, such as, for example, Microsoft Windows, available from Microsoft Corporation of Redmond, Wash., or zApp Application Framework, available from Inmark Development Corporation of Mountain View, Calif. Similar commercially available graphics software packages, capable of creating graphical drawings and performing user interactions as described herein, may also be used.

Using established algorithms such as, for example, the "Sugiyama Algorithm", disclosed in "Methods for Visual Understanding of Hierarchial Systems Structures", by Kozo Sugiyama, Shojiro Tagawa and Mitsuhiko Toda in *IEEE Transactions On Systems, Man and Cybernetics*, Vol. SMC-11, No. 2, February, 1981, pgs. 109–125; Thesis: Michael B. Davis, "A Layout Algorithm for A Graph Browser", U.C. Berkeley Engineering Library; or "A Browser for Directed Graphs", by Lawrence W. Rowe, Michael Davis, Ely Messenger, Carl Meyer, Charles Spirakis and Alan Tuan, U.C. Berkeley Engineering Library, and the call graph information transmitted from the server, the client constructs a visual rendering of the call graph on the VDT 122. Using the stack information transmitted from the server, the client connects the nodes and highlights the current call path.

Each of the above-identified references is incorporated herein by reference as non-essential subject matter; other known graphing algorithms may be substituted into the debugger of the present invention in place of the Sugiyama algorithm or Davis' modification of that algorithm.

Figure 7A:
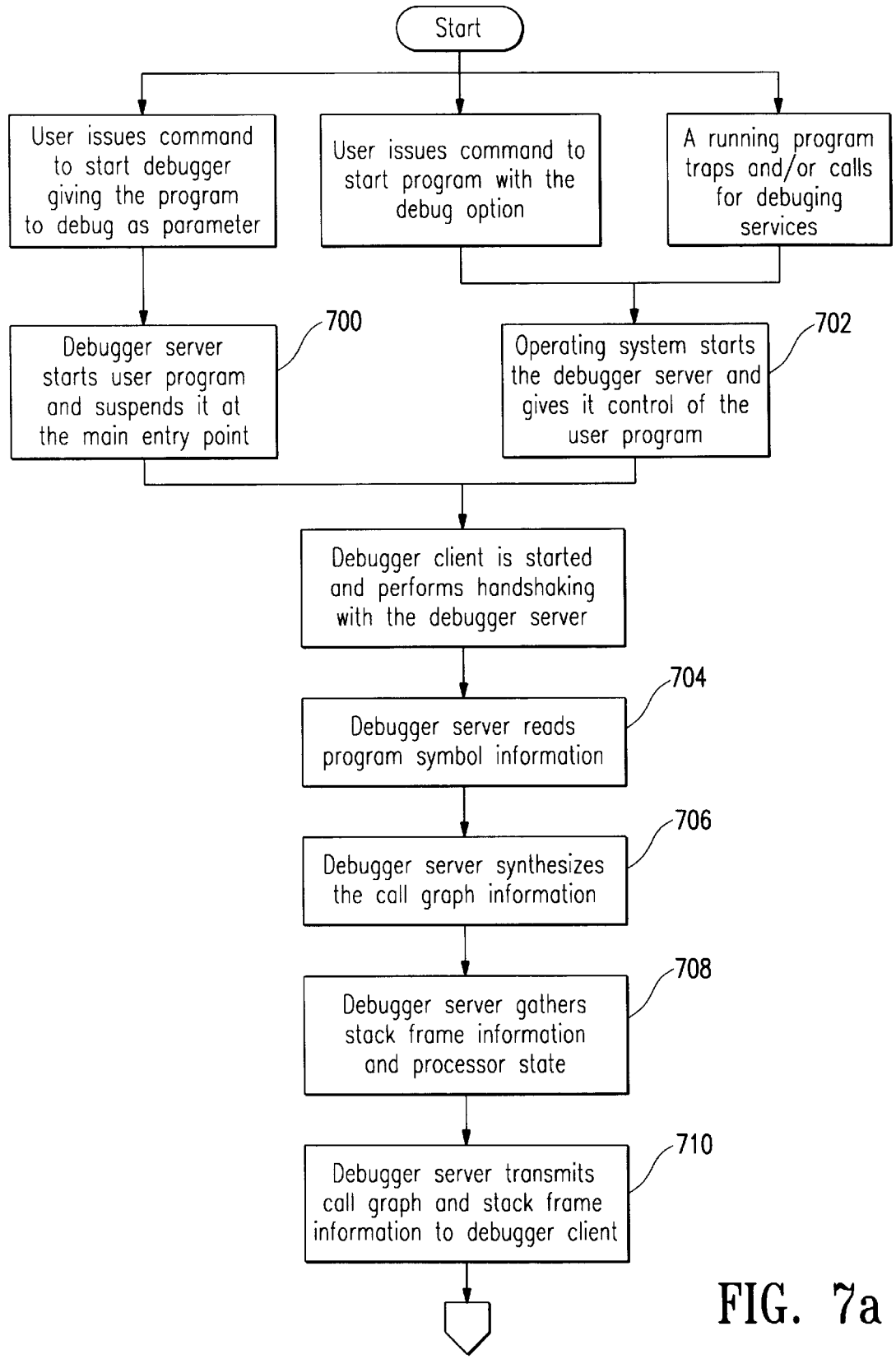
FIGS. 7(a) and 7(b) are flow diagrams in accordance with a preferred embodiment of the present invention.
Figure 7B:
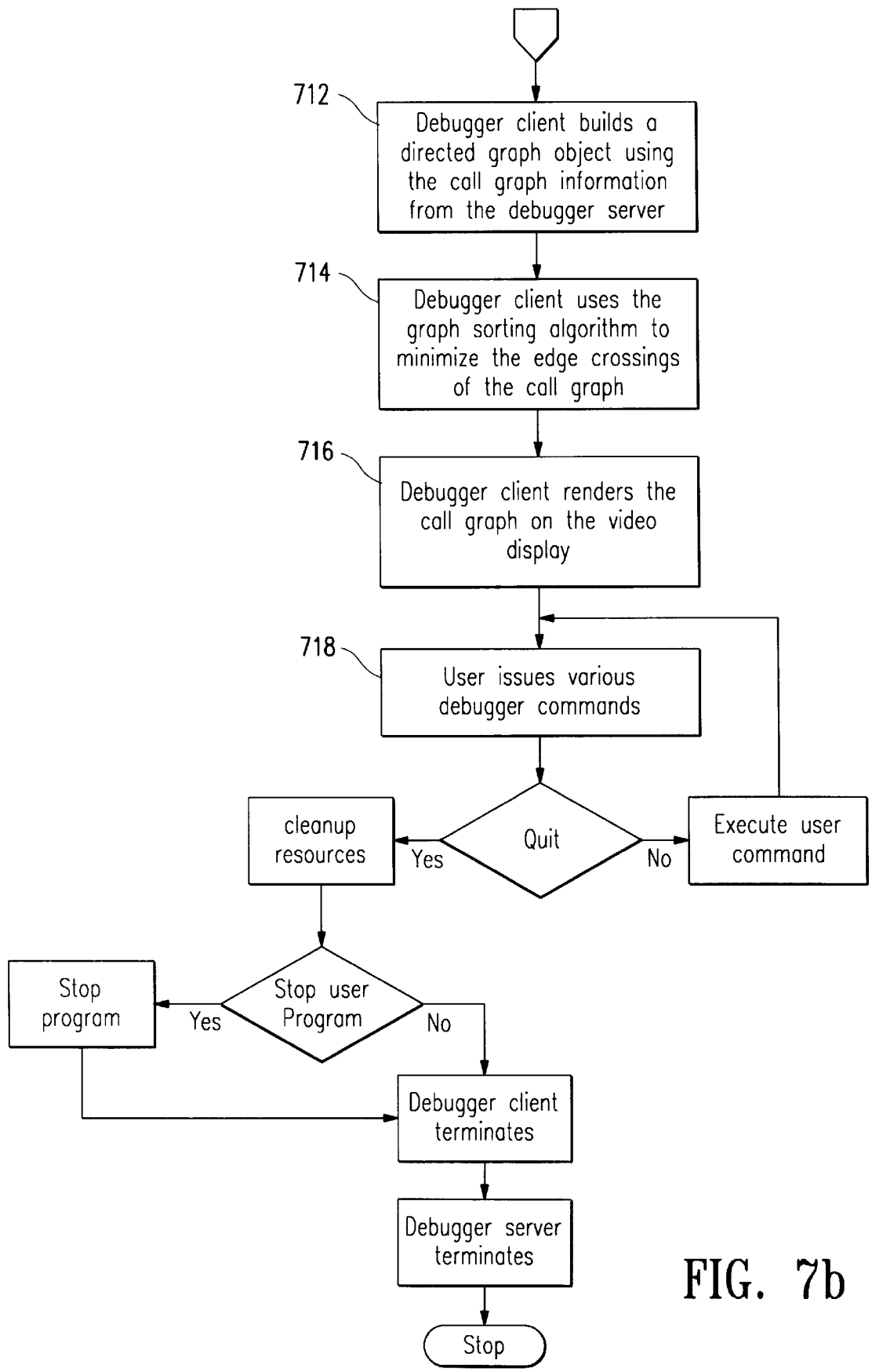

The debugger operates according to the process steps illustrated in FIGS. 7(*a*) and 7(*b*). As seen in these figures, the program to be debugged can be started under the control of the debugger program 700 or by the operating system which subsequently calls the debugger 702. In either event, the application program is loaded into the server computer's memory 110 and comes under control of the debug server. The debugger then reads the symbolic information 704 from the server computer's memory 110 or associated disk subsystem 106, derives the call graph relationships among the various functions 706 and reads the frame information and pointer information from the server memory 708. The server then transmits this information over the network 128 to the debug client 710.

Based upon the information transmitted from the server to the client, the graphical interface software residing on the client computer 112, using the Davis enhancement to the Sugiyama algorithm, constructs 712, 714 and displays 716 a call graph of the program being debugged. Since the frame stack information is also transmitted to the client, the debugger determines and highlights the current call of the program on the call graph. FIG. 6 illustrates the call graph rendered before the debugger initiates program execution. Note that, in this figure, only "MAIN" is highlighted, thereby indicating that the program is ready to execute.

Utilizing the mouse 120, the user inputs a debug command 718. For example, the graphical interface software could be designed to accept commands using the "point and drag" and/or "point and click" methods. According to the point and drag method, a plurality of symbols representing the various debug commands, for example, as shown in FIG. 6 at 604, may be displayed across the top of the VDT screen 122 as a Debug Command Toolbar. The user selects an object and a command to operate on that object by manipulating the mouse 120 to move a curser or pointer 606 displayed on the VDT screen 122 until it points to the location on the call graph where the debug command is to be executed. The user then presses the button on the mouse, moves the mouse 120 until the pointer 606 points to the location on the command tool bar 604 displaying the icon for the desired debug command and releases the button. The "point and click" method is similar, except that the button on the mouse 120 is pressed and released while the pointer 606 is pointing to the location on the call graph where the command is to be executed. The pointer 606 is then moved to the location along the toolbar 604 where the desired debug command icon is located and the button on the mouse 120 is pressed and released a second time. Both methods for inputting commands to general purpose computers are well known in the art.

Figure 8:
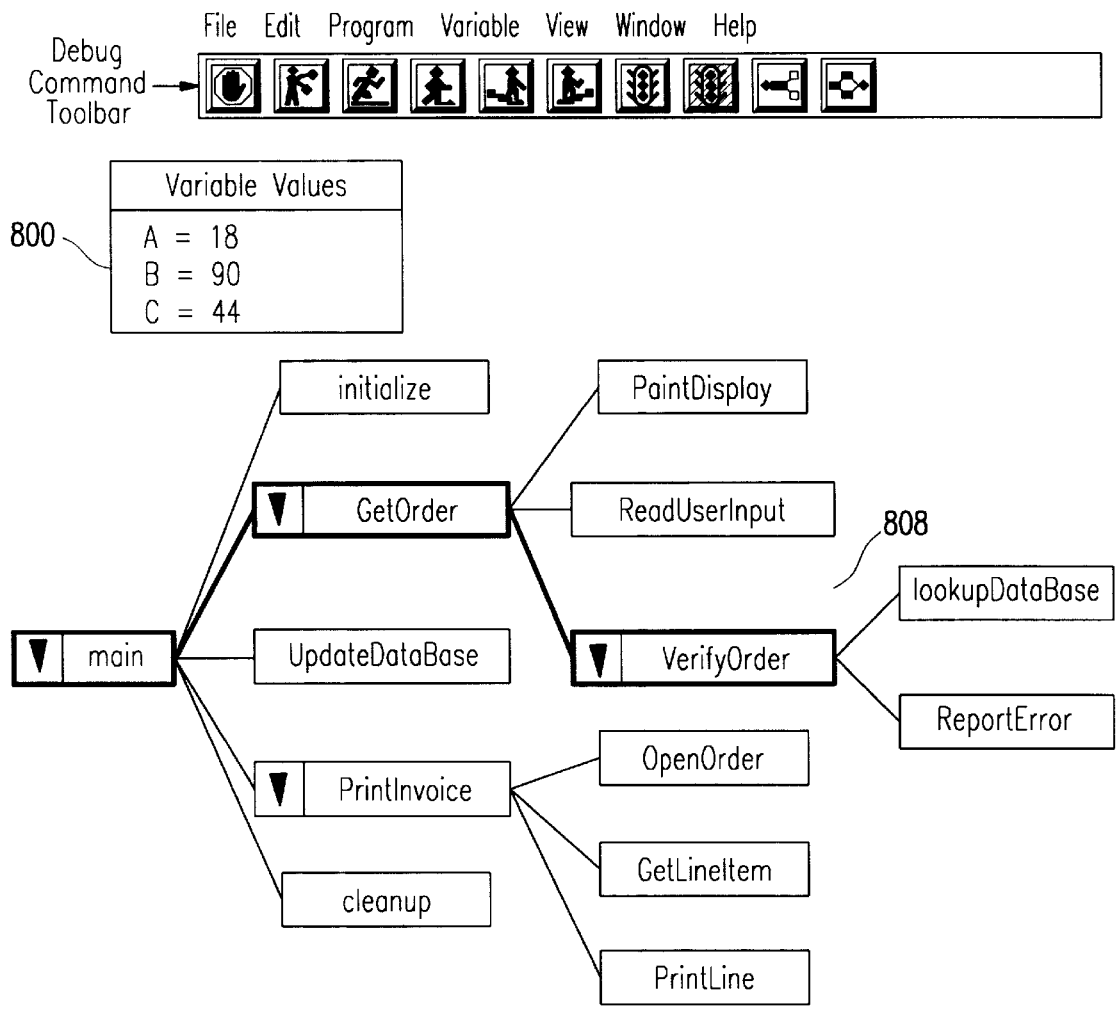
FIG. 8 is a dynamic call tree created and displayed by the debugger of the present invention illustrating the state of the example order processing program in which the function "Main" has called the function "Get Order" which subsequently called the function "Verify Order," and wherein the "Verify Order" node has been expanded to show its child nodes (functions) when compared to FIG. 6.

In either event, the client then transmits the debug command to the debug server, thereby causing the order processing program to execute in accordance with that command and under control of the debugger. For example, with reference to FIG. 8, if the debug command was the entry of a break point at Verify Order 808, the program would execute up to that breakpoint. Upon reaching the breakpoint, the server portion of the debugger reads the frame information and transmits the current state of the program to the client. Upon receipt of this information, the client alters the display by highlighting the execution path followed by the program up to the break point at the Verify Order function 808. FIG. 8 illustrates the graphical user interface display at such an intermediate step in the debugging process. Note that, by highlighting the execution path on the displayed call graph, the invention provides the user with an easily understood graphical display showing, not only the alternative paths the program could travel when the program is allowed to continue running, but also the execution path already traveled by the program. As previously mentioned, the values of selected variables 800 at the time the break point is encountered may also be displayed.

If the user locates the bug based upon the displayed information, the user then corrects the error in the source program, recompiles, re-links and restarts the program. Alternatively, if the bug is not located, then the user inputs another debug command. This process continues and successive states of the program are illustrated on the graphical display (along with selected variables, source code and disassembled machine code, as desired) until all bugs are located, corrected and the program performs in the proper manner.

In the course of a debugging session, a programmer will want to concentrate his or her efforts in a particular area of the program. The present invention allows the programmer to hide or show necessary program detail by allowing intermediate nodes of the call tree to be "collapsed" (as illustrated in FIG. 6) or "expanded" (as illustrated in FIG. 8). To allow for such a control, each node which has child nodes is provided with an icon button which functions as a switch. When a node is collapsed, the child function nodes will not be displayed; when expanded, the child function nodes are displayed. By allowing the programmer to control the level of detail displayed, the debugger is providing the capability to control the visual complexity that the user has to deal with.

Figure 9:
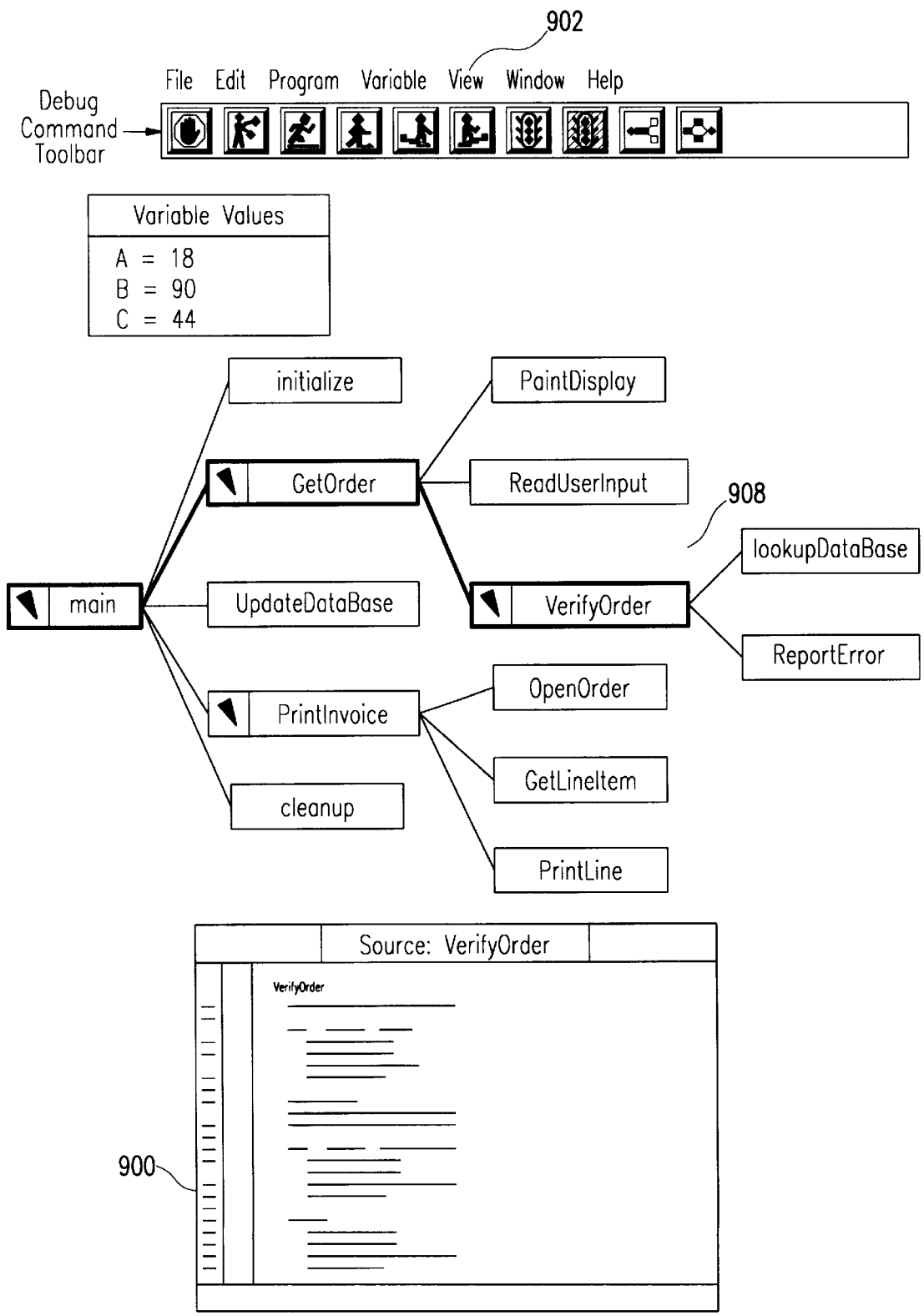
FIG. 9 is a dynamic call tree created and displayed by the debugger of the present invention illustrating the same program state as FIG. 8, but in addition, this figure shows that the Verify Order node was selected and the user issued a command to display the source code comprising the Verify Order function.

FIG. 9 illustrates a display window 900 wherein the source code corresponding to the Verify Order function 908 is displayed. Disassembled machine code (not shown) could be displayed in addition or as an alternative. The source code display 900 (or, alternatively, a disassembled machine code display) may be obtained by issuing commands using the same "point and click" or "point and drag" techniques discussed above. In the particular case illustrated to FIG. 9, the user first points and clicks on the Verify Order node 908 and then on the Source Code View menu item located under the view menu 902 along the debug command tool bar. Thus, it is apparent from the foregoing description that the present invention provides an extremely simple way to locate and display lines of code associated with a function and/or to issue a debug command, such as a breakpoint, at a function, rather than having to browse the source code in search of the first line of the target function.

Figure 10:
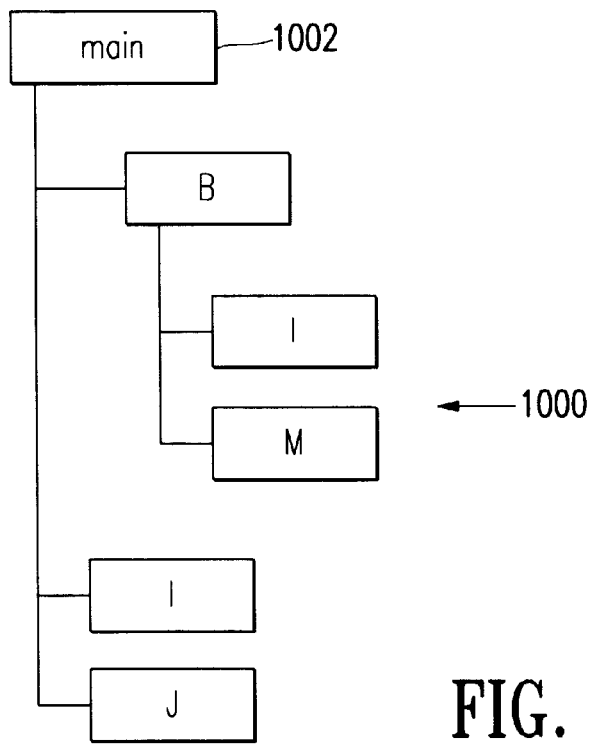
FIG. 10 is an "acyclic" call tree display of a program's organization generated by the debugger of the present invention.

In the call graph view, the debugger of the present invention has the capability to display the call graph in two modes which we call the "acyclic" (FIG. 10) and "cyclic" (FIG. 11) modes. A cycle is present in a call graph when there is a recursive function call. A recursive call exists when a function calls itself or another function that is active on the program stack 202. In essence we have a loop. The two modes, cyclic and acyclic, have different advantages. FIG. 10 illustrates the general case of an acyclic representation of a call graph 1000 which is rendered on the VDT screen in a top-down fashion, in which the program's top-most function (main) 1002 is at the very top and subsequent child functions are indented to the right and spaced lower in the window. The advantage of the acyclic representation is that it is visually clear because there are no lines which cross each other since the debugger replicates the function node in all the places that it is referenced. For example, if function MAIN calls functions B, I and J, and B calls functions I and M, I will be represented twice in the acyclic view. A possible disadvantage of this representation under certain circumstances is that one loses the information about how many functions call a particular function. In the example of FIG. 10, it is simple to see that I gets called by MAIN and B, but it would be difficult to visually extract this information from a more complex call graph.

Figure 11:
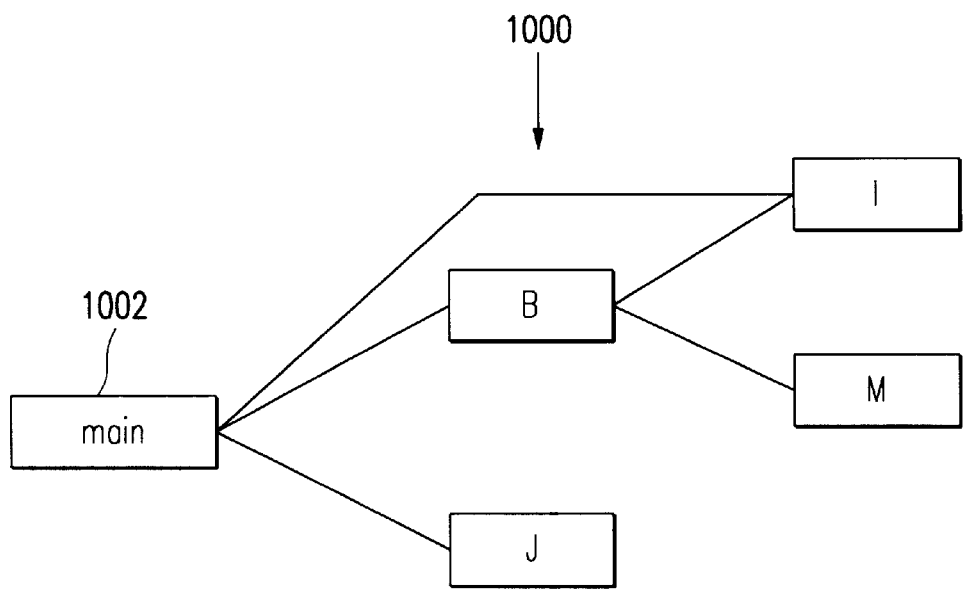
FIG. 11 is a "cyclic" call tree display of the organization of the same program as illustrated in FIG. 10.

FIG. 11 is a cyclic representation of the same call graph 1000 as is shown in FIG. 10. Here, there is no attempt at replication of nodes, but the rendering of program structure is more complex. To display a cyclical representation of the call graph, the graph is laid out in a left-to-right fashion where the MAIN function 1002 is at the very left and expansion through the child nodes occurs to the right. Since there is only one instance of each function node, the debugger must show all connections going into and out of a single representation of the particular node.

For large programs with many recursive calls, the cyclical representation of the call graph may get very complex. This is the reason that the present invention offers the user an option to use either mode so that the user can view the representation that provides the necessary information in the most understandable format.

As can be seen from the above detailed description, the present invention greatly simplifies debugging. It is particularly useful in the debugging of complex programs because the graphical nature of the display shows the user the organization of the program in a way which conventional text-based debuggers cannot. With the present invention, the entire call graph of the program (or a selected portion of the call graph) may be displayed, thereby providing the user, in a single display, with: (a) information relating to the overall program organization; (b) the current state of execution of the program; (c) the execution path taken by the program to reach its current state; (d) alternative execution paths the program might have taken; and (e) alternative execution paths the program could take when the program is allowed to continue execution. Clearly, existing text-based debuggers cannot provide such information to the user in a single, dynamic display. These five pieces of information, displayed on a single screen in a simple graphical format, combined with the ability to enter debug commands by acting directly on the graphical rendering of the program, greatly facilitates the debugging process.

Figure 12:
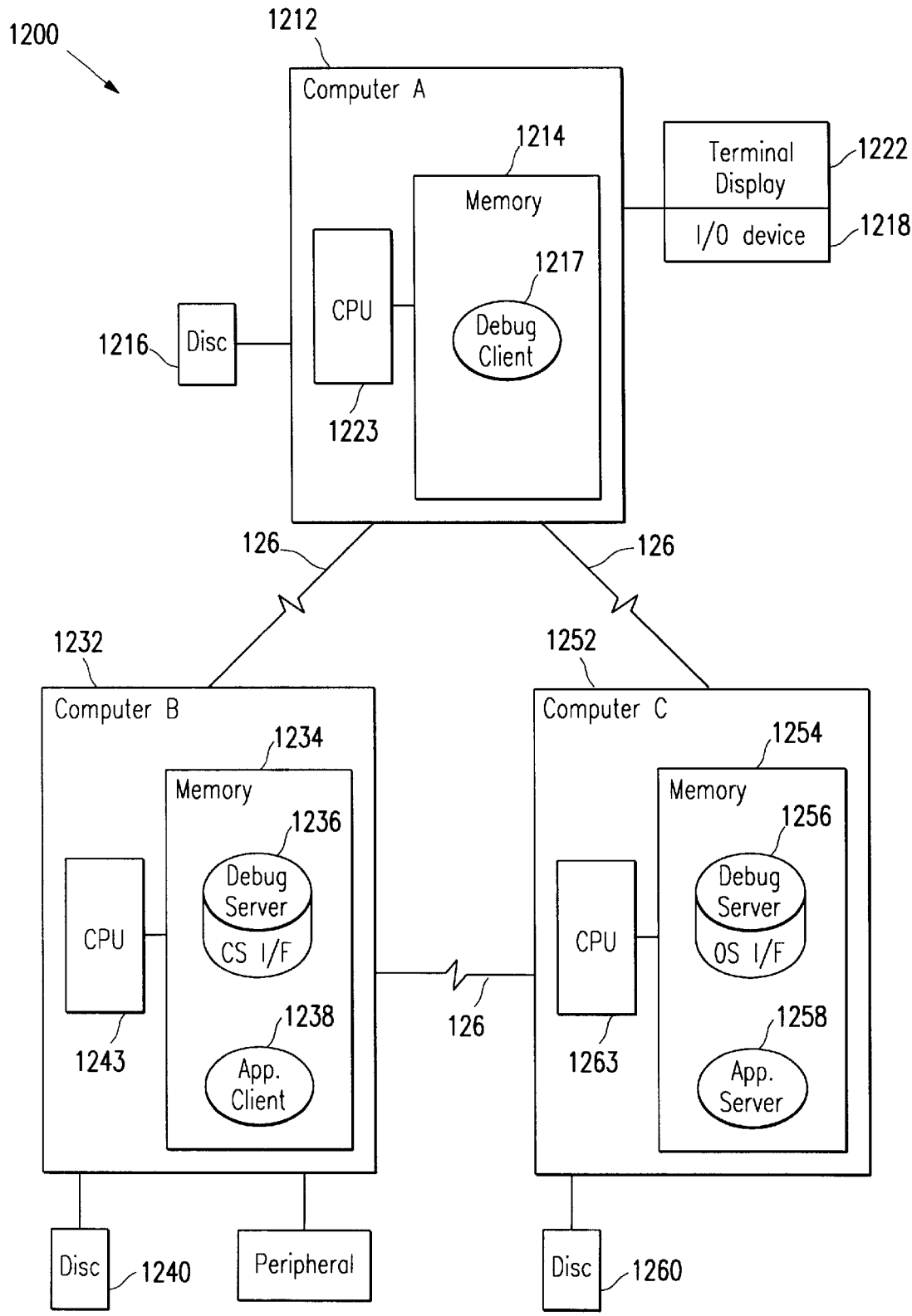
FIG. 12 is a block diagram of a data processing system in accordance with a second preferred embodiment of the present invention.

FIG. 12 is a block diagram of a data processing system in accordance with a second preferred embodiment of the present invention. FIG. 12 shows three data processing systems: Computer A 1212, Computer B 1232, and Computer C 1252. Each computer has a CPU 1223, 1243, and 1263; a memory 1214, 1234, and 1254; and a disk storage device 1216, 1240, and 1260. Computer A also includes a terminal/display screen 1222 and an input device 1218, such as a keyboard, a mouse, etc. Computers A, B, and C are connected by I/O channels 126.

The memory of Computer A contains a software program called a "debug client" 1217. The memory of Computer B contains a software program called a "debug server" 1236 and a software program called an "application client" 1238. The memory of Computer C contains a software program called a "debug server" 1256 and software called an "application server" 1258. Both debug servers 1236 and 1256 contain Operating System (OS) interfaces that allow the debug servers to talk to the operating system of their respective computers. Because application client 1238 and application server 1258 are located on different computers, the system of FIG. 12 is called a "distributed system." Each of debug client 1217, debug servers 1236 and 1256, application client 1238, and application server 1258 preferably are implemented as "processes" (also called "programs") executing on their respective computers. Although only one application process is shown in the memories of computers B and C, a plurality of processes can be present and/or executing in computers B and C.

The following paragraphs discuss the operation of a debugger in containing a GUI in accordance with a second preferred embodiment of the present invention. The described debugger allows a human user to display various levels of views of an executing application. For example, the debugger allows the user to debug the client-server application program 1238/1258 of FIG. 12. The second preferred embodiment allows the user to display a call graph (also called a "callmap") similar to that of the call graph described above. A description of the call graph and lower level debug functions will not be repeated herein.

The present invention allows a user to see a "bird's eye view" of the application being debugged. In the present invention, debug client 1217 manages the display of the debugger on display 1222 and manages user input. Debug servers 1236 and 1256 obtain information about processes and resources resident on the computer on which the Server is running. The debug client and debug servers communicate to transmit information relevant to the execution of the application being debugged. Thus, the present invention allows a user to see a "bird's eye view" of the application being debugged.

The present invention can be implemented using any conventional windowing system, and the details of displaying windows and receiving user input via the windows will not be discussed herein. It will be understood that, although the present invention is described in terms of tool bar buttons and pull-down menus, any appropriate graphical mechanisms may be used to initiate the actions of the debugger.

Figure 13A:
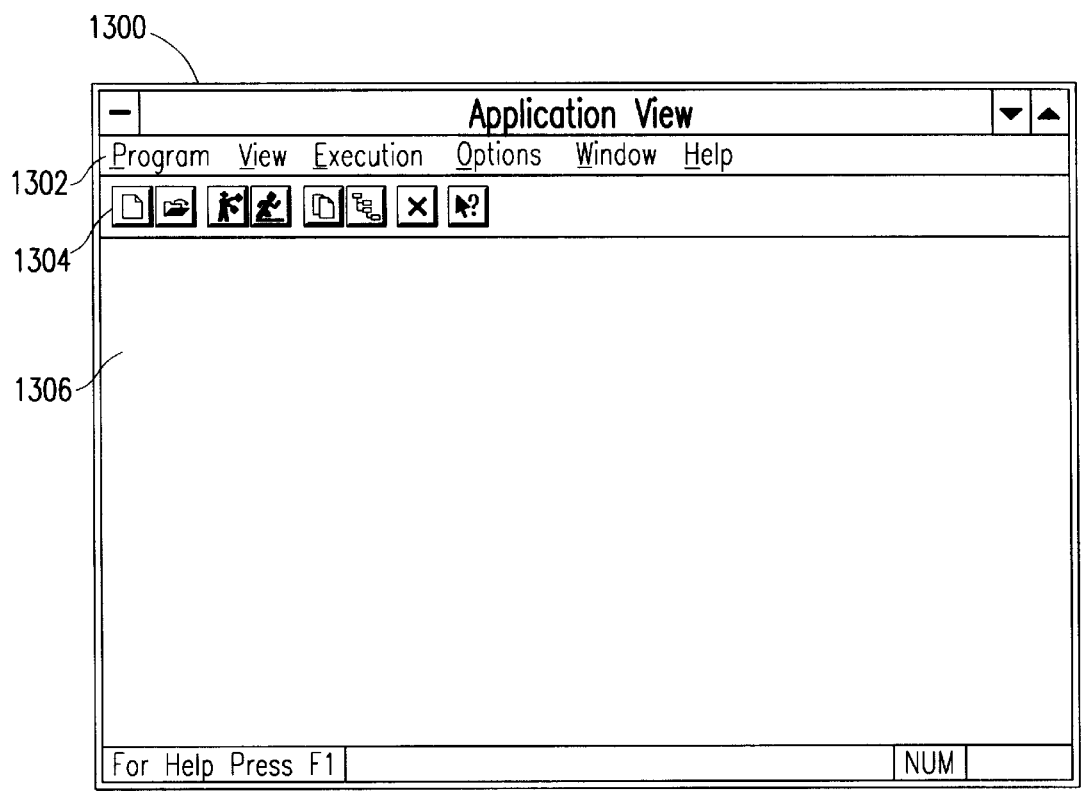
FIGS. 13(a) and 13(b) show an Application View window displayed on a display screen when the debugger of the present invention is initiated.
Figure 13B:
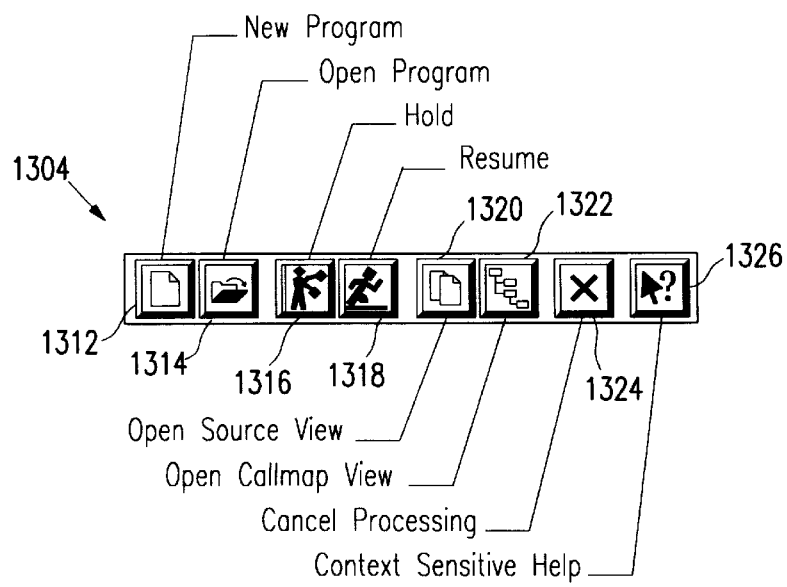

FIG. 13, comprising FIG. 13(a) and FIG. 13(b), shows an "Application View" window that is displayed on a display screen when the debugger is first initiated. An Application View allows the user to see each process of an application (if the user so chooses) and shows the "resources" associated with each process. FIG. 13(a) shows a menu bar 1302 that contains pull-down menus. Some of the entries in the pull-down menus are discussed below. Others (such as "help") are conventional and will not be discussed in detail. FIG. 13(a) also shows details of a "tool bar" 1304, which is shown in more detail in FIG. 13(b), and a display area 1306.

Tool bar 1304 includes eight buttons: a new program button 1312; an open program button 1314; a hold button 1316; a resume button 1318; an open source view button 1320; an open callmap view button 1322; a cancel processing button 1324; and a help button 1326. The effect of clicking on the first seven buttons 1312–1324 will be discussed below in connection with FIGS. 15–31. Help button 1326 initiates a standard help function and is not discussed herein in detail.

Figure 14:
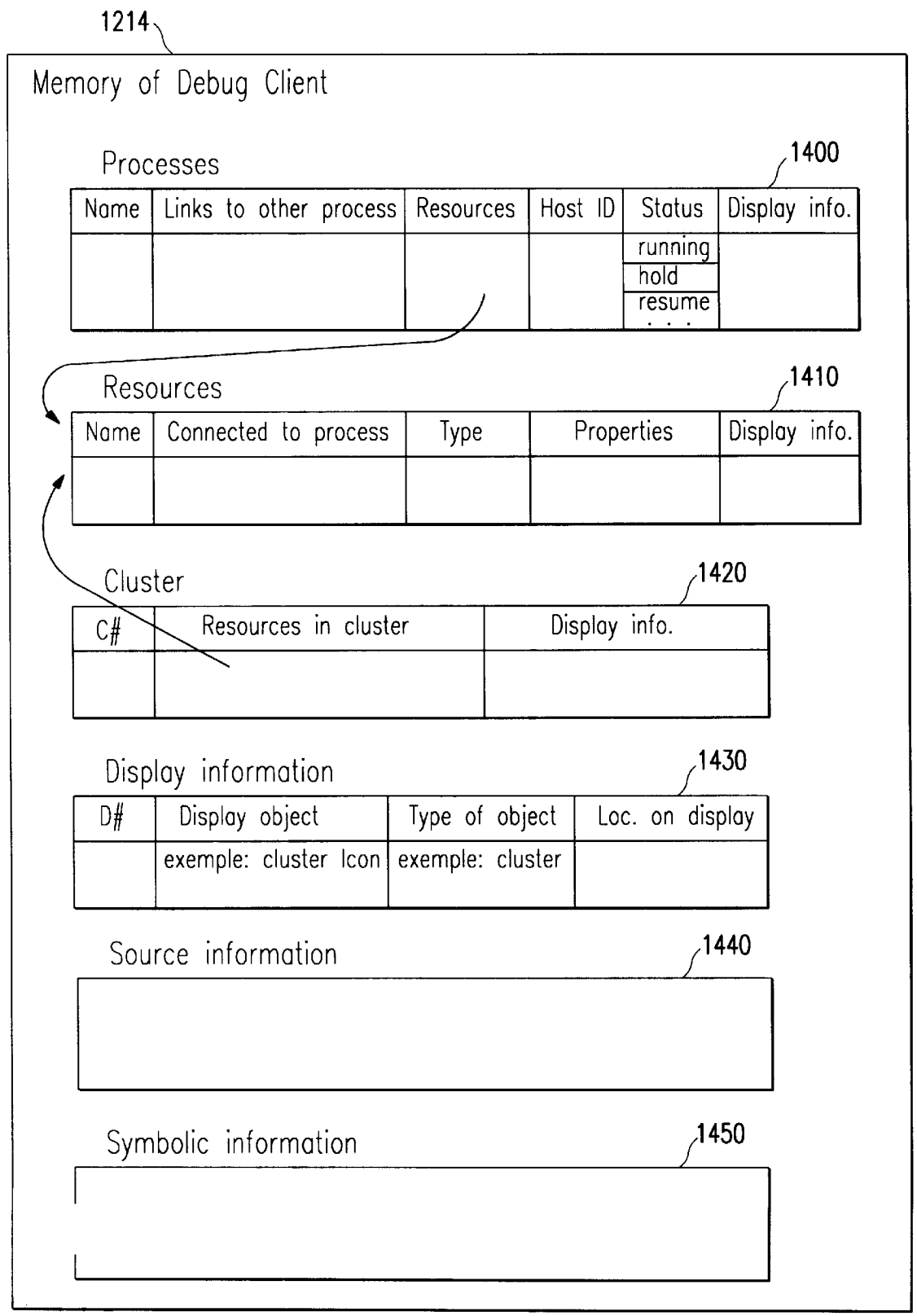
FIG. 14 illustrates memory organization within a debug client of the present invention.

FIG. 14 illustrates memory organization within a debug client of the present invention. Memory 1214 includes data structures containing information 1400 about processes being debugged; information 1410 about resources associated with those processes; information 1420 about clusters of resources displayed (see FIGS. 20–22) information 1430 relating the items displayed on the display to processes, resources, etc. being debugged; source code information 1440; and symbolic information 1450 (see above discussion of call graph). The types of information shown in FIG. 14 are exemplary only. Any appropriate information required for operation of the debugger can be stored in memory 1214.

The following paragraphs discuss the effect of clicking on the first seven buttons 1312–1324 of FIG. 13. Clicking on a button affects the information shown on the display and may result in communication between the debug client and the debug server.

Figure 32:
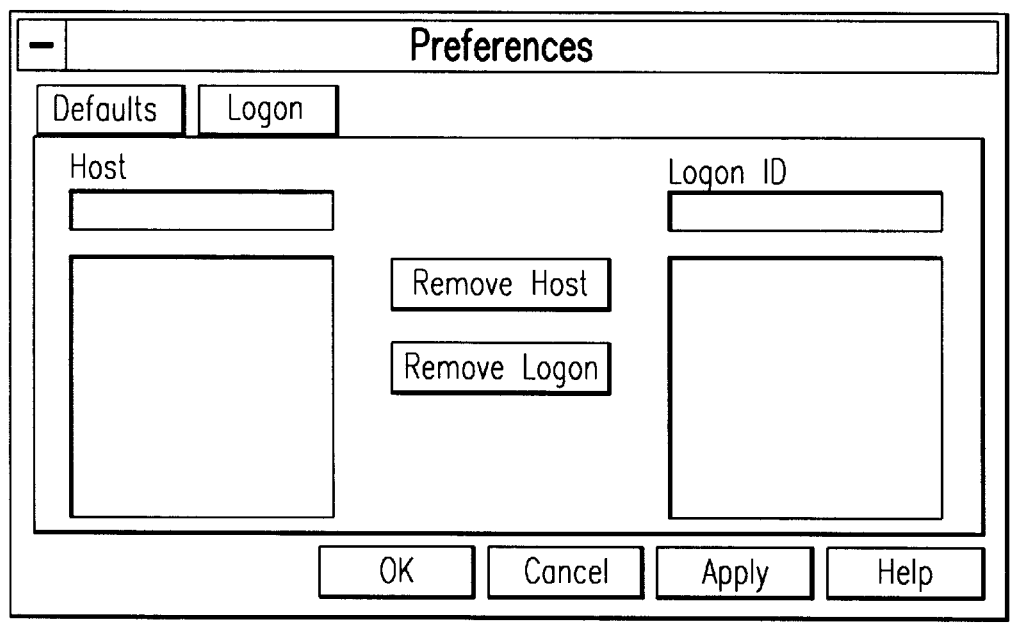
FIG. 32 shows a Logon Preferences dialog box displayed on the display screen during operation of the debugger.

As discussed above, when the debugger is first initiated, it displays the Application View of FIG. 13, with display area 1306 blank. At such a time, a process to be debugged may or may not be running. In the described embodiment, before the user can debug, he must log on to the host(s) on which the process(es) to be debugged are present. FIG. 32 shows a "logon" dialog box that preferably is opened by a pull-down menu. The user enters one or more host names (for example, the host names of computers A and B of FIG. 12) and supplies his user name and password. The debug client sends this information to the host system, which validates the user name and password. If the user name and password are valid, the host computer initiates a debug server on the host system.

Figure 15:
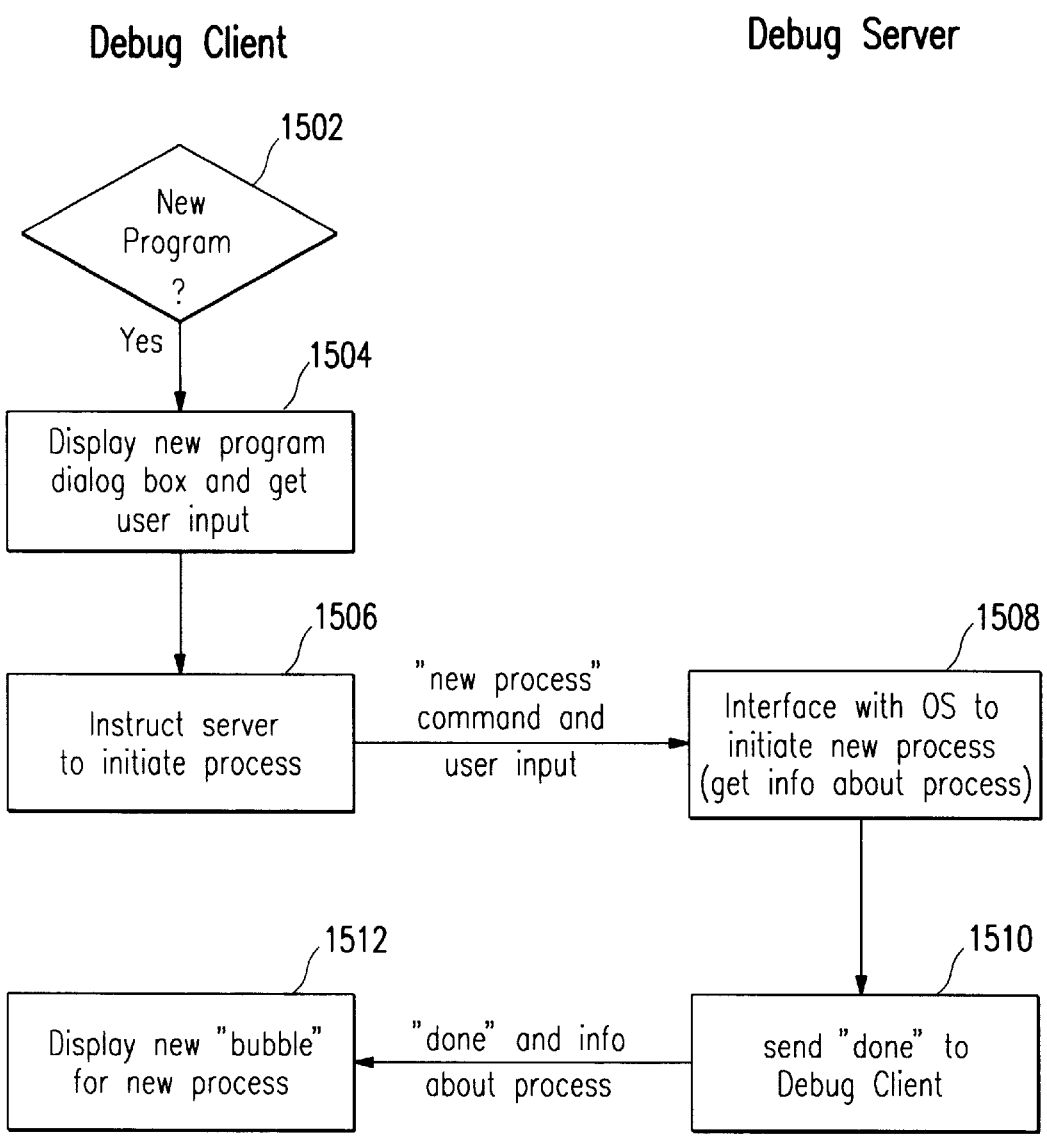
FIG. 15 is a flow chart showing steps performed by the debug client and the debug server when a user selects a "new program" operation.
Figure 17:
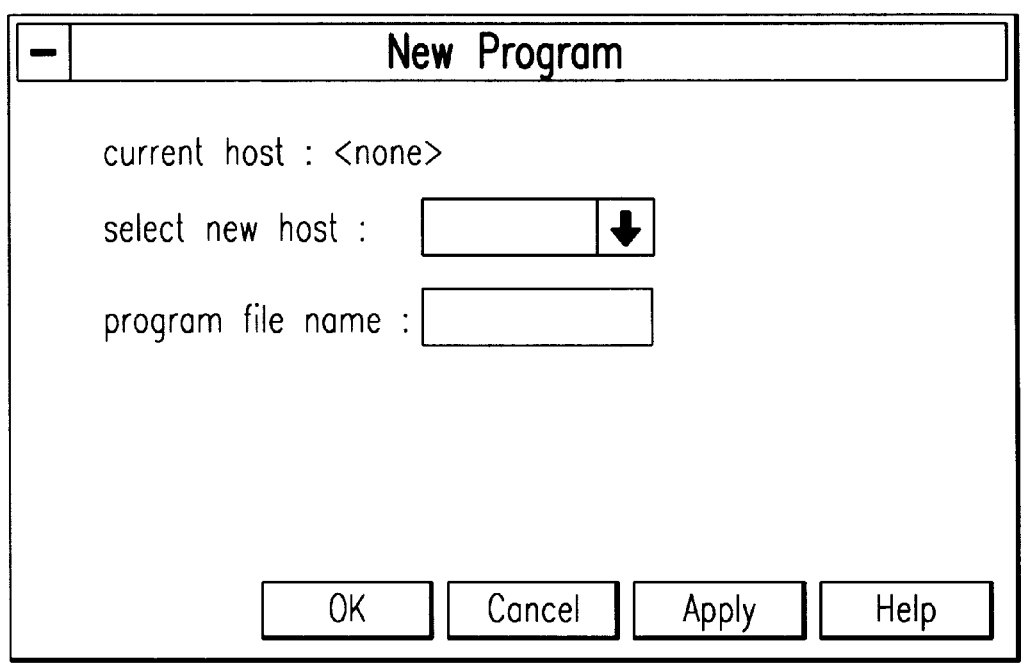
FIG. 17 shows a New Program dialog box displayed on the display screen during operation of the debugger.

"New program" button 1312 allows the user to initiate a process. In FIG. 15, when the button 1312 is clicked (step 1502), the New Program dialog box of FIG. 17 is displayed in step 1504 and the user inputs information required to identify the process to be initiated. This information may include, for example, the program file name to be debugged and the host name.

In step 1506, the debug client sends the input information to the appropriate debug server (e.g., Server 1236) over I/O channel 126. The debug server interfaces with the Operating System to initiate the new process in step 1508. The new process runs under control of the debug server. The debug server also performs a security check to ensure that the user is authorized to initiate the requested process. (This check is performed throughout the invention where applicable and will not be described hereafter). In step 1510, the debug server sends a "done" message to the debug client over I/O Channel 126. The debug server also sends relevant information, such as the Source code for the process and the symbolic information for the process (see discussion above). Once the new process has been initiated, the debug client displays a "bubble" for the new process (see, e.g., bubble 1902 of FIG. 19). In the described embodiment, a new process is started in a state of "hold". The user must "resume" the process as described below before execution of the process begins.

Figure 16:
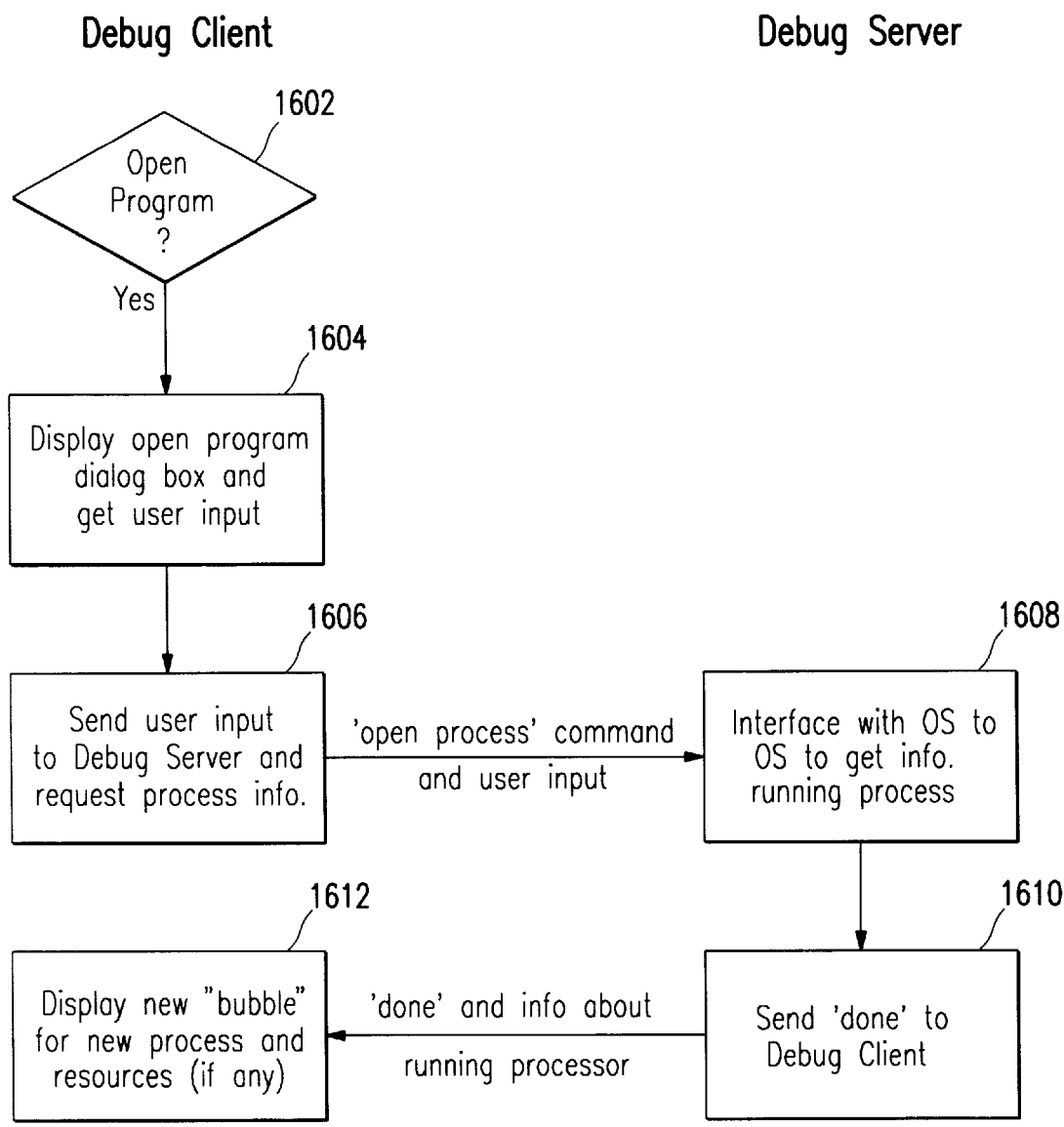
FIG. 16 is a flow chart showing steps performed by the debug client and the debug server when a user selects an "open program" operation.
Figure 18:
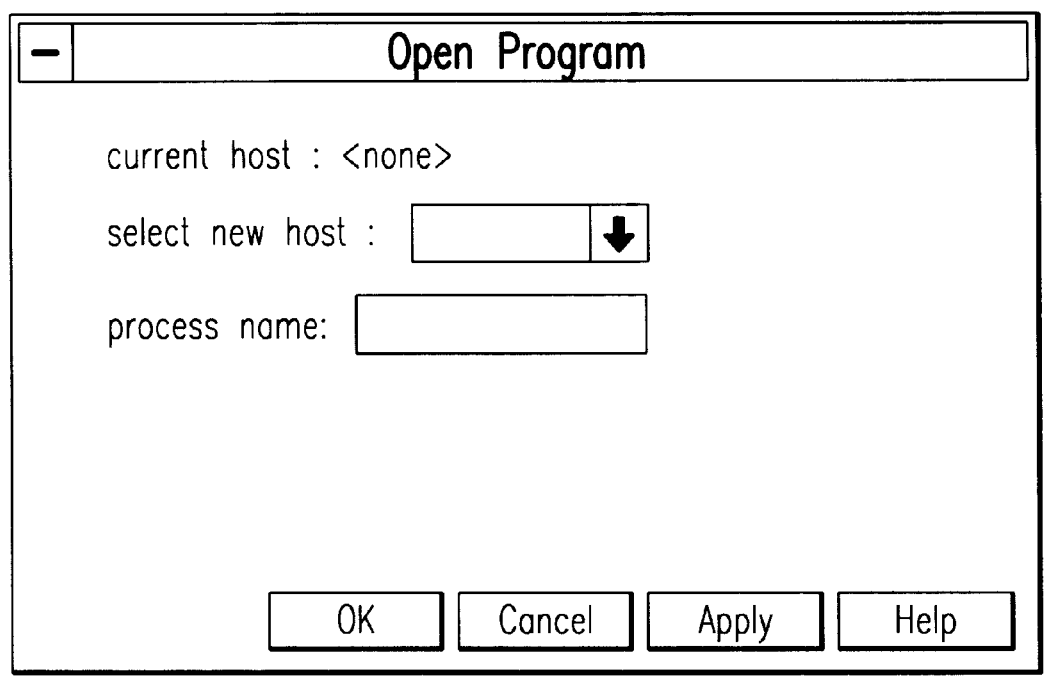
FIG. 18 shows an Open Program dialog box displayed on the display screen during operation of the debugger.

When the debugger is first initiated, one or more processes may already be running. "Open program" button 1314 allows the user to begin debugging an already running process. In FIG. 16, when the button is clicked (step 1602), the Open Program dialog box of FIG. 18 is displayed in step 1604 and the user inputs information required to identify the process to be debugged. This information may include, for example, the process name of the process to be debugged and the host name. In step 1606, the debug client sends the input information to the appropriate debug server (e.g., Server 1236) over I/O channel 126. The debug server interfaces with the Operating System to obtain information about the new process in step 1608 and to obtain information about resources currently being used by the process. In step 1610, the debug server sends a "done" message to the debug client over I/O Channel 126. The debug server also obtains and sends relevant information, such as the source code for the process and the symbolic information (see discussion above). Once the information has been received, the debug client displays a "bubble" for the new process (see, e.g., bubble 1902 of FIG. 19) and the resources of the process (e.g., file resource 1906).

Figure 19A:
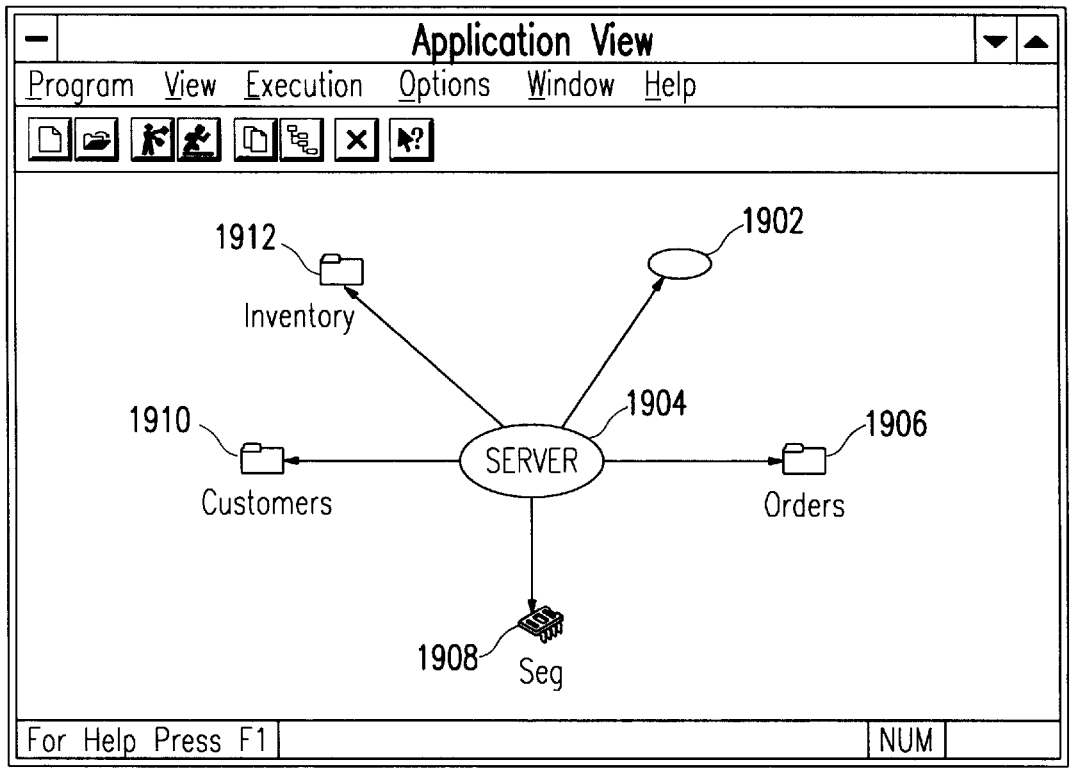
FIGS. 19(a) aid 19(b) show the Application View window displayed on the display screen during operation of the debugger.
Figure 19B:
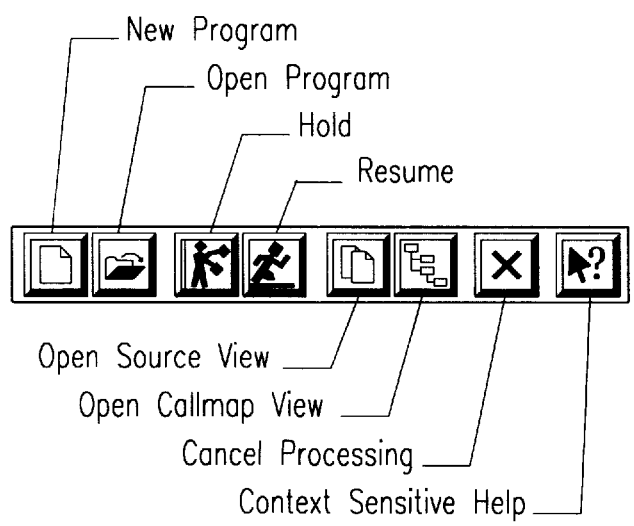
Figure 20:
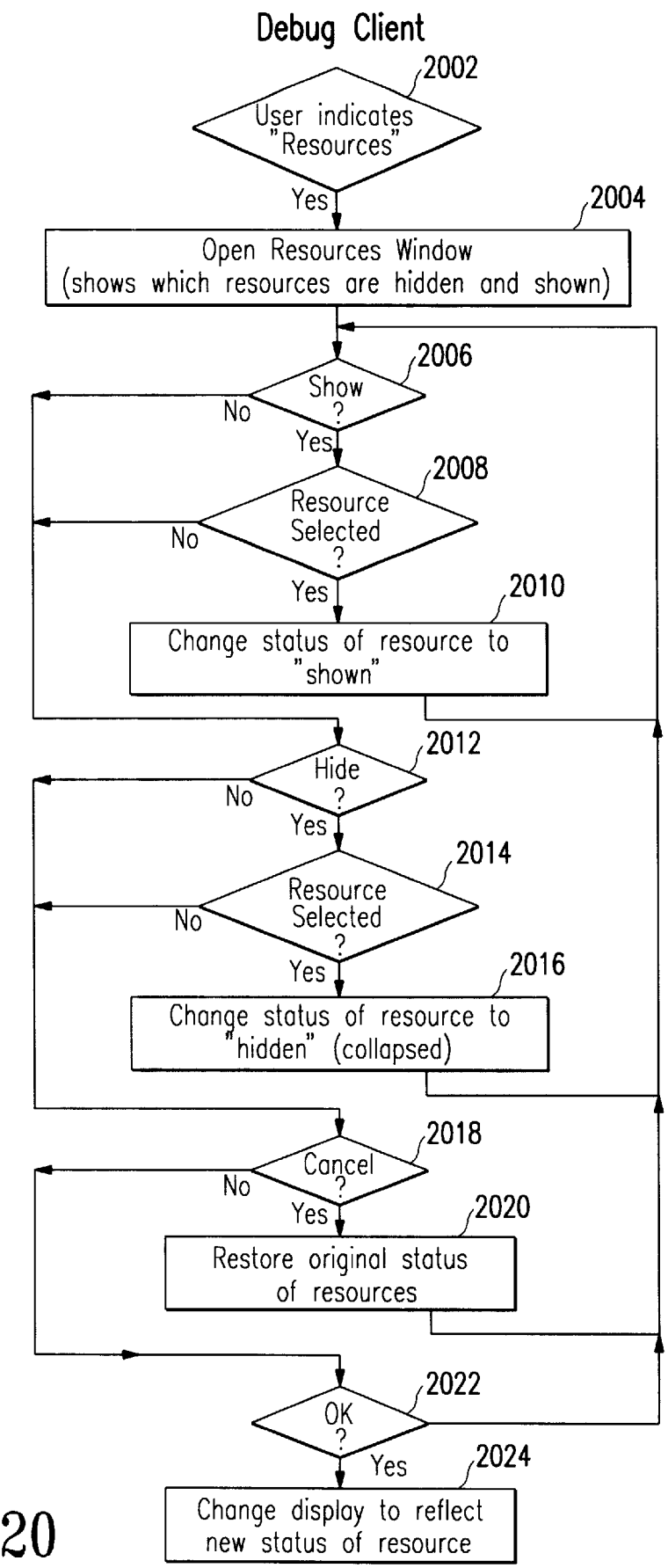
FIG. 20 is a flow chart showing steps performed by the debug client when a user selects a "resources" operation, including a clustering operation."

A preferred embodiment of the present invention can display four types of resources: files, memory segments, communication link/queues, and peripherals. As shown in FIG. 19, each type of resource has an identifiable display icon. Each resource associated with a process is displayed as connected to the process's bubble. Arrows on the connecting arcs indicate whether the resource is for input, output, or both to/from the process. A process that communicates with another process is connected to that process by a directed arrow (e.g., in FIG. 19, client calls server). FIG. 19 shows two processes 1902, 1904, three file resources 1906, 1910, and 1912, and a memory segment 1908. The directed arrows between processes represent communication links.

In the described embodiment, resources on the display are not updated as soon as a process opens or closes a resource. Instead, the display of resources and processes is updated when the process enters a "hold" state, as would result from it encountering a breakpoint, incurring a run-time trap, completing an execution step command, or from the user entering a "hold" command. Under certain circumstances, the display also is updated as a result of occurrences in the debug server, as described below.

Figure 22:
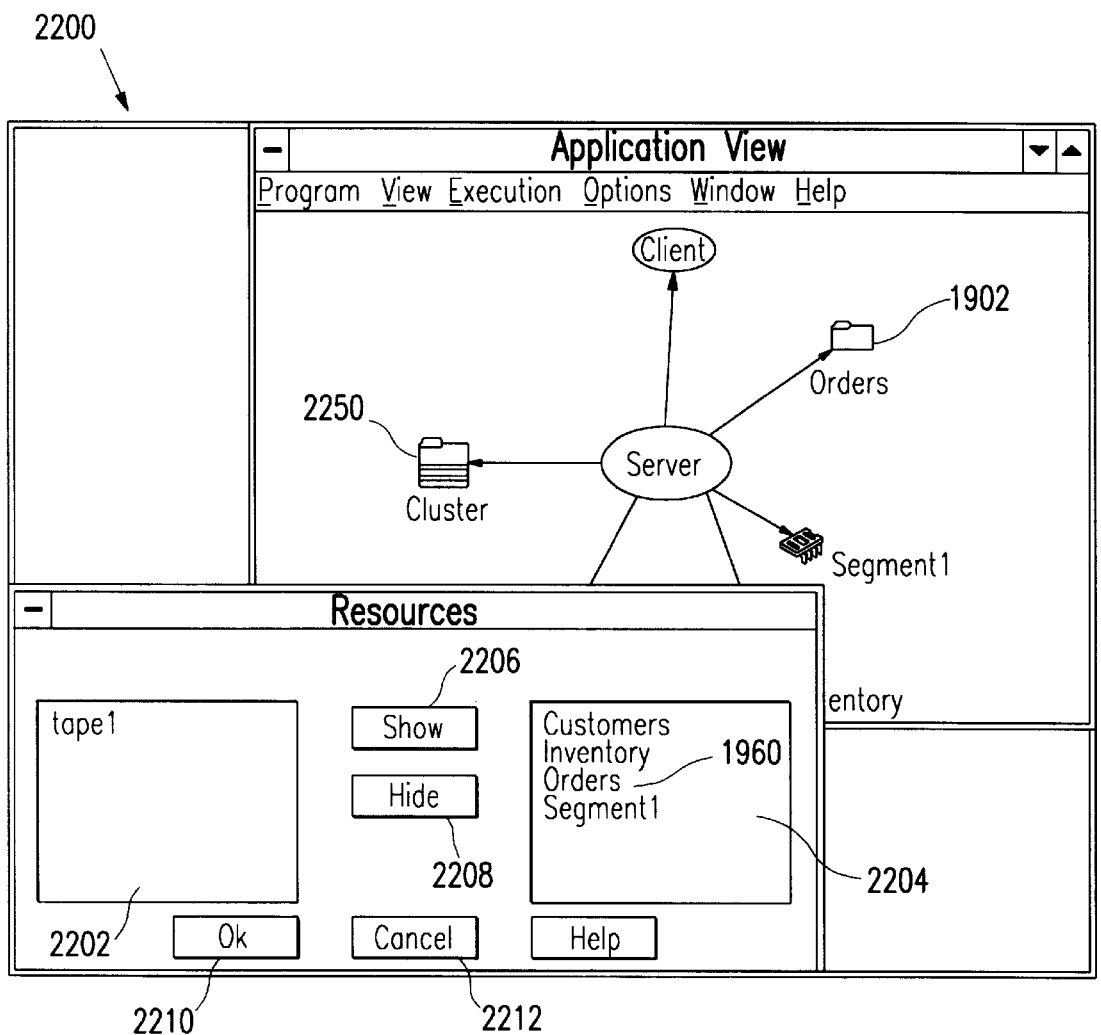
FIG. 22 shows the Application View window displayed on the display screen during operation of the debugger, and a Resources dialog box displayed on the display screen.

The present invention includes a feature that allows the user to unclutter the display of FIG. 19 if the user so desires. As shown in step 2002 of FIG. 20, if the user selects "Resources" from a pull-down menu (not shown), the debug client displays a Resources window 2200 of FIG. 22. Resources window 2200 includes a Collapsed area 2202 and a Visible area 2204. Each area contains the names of resources that are "visible" or "hidden" (also called "clustered" or "collapsed"). In FIG. 22, all resources that are hidden are represented on the display by a "briefcase" cluster icon 2250. In the example, cluster icon 2250 represents a collection of resources, e.g, resource "tape1". Each of the "visible" icons in visible area 2204 has its own resource icon in the display.

The user can change which icons are hidden and which are shown. If a particular resource icon is selected by clicking on the resource name (e.g., name 1960) and the user clicks the "show" button 2206 (steps 2006 and 2008), the debug client moves the name of the resource into visible area 2204 in step 2010. If a particular resource icon is selected by clicking on the resource name (e.g., resource name 1960) and the user clicks the "hide" button 2208 (steps 2012 and 2014), the debug client moves the name of the resource into collapsed area 2202 in step 2016. In a preferred embodiment, the user cannot select an icon if the Resources dialog is active. Only entries in each of the respective list boxes can be selected.

If the user clicks on "cancel" button 2212 in step 2018, the resources are restored to the hidden/visible status that they had when the Resources window was first entered. If the user clicks on "OK" button 2210 in step 2022, the hidden/visible status of the resources are stored in memory 1214/1410 and the display is updated to reflect the hidden/visible status of the resources.

Figure 21:
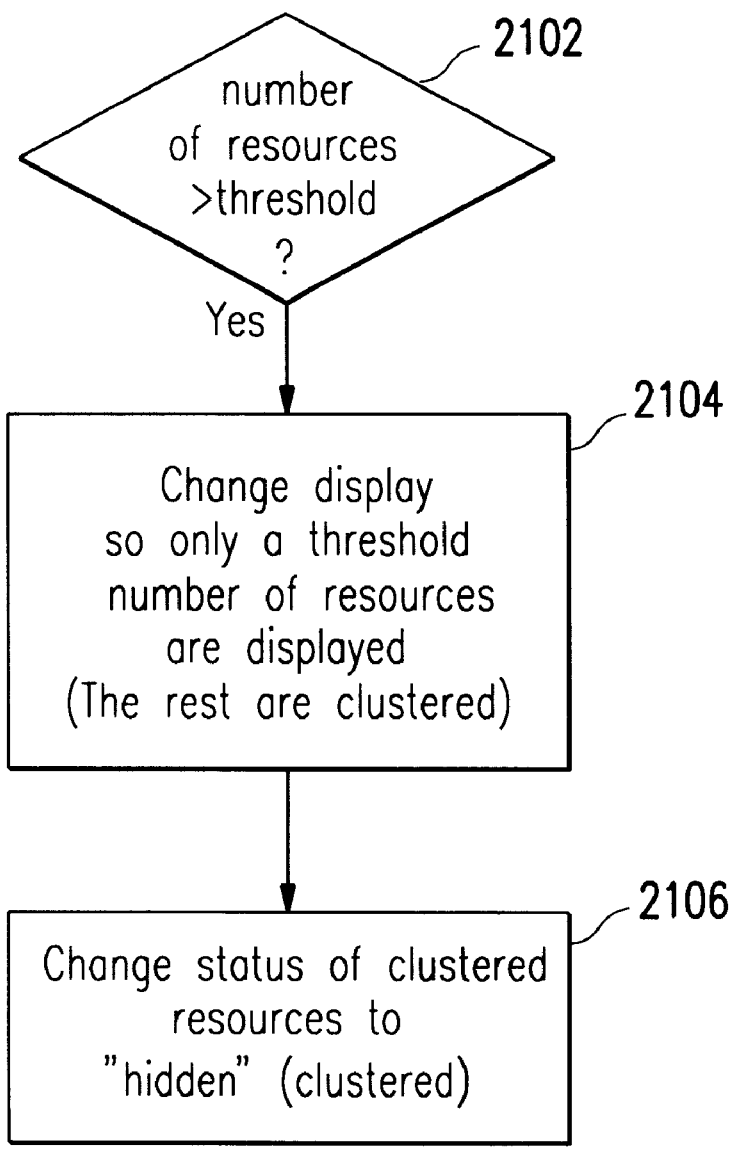
FIG. 21 is a flow chart showing steps performed by the debug client when a number of resources to be displayed exceeds a predetermined threshold.

In addition, the present invention automatically unclutters the display under certain circumstances. As shown in FIG. 21, the debug client automatically clusters resources if the number of resources to be displayed exceeds a predetermined threshold. This threshold preferably can be set by the user. For example, if the number of resources to be displayed per process is greater than five (step 2102), the first five resources are displayed as individual resource icons and the remainder are displayed as a collection represented by the cluster icon (step 2104). The memory of the debug client is also updated to indicate the fact that certain resources are clustered.

Figure 23:
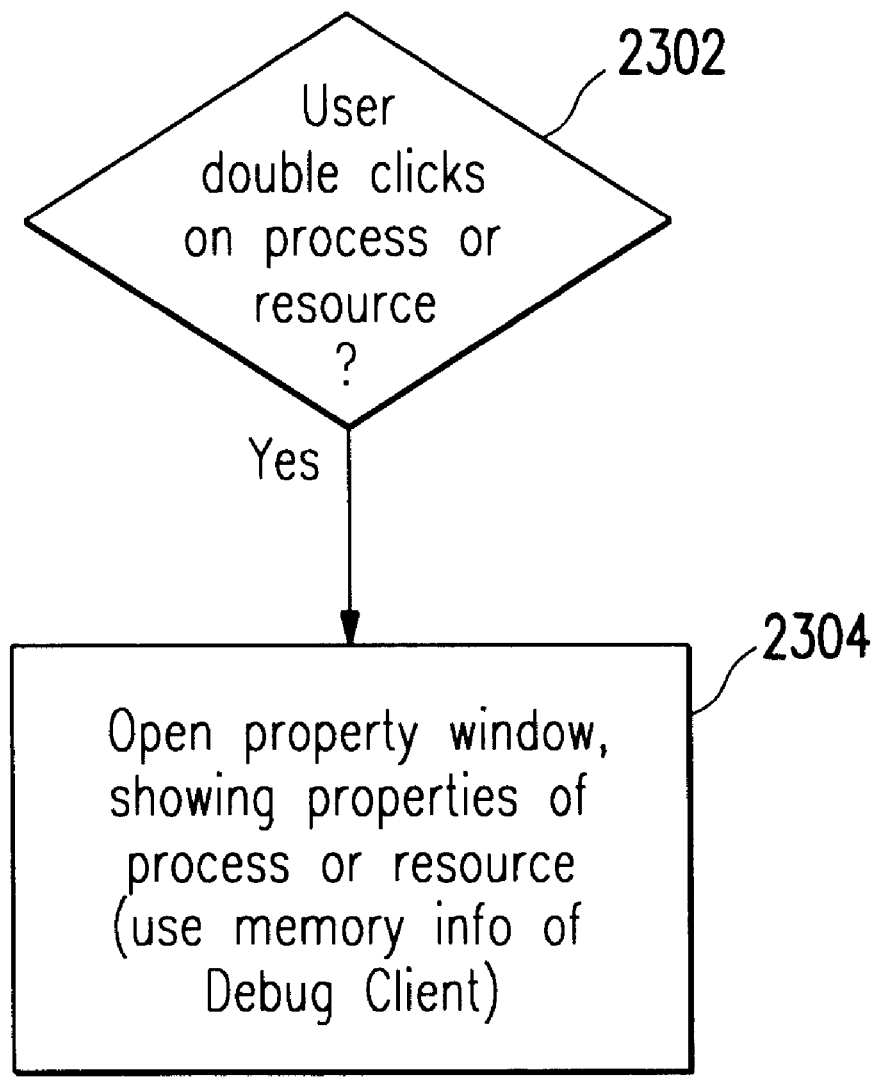
FIG. 23 is a flow chart showing steps performed by the debug client when a user selects a displayed process or resource.
Figure 24:
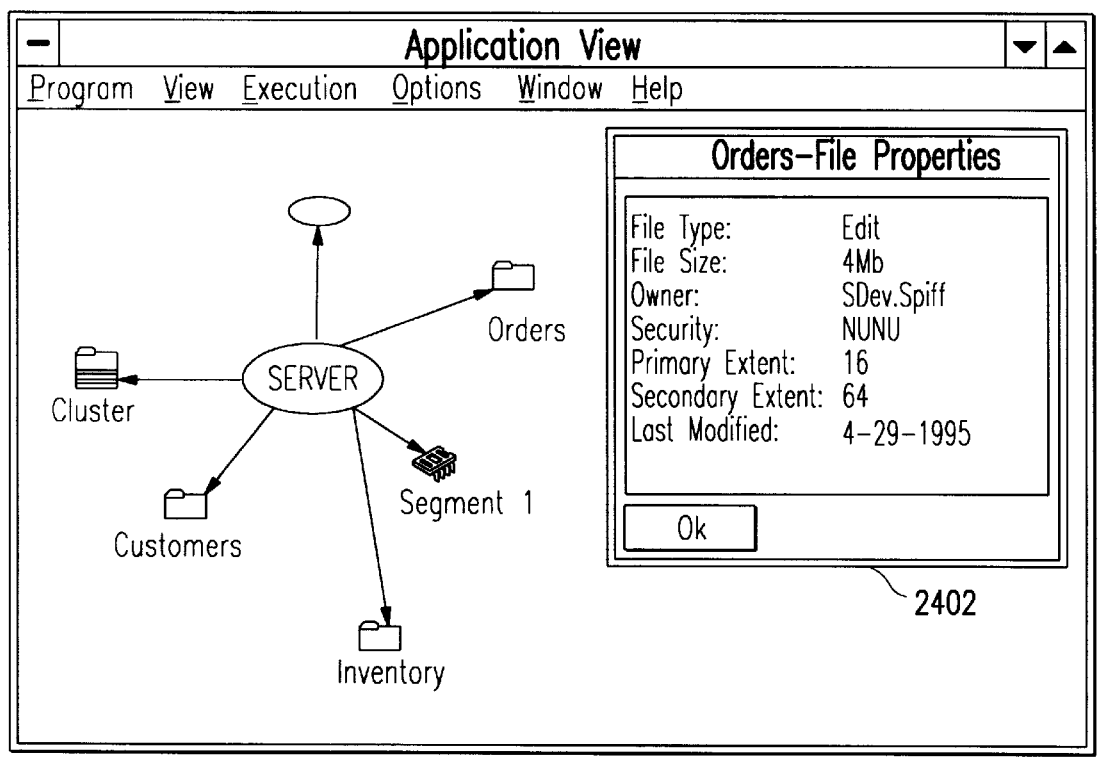
FIG. 24 shows the Application View window displayed on the display screen during operation of the debugger, and a Properties dialog box displayed on the display screen.

Once the display of FIG. 19 has been displayed, the user can find out information about specific processes or resources. FIG. 23 is a flow chart showing steps performed by the debug client when a user selects a displayed process or resource. The user can display the properties of a process or resource by single clicking the icon for the process or resource and clicking on a pull-down menu item (not shown) (or by some similar selection operation) (step 2302). Once the process or resource is selected, the properties dialog box, such as box 2402 of FIG. 24, is displayed by the debug server in step 2304. Appropriate property information is displayed when a resources window is opened for each type of resource and process. For example, properties of a process would include its name, its process ID, the timestamp when it began executing, its execution priority, etc. Properties of a memory segment might include, e.g., its size when it was associated with the process, its status, the segment ID, etc.

Figure 25:
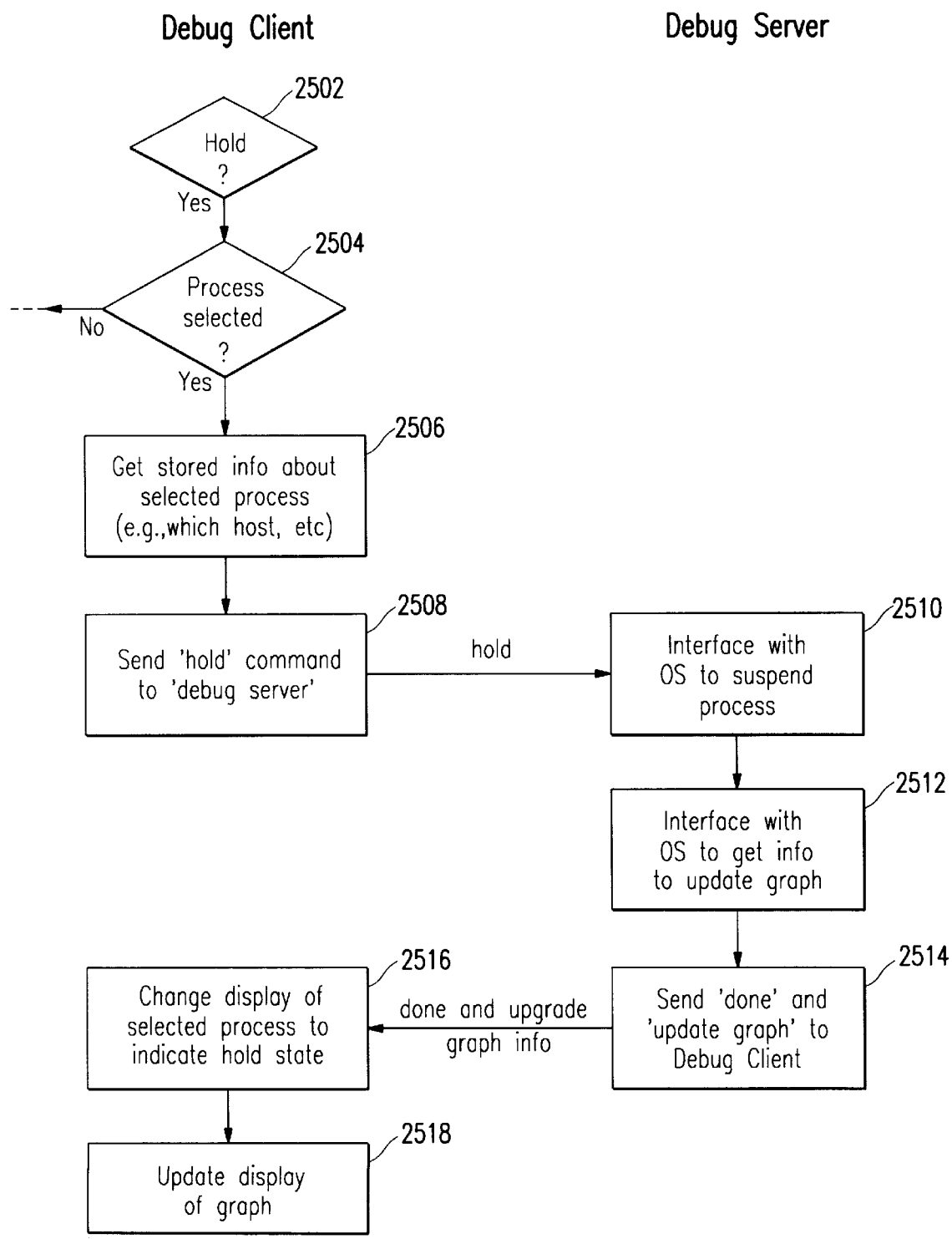
FIG. 25 is a flow chart showing steps performed by the debug client and the debug server when a user selects a "hold" operation.

The following paragraphs continue the description of the effect of the toolbar buttons of FIG. 13. FIG. 25 is a flow chart showing steps performed by the debug client and the debug server when a user selects a "hold" operation. If, in steps 2502 and 2504, "hold" button 1316 is clicked and one or more processes are selected, the debug client retrieves information stored in its memory that corresponds to the selected process (See FIG. 14). This information may, for example, identify on which host the process is executing. The debug client sends the information and a "hold" command to the appropriate debug server in step 2508.

In step 2510, the debug server uses the information to interface with the Operating System to suspend the process. In step 2512, the debug server interfaces with the OS to obtain the name of currently executing processes and resources for those processes. In step 2514, the debug server sends a "done" message and the obtained information to the debug client. In step 2516, the display is changed to indicate that the selected process is in a "hold" state. For example, the process icon of the held process may be "ghosted" or displayed in a different color. In step 2518, the debug client uses the obtained information to update its display of processes and resources. Thus, as discussed above, the described embodiment updates the graphics display only at certain times.

Figure 26:
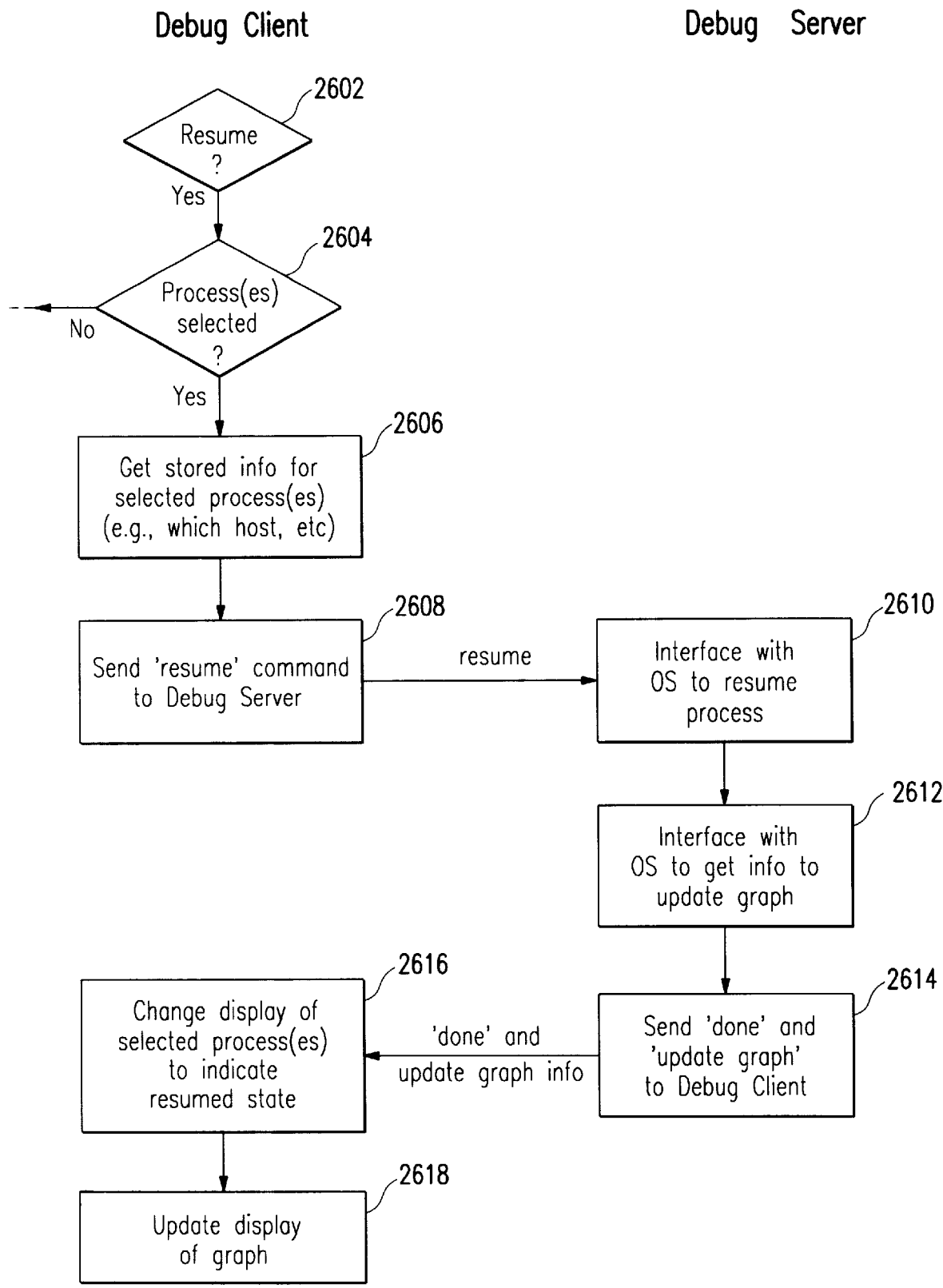
FIG. 26 is a flow chart showing steps performed by the debug client and the debug server when a user selects a "resume" operation.

FIG. 26 is a flow chart showing steps performed by the debug client and the debug server when a user selects a "resume" operation. If, in steps 2602 and 2604, "resume" button 1318 is clicked and one or more processes are selected, the debug client retrieves information stored in its memory that corresponds to the selected process(es) (See FIG. 14). This information may, for example, identify on which host the process is executing. The debug client sends the information and a "resume" command to the appropriate debug server in step 2608.

In step 2610, the debug server uses the information to interface with the Operating System to resume the process. In step 2612, the debug server interfaces with the OS to obtain the name of currently executing processes and resources for those processes. In step 2614, the debug server sends a "done" message and the obtained information to the debug client. In step 2616, the display is changed to indicate that the selected process is in a "resume" executing state. In step 2618, the debug client uses the obtained information to update its display of processes and resources. Thus, as discussed above, the described embodiment updates the graphics display only at certain times.

Figure 27:
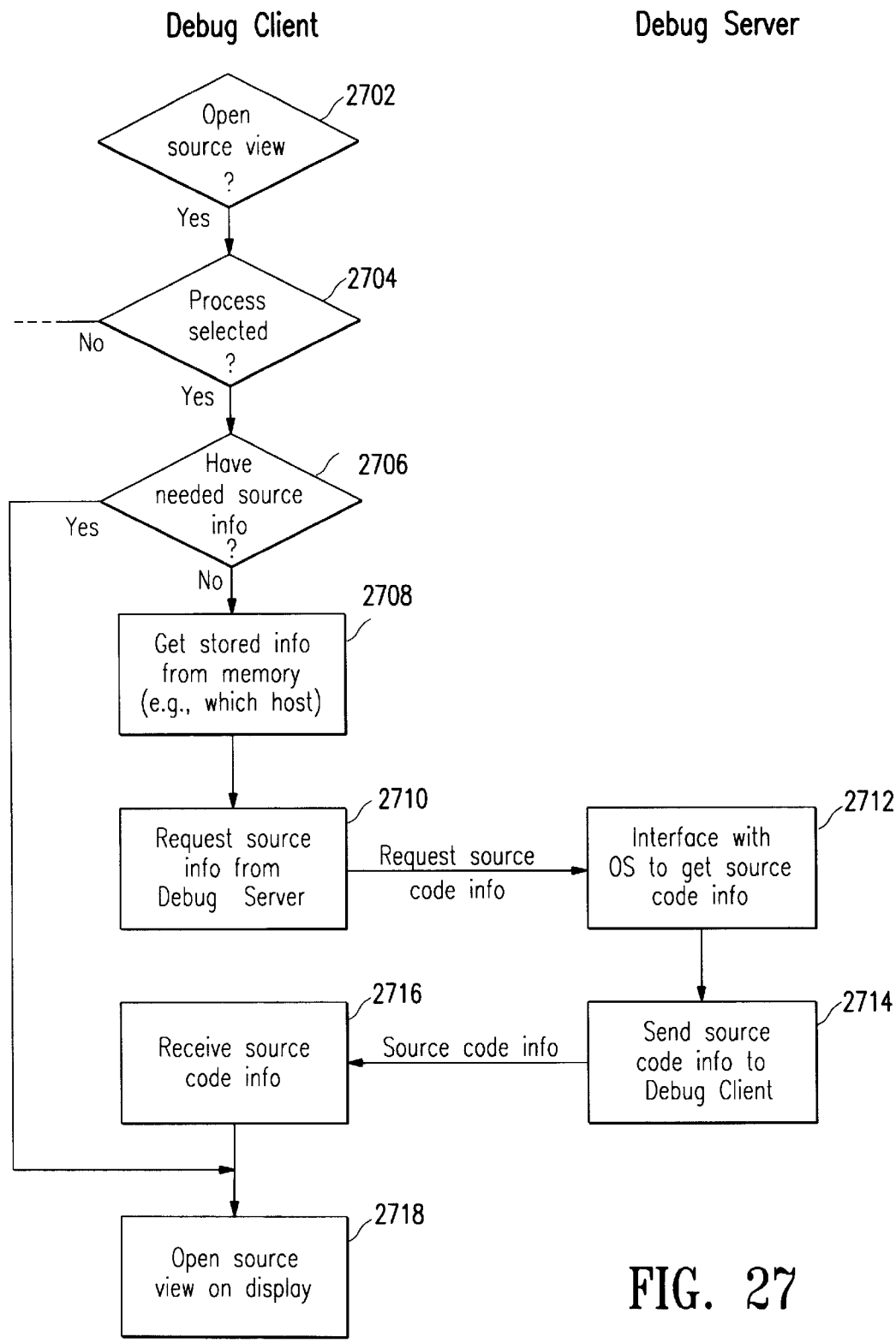
FIG. 27 is a flow chart showing steps performed by the debug client when a user indicates an Open Source View.
Figure 28A:
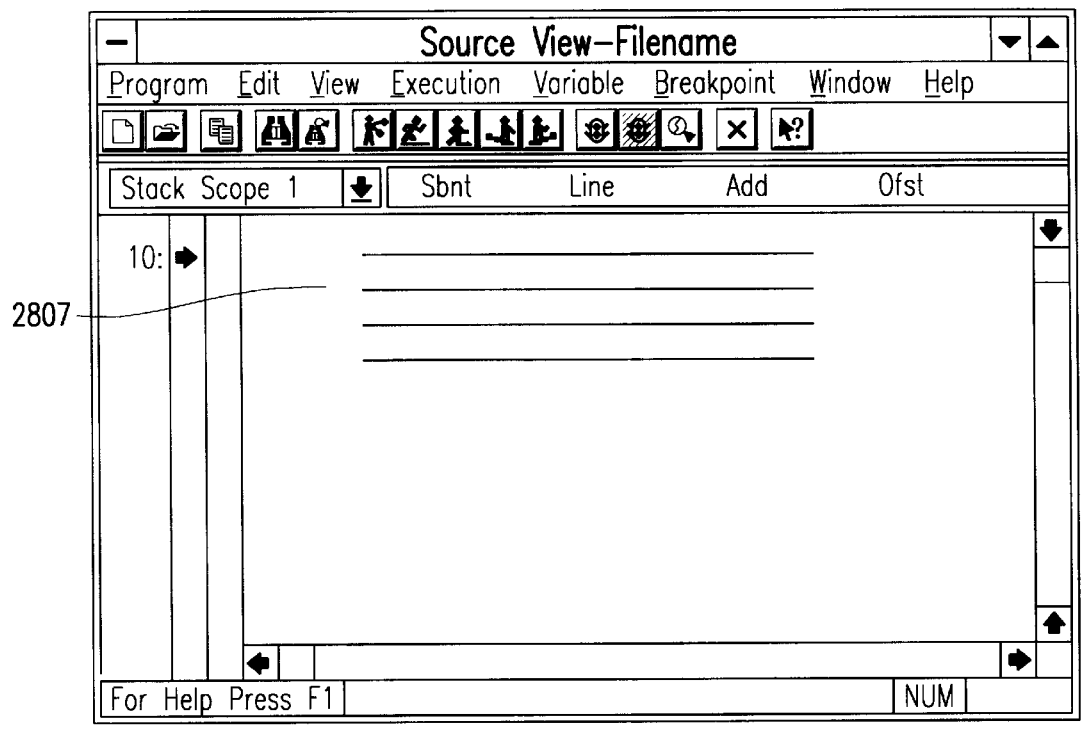
FIGS. 28(a) and 28(b) show the Open Source View window displayed on the display screen during operation of the debugger.
Figure 28B:
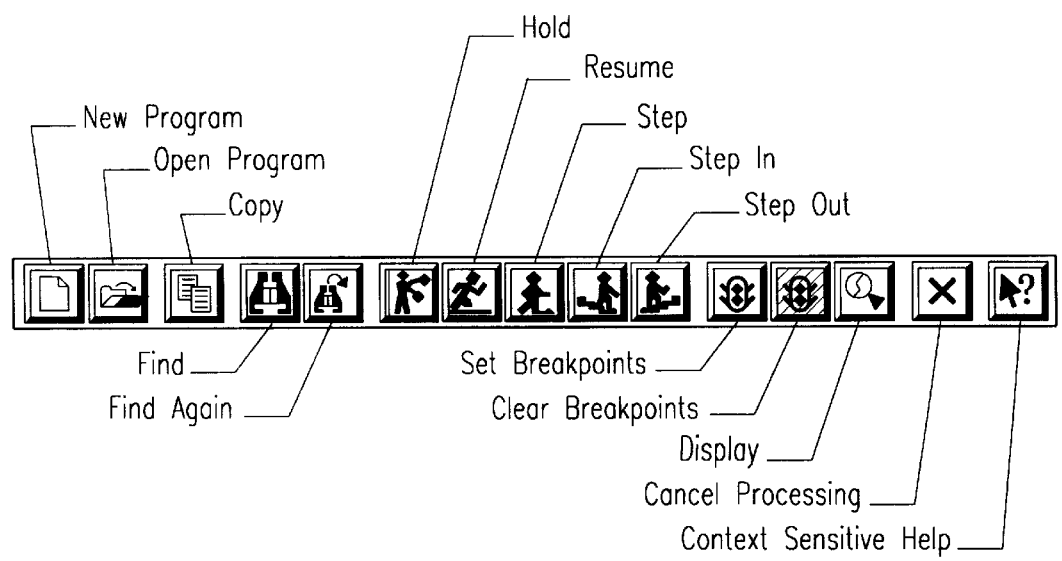

FIG. 27 is a flow chart showing steps performed by the debug client when a user indicates an Open Source View. FIG. 28 shows the Open Source View window displayed on the display screen during operation of the debugger. Horizontal lines in area 2802 in the figure represent source code text. The user may, for example, select a process and press a toolbar button to display the Open Source View. (Double clicking on a process icon opens the callmap view.) In step 2702, the user clicks on tool bar button 1320. The debug client checks that a process is selected (step 2704) and that the source code has previously been received from the debug server (step 2706). In step 2718, the source code for the process is displayed as shown in FIG. 28 and as discussed above. If the source code has not been previously received, then, in steps 2708 and 2710, the debug client gets information about the selected process from memory 1214 and requests the source information from the debug server (steps 2712–2716). In step 2718, the debug client opens the source view window and displays the source code information.

Figure 29:
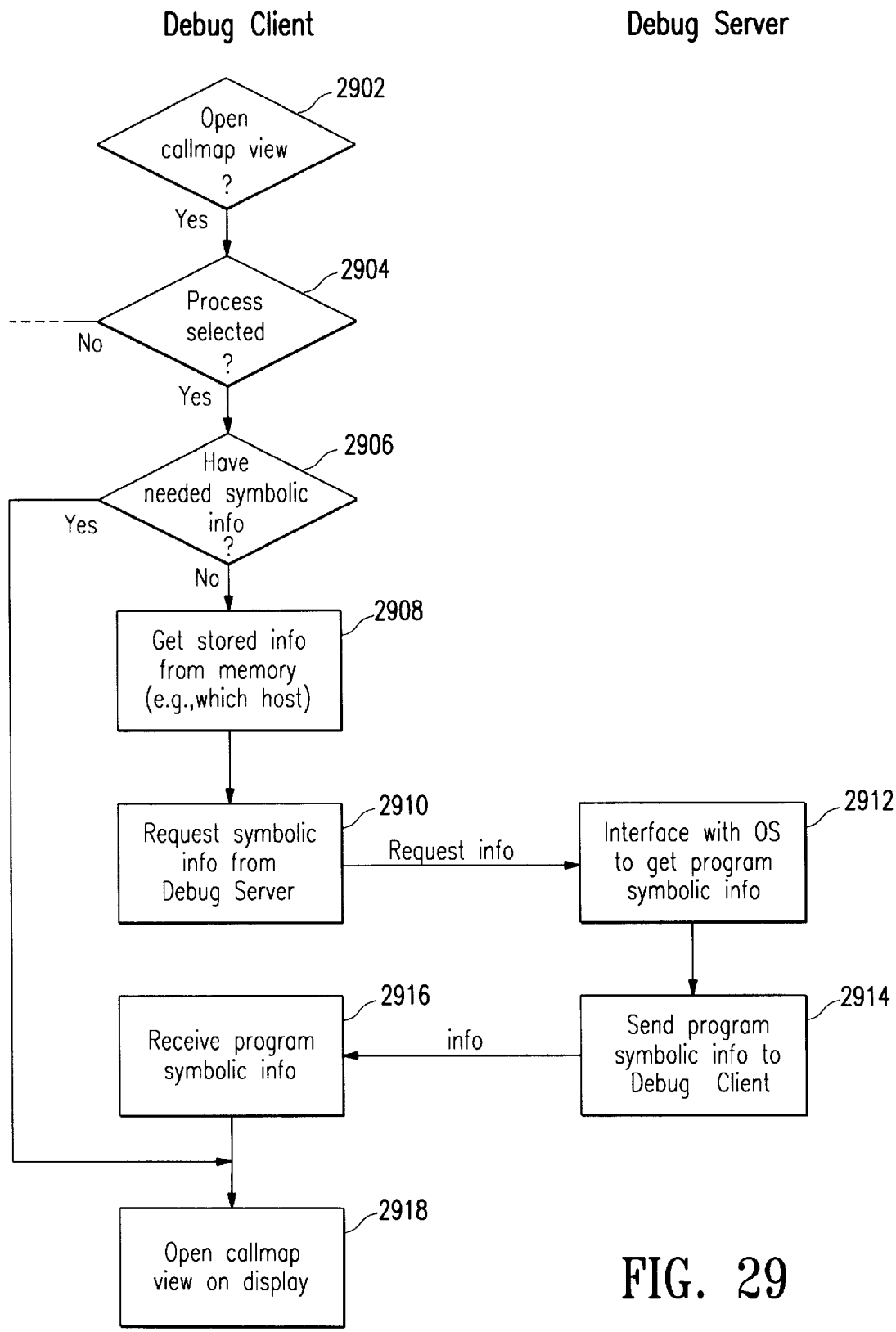
FIG. 29 is a flow chart showing steps performed by the debug client when a user indicates a Callmap View.
Figure 30A:
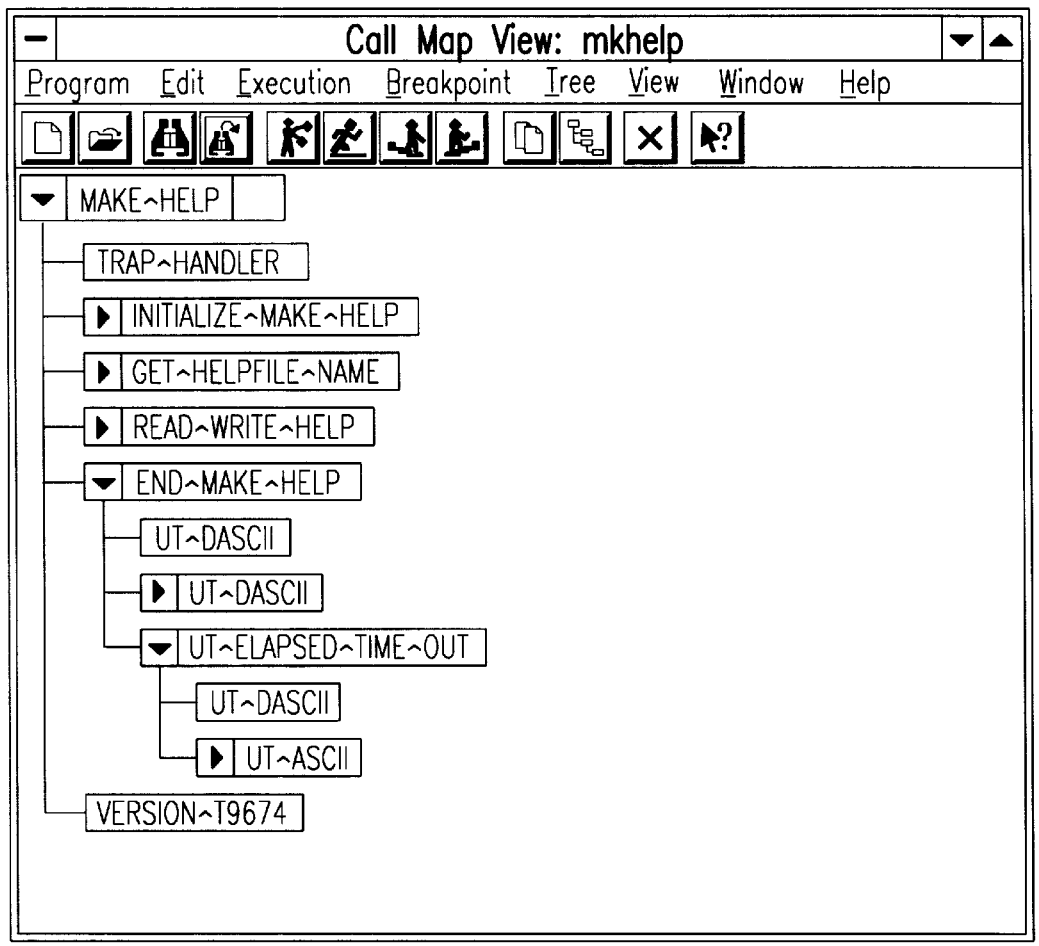
FIGS. 30(a) and 30(b) show the Callmap View window displayed on the display screen during operation of the debugger.
Figure 30B:
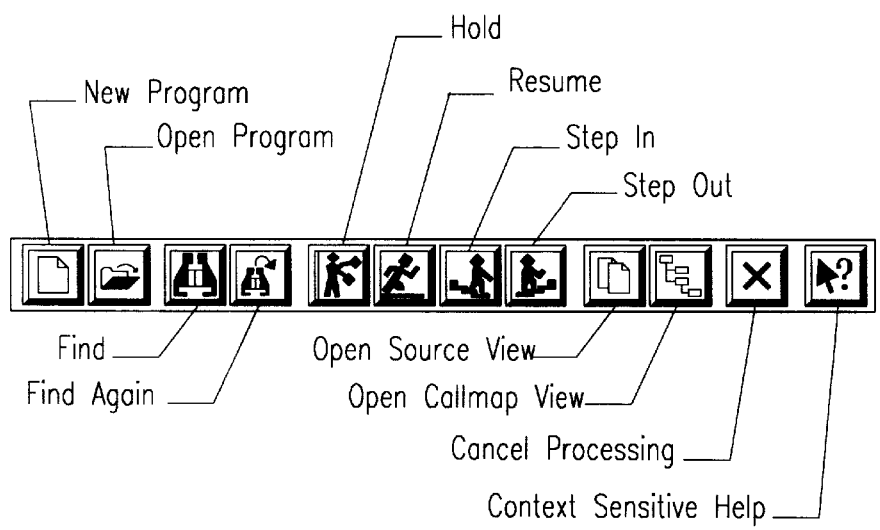

FIG. 29 is a flow chart showing steps performed by the debug client when a user indicates a Callmap View (also called a "call graph" view). The user may, for example, double click on the process icon or may use a toolbar button to display the Callmap View. FIG. 30 shows the Callmap View window displayed on a window screen during operation of the debugger. In step 2902, the user clicks on tool bar button 1322. If a process is selected (step 2904) and the symbolic information has been received from the debug server (step 2906), then in step 2918, the callmap view is displayed as shown in FIG. 30 and as discussed above. If the symbolic information has not been previously received, then, in steps 2908 and 2910, the debug client gets information about the selected process from memory 1214 and requests the symbolic information from the debug server (steps 2912–2916). In step 2918, the debug client opens the callmap view window and displays the call tree information.

As discussed above, this information can be displayed in several formats.

Figure 31:
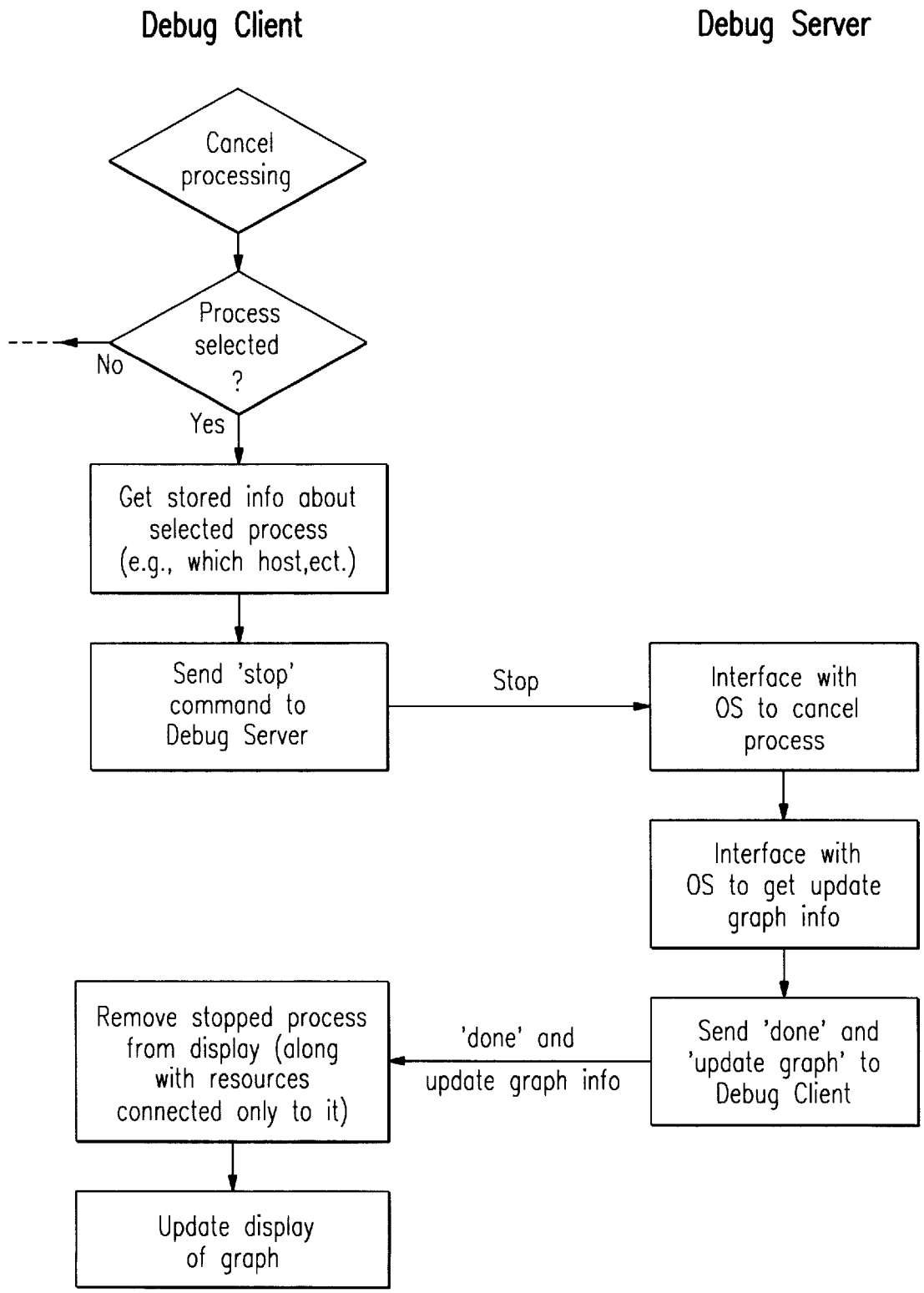
FIG. 31 is a flow chart showing steps performed by the debug client and the debug server when a user selects a "cancel" operation.

FIG. 31 is a flow chart showing steps performed by the debug client and the debug server when a user selects a "cancel" operation. These steps are performed when the user clicks "cancel processing" button 1324 and are similar to the steps performed for "suspend" and "resume."

Figure 33:
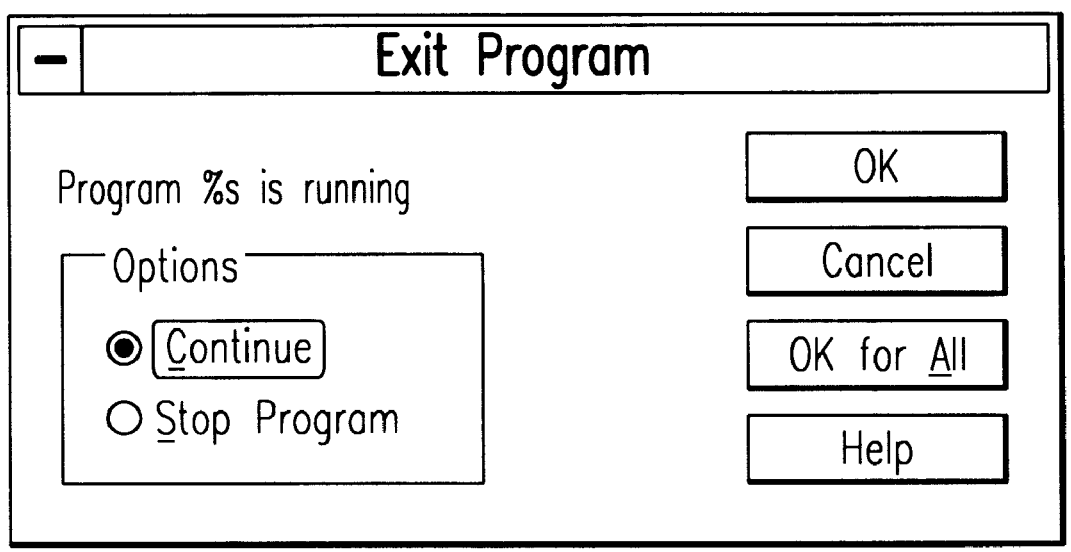
FIG. 33 shows an Exit dialog box displayed on the display screen during operation of the debugger.
Figure 34:
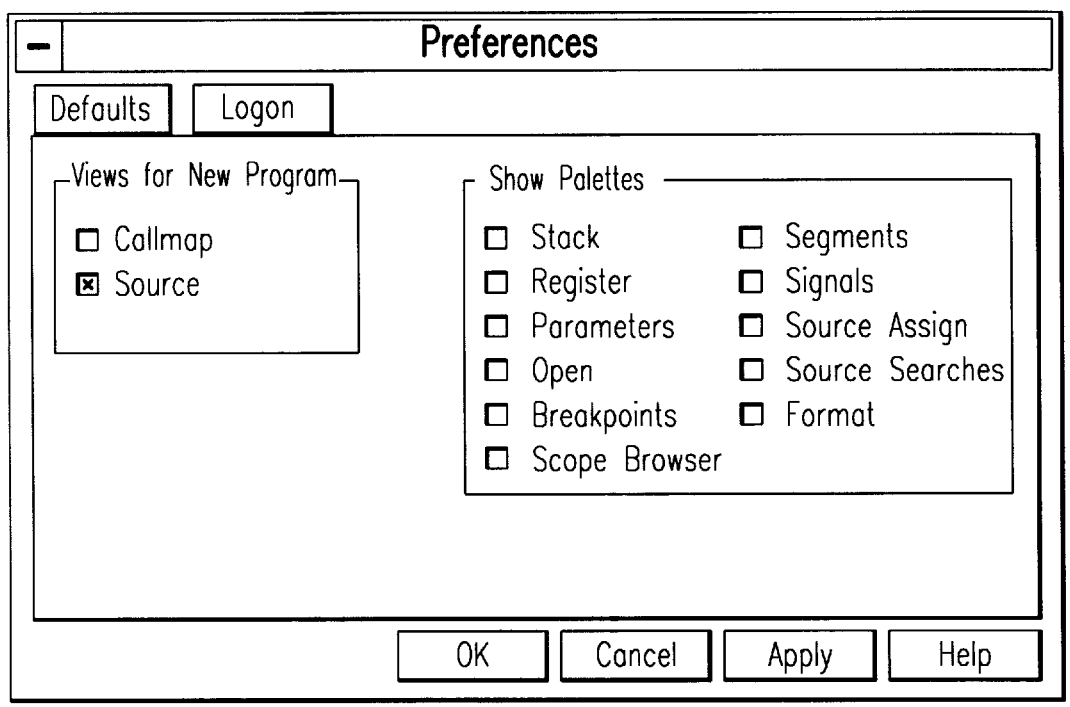
FIG. 34 shows a Defaults Preferences dialog box displayed on the display screen during operation of the debugger.
Figure 35:
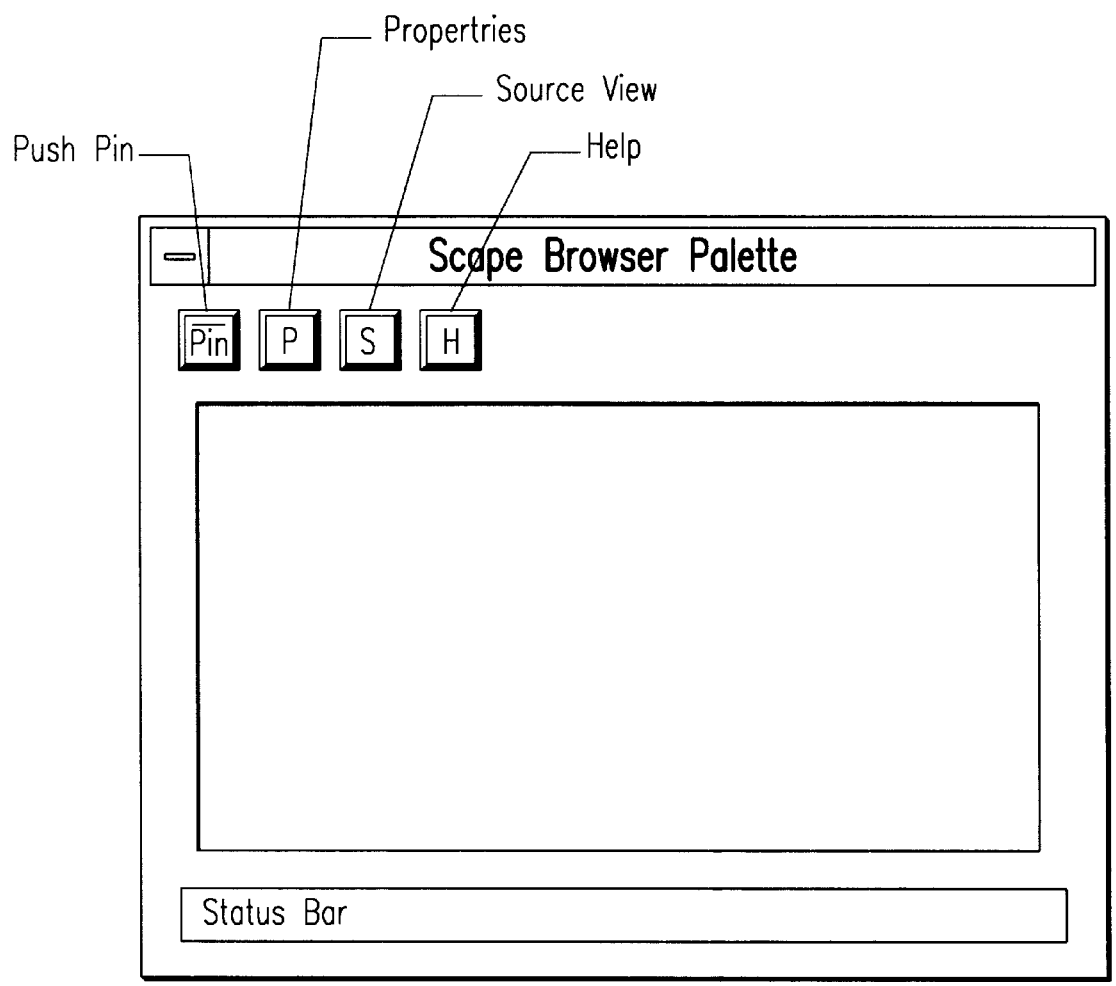
FIG. 35 shows a Scope Browser palette displayed on the display screen during operation of the debugger.
Figure 36:
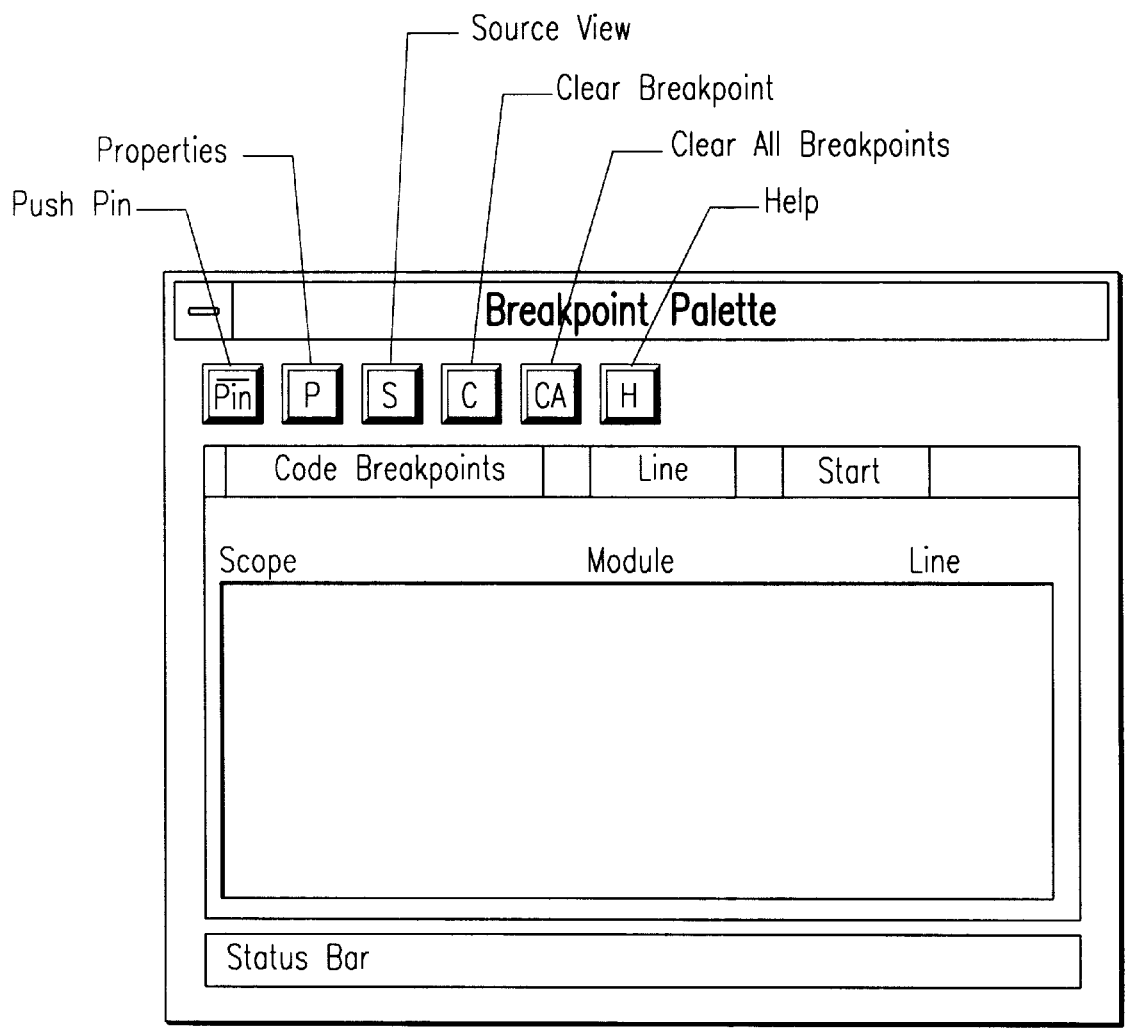
FIG. 36 shows a Breakpoints palette displayed on the display screen during operation of the debugger.
Figure 37:
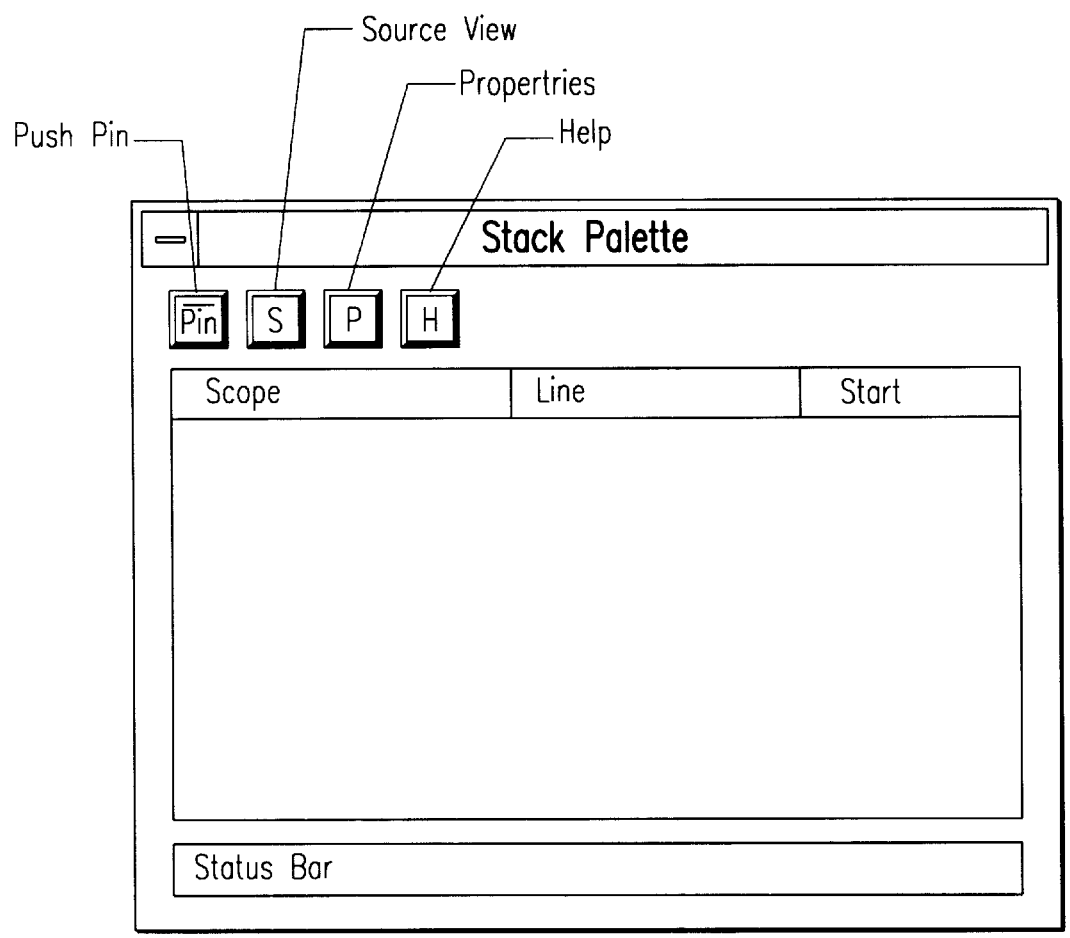
FIG. 37 shows a Stack palette displayed on the display screen during operation of the debugger.

FIGS. 32–37 are flow charts showing various dialog boxes and "palettes" displayed by the debug client during operation of the debugger of the present invention. Dialog boxes allow the user to choose parameters that affect the operation of the debugger. Palettes display information for whatever processes are currently selected by the user. FIG. 32 shows a Logon Preferences Dialog Box displayed on the display screen during operation of the debugger. FIG. 33 shows an Exit Dialog Box displayed on the display screen during operation of the debugger. FIG. 34 shows a Defaults Preferences Dialog Box displayed on the display screen during operation of the debugger. The user can set preferences so that either or both of the callmap view and the source view appear when a process is added to the debug session. FIG. 35 shows a Scope Browser palette displayed on the display screen during operation of the debugger. FIG. 36 shows a Breakpoints palette displayed on the display screen during operation of the debugger. FIG. 37 shows a Stack palette displayed on the display screen during operation of the debugger.

Figure 38:
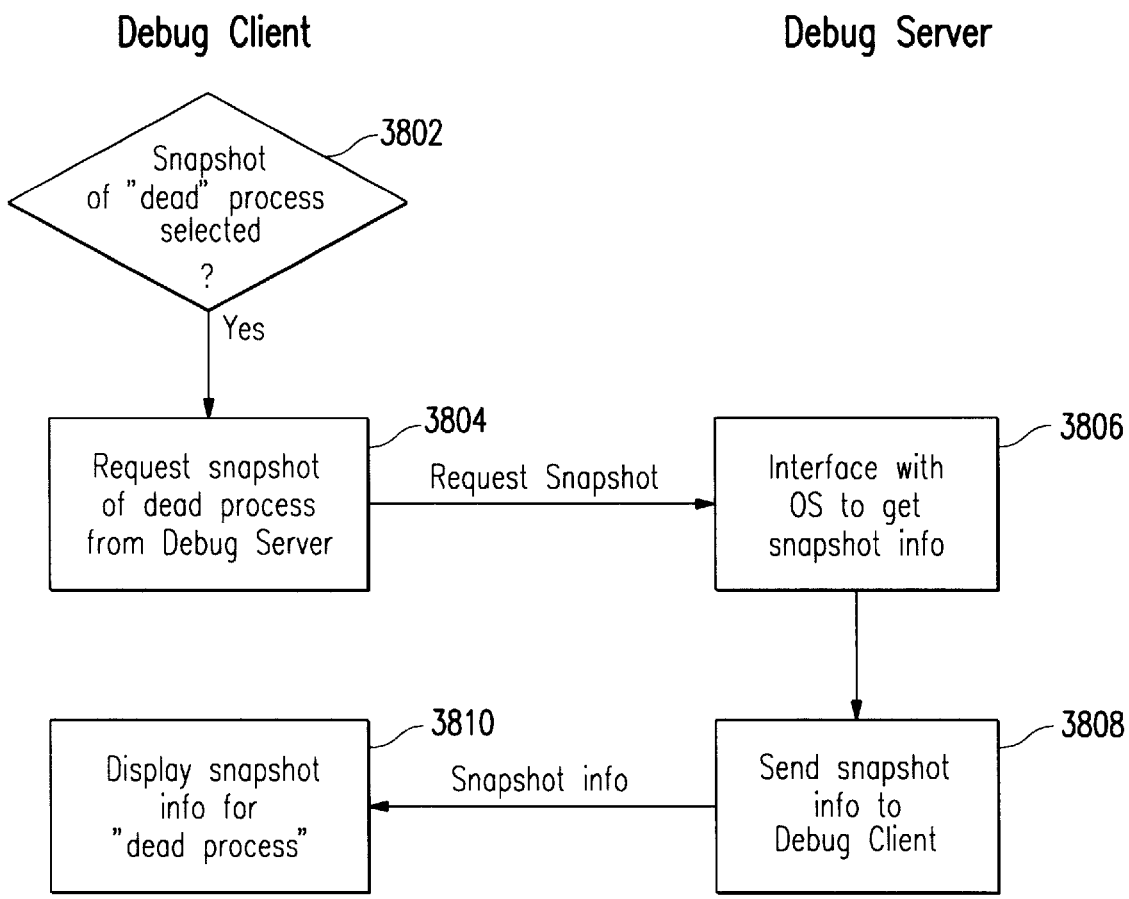
FIG. 38 is a flow chart showing steps performed by the debug client and the debug server when a user selects a "snapshot" operation.

FIG. 38 is a flow chart showing steps performed by the debug client and the debug server when a user selects a "snapshot" operation. A snapshot reflects a current state of running processes. In step 3802, the user selects an item in a pull-down menu (not shown) and inputs information identifying a process that is either not executing or is suspended (i.e., a "dead" process). The debug client accesses its memory to obtain information about the selected process (e.g., on which host is the process resident) in step 3804 and requests a snapshot from the debug server. In step 3806, the debug server interfaces with the Operating System and obtains snapshot information, which represents the state of the process at some time in the past. This information is passed back to the debug client.

In general, for a program snapshot, the debug server stores state information about a program in a file (and/or in its memory). This is analogous to taking a snapshot photo, which captures an instant of time. The debug client can later instruct the debug server to download and examine the file in the same manner that running programs are examined, except for the fact that the user cannot execute the program or alter its state. A user might request a snapshot, for example, when a process terminates either normally or abnormally. The debug client displays a snapshot of the "dead" process on the display of FIG. 13.

Figure 39:
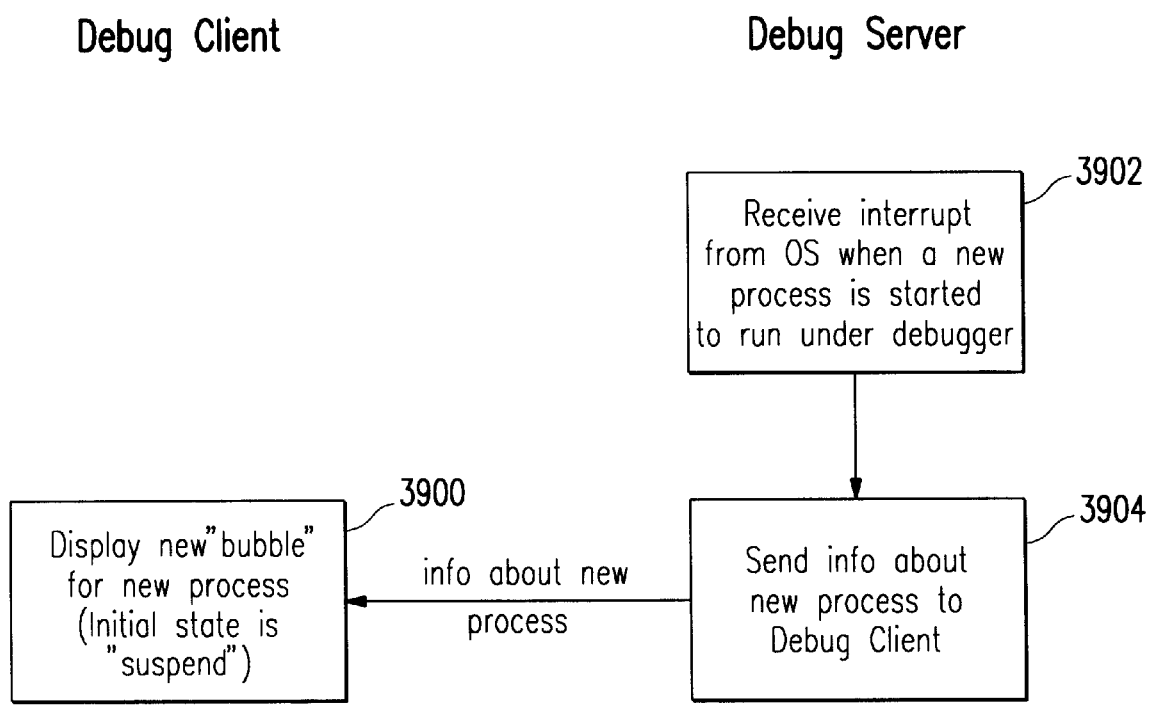
FIG. 39 is a flow chart showing steps performed by the debug client and the debug server when a new process is started under control of the debug server.
Figure 40:
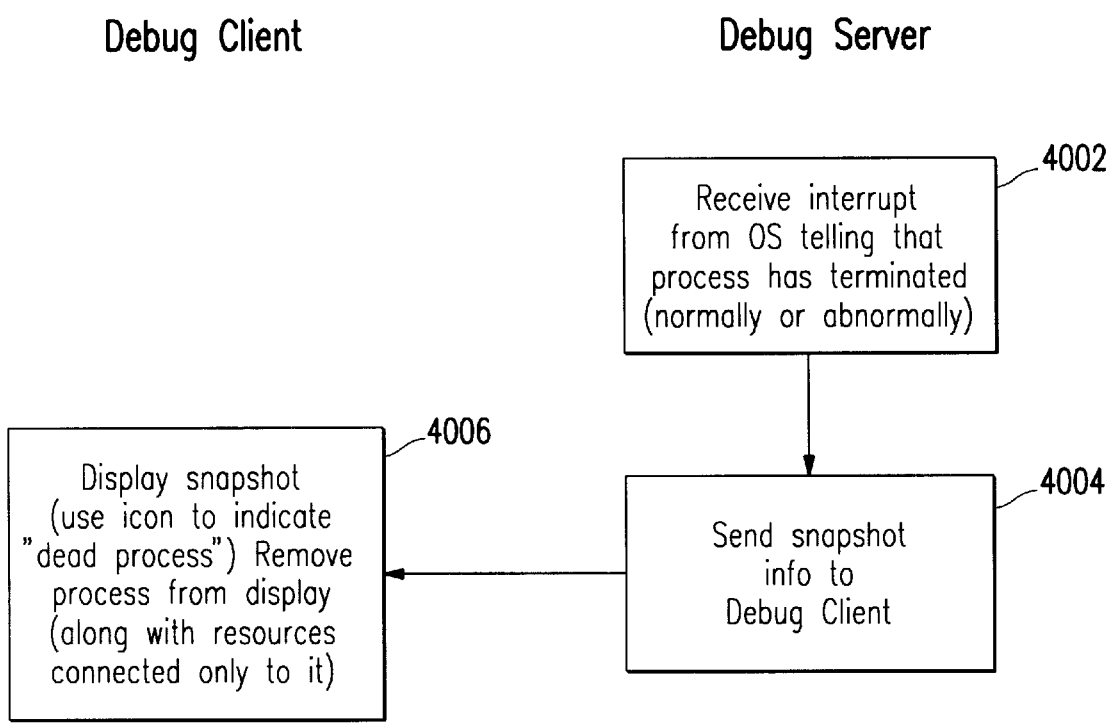
FIG. 40 is a flow chart showing steps performed by the debug client and the debug server when a process terminates.

FIGS. 39–40 represent circumstances when the debug server initiates sending information to the debug client without waiting for a command from the debug client. FIG. 39 is a flow chart showing steps performed by the debug client and the debug server when a new process is started under control of the debug server. FIG. 40 is a flow chart showing steps performed by the debug client and the debug server when a process terminates normally.

In step 3902 of FIG. 39, the debug server receives an interrupt (or other indication) from the Operating System that a new process has been started and that the new process has been started to run "under" the debugger. In step 3904, the debug server sends information about the new process (e.g., its name, resources, start time, priority, source code, symbolic information, etc.) to the debug client. In step 3906, the debug client displays a new "bubble" icon for the new process, indicating that the process is currently in a suspended state.

In step 4002 of FIG. 40, the debug server receives an interrupt (or other indication) from the Operating System that a process has terminated normally. In step 4004, the debug server sends information to the debug client telling it that a process has terminated. In step 4006, the debug client removes a process icon corresponding to the terminated process from the display, along with icons for resources connected only to the terminated process. If a resource is connected to several processes, only the connecting link between its icon and the icon of the terminated process is removed from the display.

Figure 41:
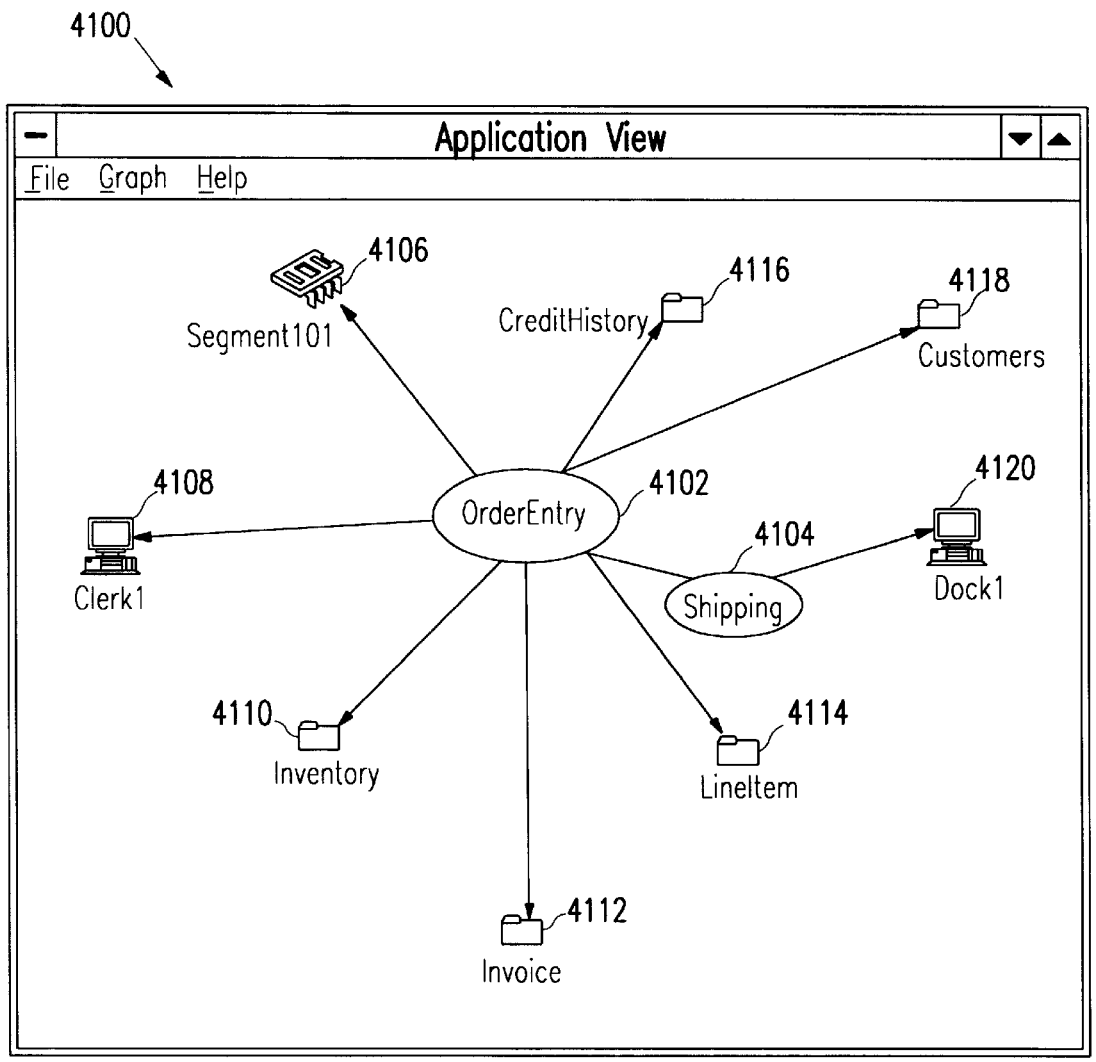
FIG. 41 shows an Application View window displayed on the display screen during operation of the debugger.

FIGS. 41–47 show a third preferred embodiment of the present invention, including a "thread level" Process View window that graphically displays information concerning threads in running processes. A "thread" is a unit of execution that includes a set of instructions, related CPU register values, and a stack. A software application is an executing set of processes. FIG. 41 shows an Application View 4100 window displayed on the display screen during operation of the debugger, as discussed above. The Application View shows process icons for two connected processes "Order Entry" 4102 and "Shipping" 4104. Order Entry process icon 4102 is connected to icons for resources 4106–4118. Shipping process icon 4104 is connected to an icon for resource 4120.

Figure 42:
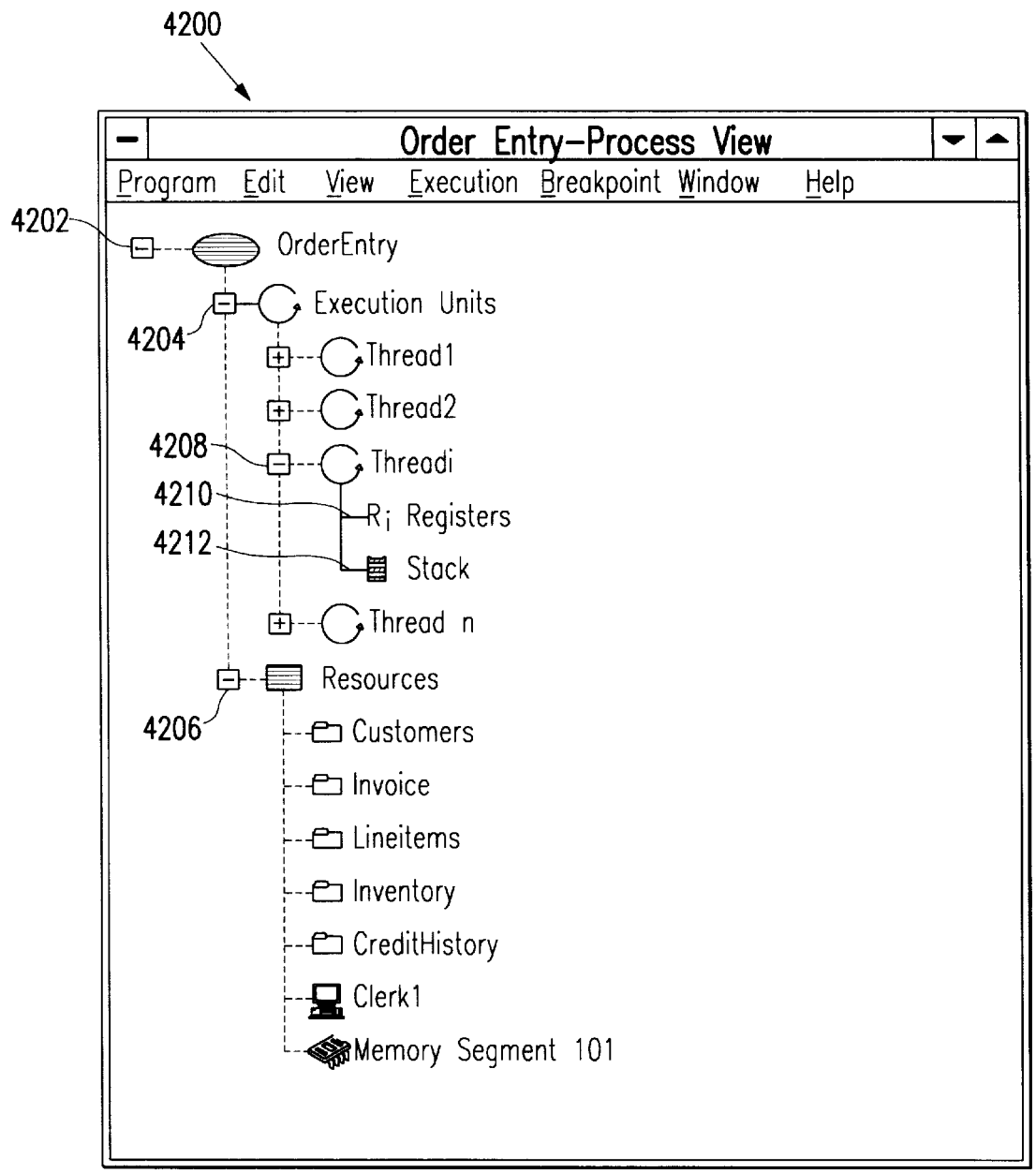
FIG. 42 shows a Process View window displayed on the display screen during operation of the debugger.

FIG. 42 shows a Process View window 4200 displayed on the display screen during operation of the debugger. The display of FIG. 42 is also called a "process tree." The Process Viewer window shows threads in a "tree" format, with the root 4202 being a name of the process, a first branch 4204 of the tree being a list of 1 through n threads (also called "execution units" of the process), and a second branch 4206 of the tree being the names of resources for the process. Alternate embodiments may display some variation of this window. For example, an alternate embodiment may display only the threads and not the resources of a process. Note that the debug server does not need to transmit resource information, since the resource information is already present in the debug client from previous operations to display the resource icons.

Figure 47:
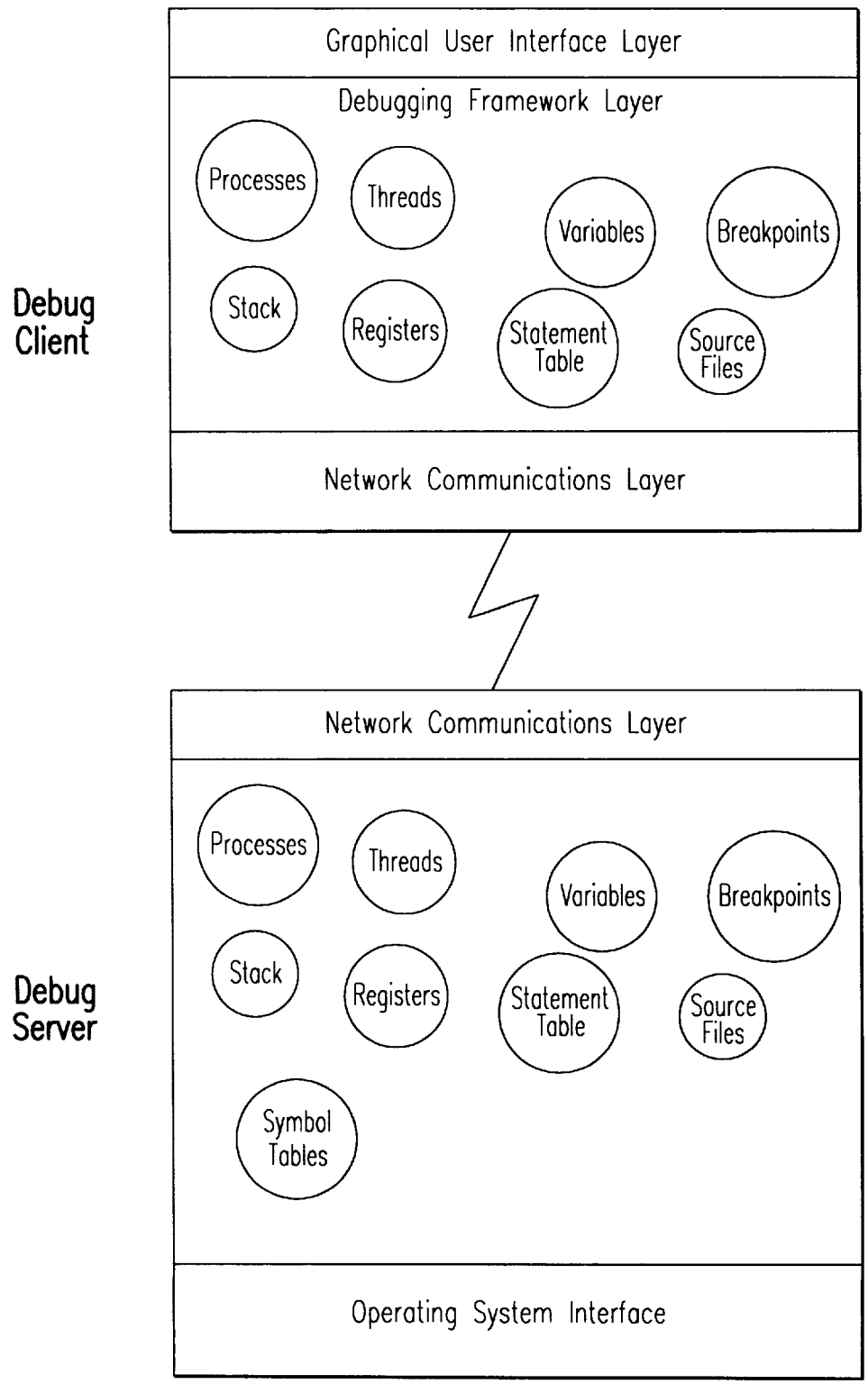
FIG. 47 shows an architecture of the debug client and the debug server in accordance with the present invention.

FIG. 47 shows an architecture of the debug client and the debug server in accordance with the present invention. In general, the debug server does not know anything about windows or what the debug client is displaying to the user. The debug server's job is to tell the debug client that the process state has changed and to fetch requested information. Inside the debug client, an abstract model (the subjects) of the debugging environment is built, e.g. processes, threads, stacks, registers, variables, breakpoints, etc.

Figure 43A:
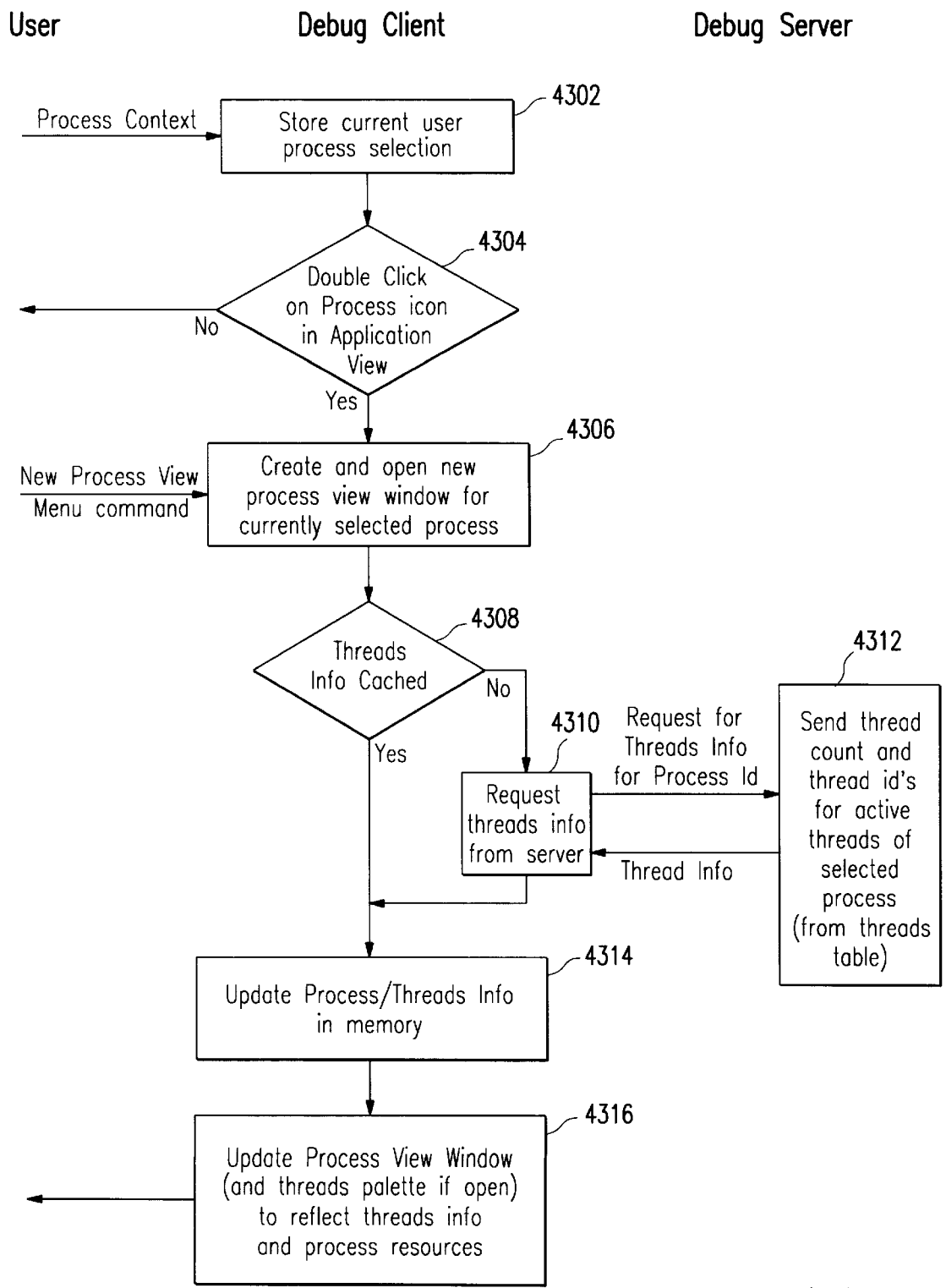
FIG. 43(a) is a flow chart showing steps performed by the debug client and the debug server to open the Process View window.
Figure 43B:
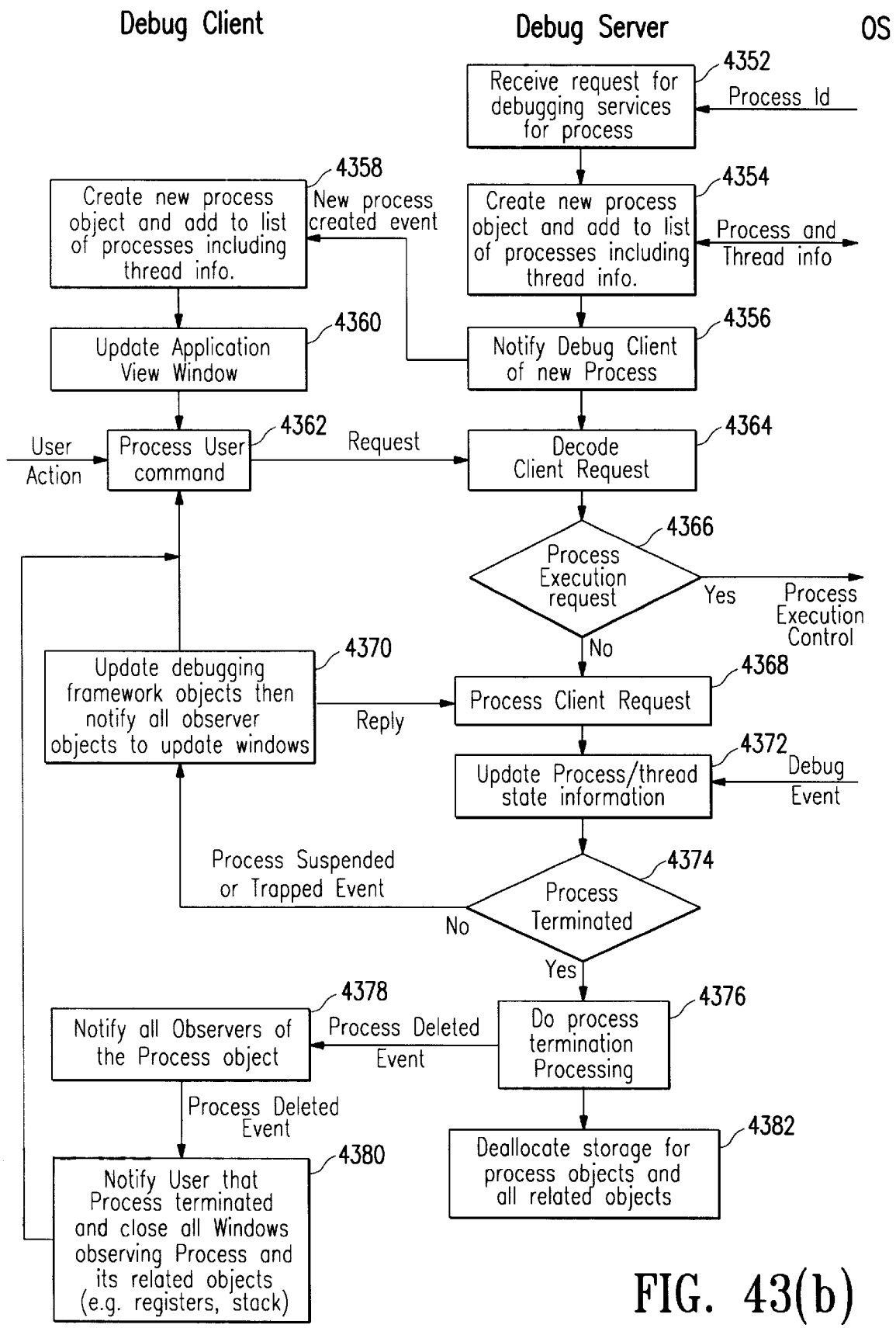
FIG. 43(b) is a flow chart showing steps performed by the debug client and the debug server to update the Process View window (and other open windows) in response to a process event.

FIG. 43(a) is a flow chart showing steps performed by the debug client and the debug server to open the Process View window. FIG. 43(b) is a flow chart showing steps performed by the debug client and the debug server to update the Process View window (and other open windows) in response to a process event. In step 4302, the debug client receives an indication that the user has changed the process context. The user may, for example, select a displayed process icon (such as process icon 4102). In step 4304, the debug client determines whether the user wishes to open a Process View window. The user, for example, may have selected a process icon and then clicked on a "display New Process View" item in a pull-down menu to indicate that the Process View window should be opened. Alternately, double clicking on a process icon in the Application View will open the Process View window. In the third embodiment, the CallMap view is opened by double clicking on a name of a process (e.g., process name 4202) in the Process View window. A callmap represents a call relationship of an entire process, of which a thread may be a subset.

In step 4306, the debug client gets information about the selected process from memory 1214 (e.g., its process number and the host system on which it is executing). If thread information for the selected process is cached in the debug client, then control passes to step 4314. Otherwise, in step 4310, the debug client requests the thread information from the debug server. In step 4312, the debug server sends thread information from its threads table to the debug client. The information sent may include, for example, the number of threads in the selected process and the thread identifier of each thread. In step 4314, the debug client updates its own memory to reflect the thread information. In step 4316, the debug client opens the Process View window and displays the thread information in graphical, hierarchical form, as shown, for example in FIG. 42. If a palette is open it will also be updated at this time, as described below.

FIG. 43(b) is a flow chart showing steps performed by the debug client and the debug server to update open windows, including the Process View window 4200, in response to user input or to a process event. The steps of FIG. 43(b) may also cause open palettes to be updated. For example, if a palette is open when a new Process View window 4200 is opened, the information in the palette is updated to match the primary thread of the newly opened window.

In step 4352, the debug server receives an interrupt (or other indication) from the operating system that a new process has been started and that the new process has been started to run "under" the debugger. In step 4354, the debug server creates a new entry in a threads table in its memory for the new process so that the debug server can keep track of the threads of the new process. In step 4356, the debug server then notifies the debug client of the new process. The debug server also sends thread information to the debug client at this time. In step 4358, the debug client creates a new process object in memory and saves the process information and thread information for the new process. In step 4360, the debug client updates the Application window 4100 to show the new process (and its resources).

In step 4362, the debug client receives a user command, which it passes to the debug server. This step may involve, for example, the user opening a new Process window, opening a new palette, selecting a new process, or selecting a new thread. Not all user commands correspond to a request to the debug server for information. For example, when the user selects something on the screen, the debug client just notes what the user selected and returns to get the next user action. The only time a debug server requests are triggered are for process control (resume, step, step in, step out, hold), and when the necessary information is not cached in the debug client. In steps 4364 and 4366, the debug server decodes the user command and either processes an execution control command or processes a client request (present in the user command) and passes back information requested by the debug client. In step 4370, the debug client updates the debugging framework objects (see FIG. 47) and notifies all observer objects to update their windows. This step may update one or all of the Application view window 4100, the Process view window 4200, or the Palettes 4400 or 4500.

In general, in the described embodiment, if a window is open, that window is an "observer" object of an underlying subject, such as a process, threads, breakpoints, variables, stack frames, etc. When something changes in the underlying subject object, the subject notifies all of its observers that information about the notifying subject needs to be updated. Basically, this is a triggering mechanism that will force all windows (including palettes) that are open to get the latest information concerning the subjects about which they are displaying information. In some cases, as in the case of registers, the client must then send a request to the server for this information. Thus, windows are the observers of processor and thread "subjects." When a subject's state changes, it notifies all of its observers that "my state changed" or "I am about to be deleted." The subjects do not tell the observers what information should be updated since there could be many observers to one subject and the subject will not know what aspect of its information the observer is displaying. Therefore, it is the job of each observer to get the necessary information that it needs.

In step 4372, the debug server receives an interrupt (or other indication) from the operating system that a debug event has occurred. The occurrence of a breakpoint (previously set by the user) is an example of such an event. Other events that can trigger a notification of the debug server include abnormal execution conditions, such as addressing outside the process's address space, arithmetic overflows, and software signals. In step 4372, the debug server interfaces with the operating system to obtain current information concerning the process and threads connected with the event. This information may include, for example, the thread identifiers of threads currently running for the process and the number of these threads. The debug server saves this information in its threads table in memory, updating previously stored thread information for the process if necessary. If, in step 4374, the process has not terminated, then a "process suspended or trapped" event is sent to the debug client, which updates its open windows in step 4370. If the process has terminated normally, the debug server removes thread information for that process from its threads table in step 4376 and sends a "process deleted" event to the debug client. In step 4378, the debug client notifies all observers that a process has terminated. In step 4380, all windows observing the process are closed (and the Applications View window is updated). Lastly, in step 4382, information concerning the threads of the terminated process are removed from the threads table in the debug server. It should be understood that steps of FIGS. 43(*a*) and 43(*b*) can be performed a synchronously. For example, the user could open a new Process View window (step 4306) after the process is created (step 4354), but before the process terminates (step 4374).

Figure 44:
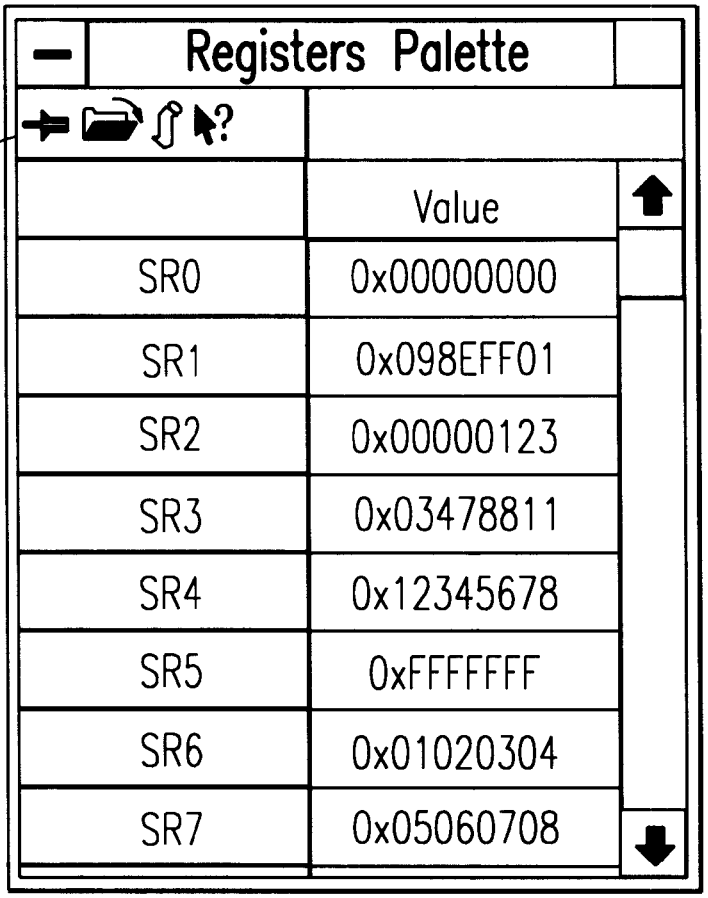
FIG. 44 shows a Register palette displayed on the display screen during operation of the debugger.
Figure 45:
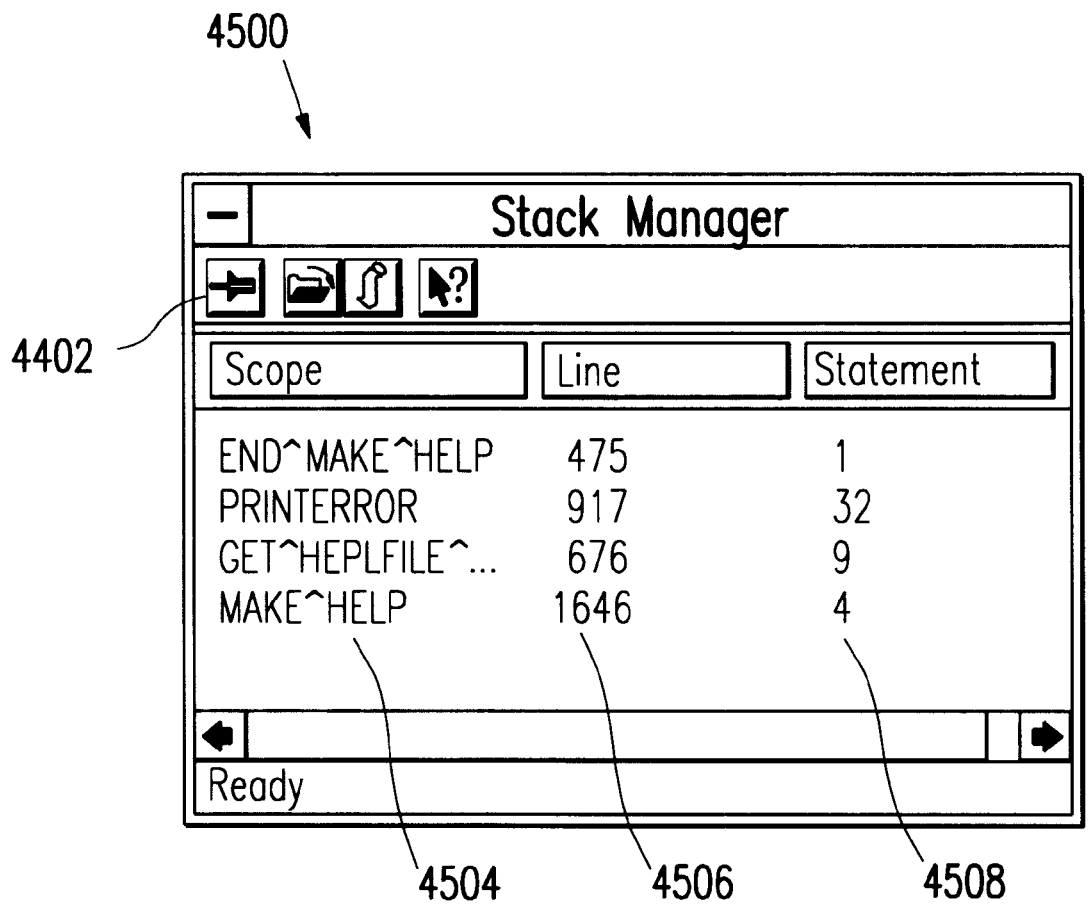
FIG. 45 shows a Stack palette displayed on the display screen during operation of the debugger.

FIG. 44 shows a Register palette 4400 displayed on the display screen during operation of the debugger. FIG. 45 shows a Stack palette 4500 displayed on the display screen during operation of the debugger. Palettes are "context sensitive," in that when they are open, they display information for whatever thread is currently selected by the user. Palettes are a special type of window. There is only one instance of each per debugging session. Palette windows can be opened and closed independent of whether or not Process view 4200 is open. For example, if the stack palette window 4500 is open, the context of the stack palette can change by the user selecting a different process icon in the application view, or giving focus to a process view, cailmap view, or the source view by clicking on the window and thereby activating it. In the described embodiment, if the pushpin button 4402 is pressed, a palette will remain at the front of whatever windows are displayed on the display screen.

Register palette 4400 displays the contents of the registers of the selected thread, e.g., the contents of registers $R0–$R7. Stack palette 4500 displays the contents of the stack of the selected thread. This stack information includes, e.g., information about each active scope in the call chain (i.e., each function or process called). The scope name 4504 is the name of the functions that are active. The line number 4506 is the line number of the source code where the corresponding function is currently executing. The statement number 4508 is a compiler generated number and is a number relative to the start of a function representing a number of program statements.

Sometimes, a user wants to view information for a particular thread. In general each thread in an executing process has its own register and stack. Therefore, each thread displayed in the Process View window 4200 can be expanded to show the contents of its registers and/or stack. Clicking on the "register" node 4210 under a thread name in Process View window 4200 will cause the debug client to update the Register palette to show information for the selected thread. Double clicking on the "stack" node 4212 under a thread name in Process View window 4200 will cause the debug client to update the Stack palette to show information for the selected thread.

Figure 46:
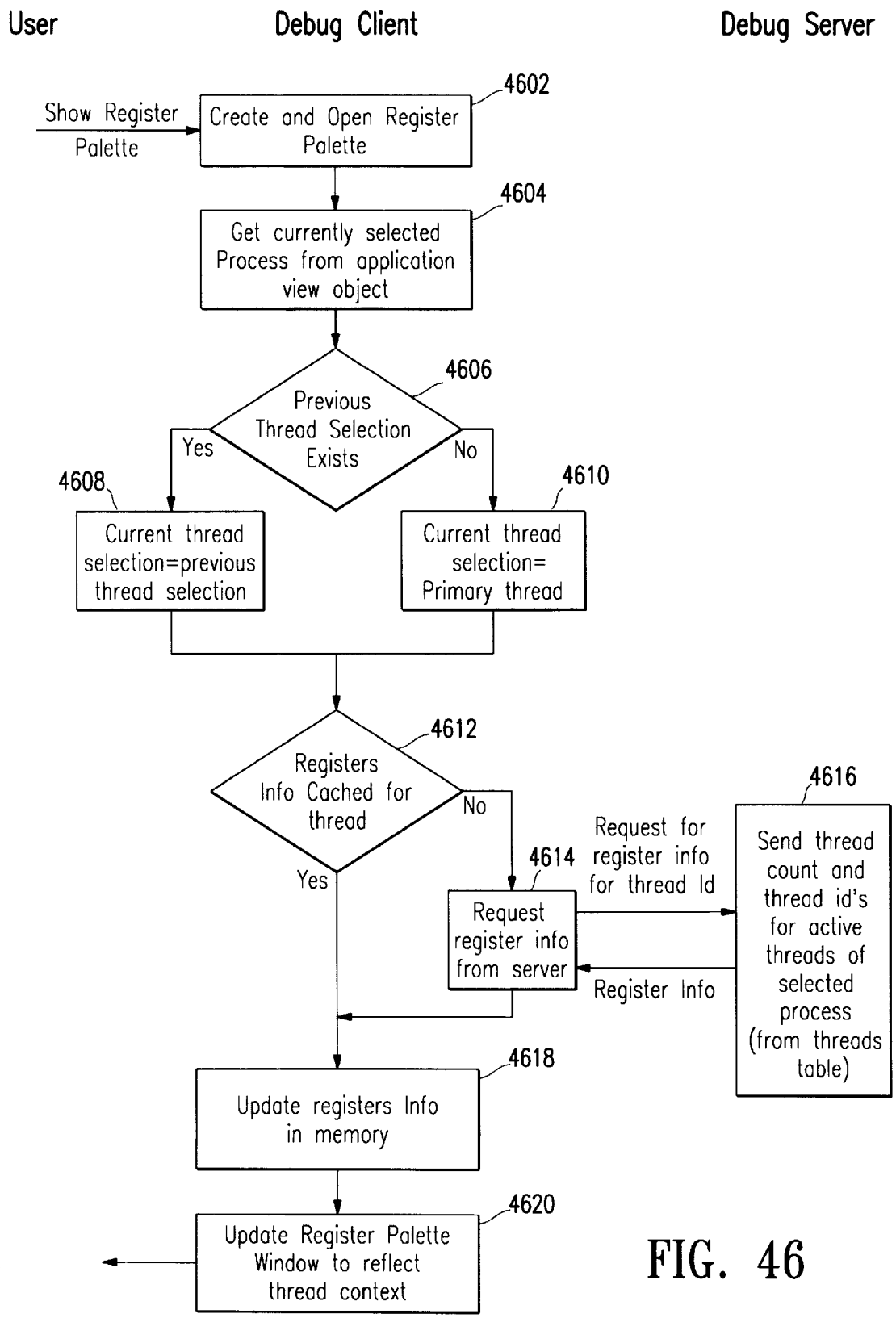
FIG. 46 is a flow chart showing steps performed by the debug client and the debug server to open either the Register palette or the Stack palette.

FIG. 46 is a flow chart showing steps performed by the debug client and the debug server to open either the Register palette 4400 or the Stack palette 4500. In step 4602, the debug client receives an indication that the user wishes to open a palette. The user may have, for example, double clicked on a name of a thread 4208 in FIG. 42 to display the "registers" and "stack" information 4210, 4212. The debug client then determines whether the user double clicks on "registers" node 4210 or on "stack"node 4212 (not shown). FIG. 46 shows steps occurring when the user clicks on "registers" node 4210. The steps performed when the user clicks on "stack" node 4214 are similar.

In step 4604, the debug client gets information about the currently selected process (e.g., its process number) from memory 1214 and requests register information for the process from the debug server. If, in step 4606, a thread has previously been selected for the process, the current thread selection equals the previous thread selection (step 4608). Otherwise, the current thread selection equals the primary thread for the currently selected process (step 4610). It, in step 4612, registers information for the current thread selection was previously cached, then control passes to step 4618. Otherwise, in step 4614, the debug client requests register information for the currently selected thread from the debug server. In step 4616, the debug server interfaces with the operating system to fetch register information for the thread and sends the register information to the debug client. The information sent may include, for example, the register labels and the register contents for the thread.

Once it receives the register information, the debug client updates its own memory to reflect the register information (step 4618). In step 4620, the debug client, opens the Register palette and displays the register information in graphical form, as shown, for example in FIG. 44.

When the steps of FIG. 46 are performed for the Stack palette, the stack information sent from the debug server to the debug client may include, for example, the call history in the stack and corresponding line numbers and statements numbers, as shown in FIG. 45.

In summary, the previous invention allows a user to obtain various levels of detail about a process being debugged. The user initially views coarse levels of detail, but can view increasingly detailed information by clicking on various parts of the graphically displayed information.

As shown in the Figures, after a user selects a graphical process icon displayed in the GUI window, the present invention obtains detailed information about the process and graphically displays the detailed information about the process. The detailed information can include, but is not limited to, an Ceflmap view or a Process view. The detailed information can also include other detailed information relating to the selected process. Moreover, once the detailed process information has been displayed, a user can select various portions of the displayed detailed information, where the selected portion corresponds to an aspect of the process. The present invention then obtains additional detailed information about the selected aspect of the process and graphically displays the additional detailed information about the aspect of the process. The additional detailed information can include, but is not limited to, a callmap view, a register palette, a stack palette, a Source view, a Disassembly view, or a variable's value display window. The additional detailed information can also include other additional detailed information relating to the selected aspect of the process.

Several preferred embodiments of the present invention have been described. Nevertheless, it will be understood that various modifications may be made without departing from the spirit and scope of the invention. For example, debuggers according to the present invention can be run on a single computer, rather than in the described multi-computer client-server environment. While execution paths may preferably be displayed in bold or highlighted video along a call graph, wherein program functions are represented as nodes and lines connecting the nodes depict the ability of one function to call another function, numerous other ways of graphically conveying program organization and execution path information will be apparent to those of ordinary skill in the art based upon the present disclosure. Thus, the present invention is not limited to the preferred embodiments described herein, but may be altered in a variety of ways which will be apparent to persons skilled in the art.

In describing the preferred embodiments, a number of specific technologies used to implement the embodiments of various aspects of the invention were identified and related to more general terms in which the invention was described. However, it should be understood that such specificity is not intended to limit the scope of the claimed invention.

We claim:

1. A method for debugging a software application, comprising the steps, performed by a data processing system, of:
   opening in a Graphical User Interface (GUI) a GUI window;
   receiving a name of a process in the software application, where the process is a process to be debugged;
   displaying in the GUI window a graphical process icon representing the process;
   receiving an indication that the user has selected the graphical process icon displayed in the GUI window;
   obtaining information about all threads currently executing in the process; and
   displaying a process tree graphically representing the information for all threads currently executing in the process.

2. The method of claim 1, wherein the step of displaying a process tree includes the step of displaying the process tree in a second GUI window.

3. The method of claim 1, wherein the process tree includes thread information.

4. The method of claim 3, wherein the thread information includes a register node for a thread of the process.

5. The method of claim 4, further comprising the steps of:
   allowing the user to indicate the register node; and
   displaying, in response to the user's indication, the contents of a register of the thread.

6. The method of claim 1, wherein the process tree contains resource information.

7. The method of claim 3, wherein the thread information includes a stack node for a thread of the process.

8. The method of claim 7, further comprising the steps of:
   allowing the user to indicate the stack node; and
   displaying, in response to the user's indication, the contents of a stack of the thread.

9. The method of claim 1, wherein the obtaining step further includes the steps of:
   requesting, by a debug client, thread information for the process from a debug server; and
   sending, by the debug server, the requested thread information for the process to the debug client.

10. The method of claim 1, wherein the obtaining step further includes the steps of:
    detecting, by a debug server, an event connected with the process;
    sending, by the debug server, thread information for the process, thread information for the process to the debug client; and
    receiving, by the debug client, the thread information for the process.

11. A method for debugging a software application, comprising the steps, performed by a data processing system, of:
    opening in a Graphical User Interface (GUI) a GUI window;
    receiving a name of a process in the software application, where the process is a process to be debugged;
    displaying in the GUI window a graphical process icon representing the process;
    receiving an indication that the user has selected the graphical process icon displayed in the GUI window;
    obtaining detailed information about the process; and
    graphically displaying the detailed information about the process.

12. The method of claim 11, further including the steps of:
    receiving an indication that the user has selected a portion of the displayed detailed information, where the selected portion corresponds to an aspect of the process;
    obtaining additional detailed information about the aspect of the process; and
    graphically displaying the additional detailed information about the aspect of the process.

13. A system for debugging a software program, comprising:
    means for opening a Graphical User Interface (GUI) window in a GUI;
    means for receiving a name of a process in the software application, where the process is a process to be debugged;
    means for displaying in the GUI window a graphical process icon representing the process;
    means for receiving an indication that the user has selected the graphical process icon displayed in the GUI window;

means for obtaining information about all threads currently executing in the process; and means for displaying a process tree graphically representing the information for all threads currently executing in the process.

14. A computer-readable storage medium storing code for causing a computer to perform the steps of:

opening a Graphical User Interface (GUI) window in a GUI;

receiving a name of a process in the software application, where the process is a process to be debugged;

displaying in the GUI window a graphical process icon representing the process;

receiving an indication that the user has selected the graphical process icon displayed in the GUI window;

obtaining information about all threads currently executing in the process; and displaying a process tree graphically representing the information for all threads currently executing in the process.

15. A method of displaying currently executing thread information, comprising the steps of:

receiving information identifying a process;

reviewing operating system information for the process;

obtaining thread information for all threads currently executing in the process from the operating system information; and displaying a process tree graphically representing the thread information.

16. A computer-readable medium storing code for causing a computer to perform the steps of:

receiving information identifying a process;

reviewing operating system information for the process;

obtaining thread information for all threads currently executing in the process from the operating system information; and displaying a process tree graphically representing the thread information.

17. A method of displaying process information, comprising the steps of:

receiving information identifying a process;

retrieving detailed information for the process;

displaying a process tree having a first level of detailed information about the process;

receiving information identifying a portion of the process being displayed; and displaying a process tree having a second level of detailed information about the portion of the process.

18. A method of displaying a tree structure representing currently executing program code, comprising the step of:

receiving information identifying program code currently being executed, the program code having been previously compiled into object code stored in an object code file;

receiving a request to display a tree structure representing details of the program code;

obtaining program code information from object code file while the program code continues to execute; and displaying the program code information in a tree structure.

19. The method of claim 18, further comprising the step, after receiving a request to display a tree structure, taking control of the program code.

20. The method of claim 18, wherein the program code information includes the call relationships between program modules.

* * * * *